(12) United States Patent
Mizunuma et al.

(10) Patent No.: US 12,449,043 B2
(45) Date of Patent: Oct. 21, 2025

(54) VALVE DEVICE

(71) Applicant: DENSO CORPORATION, Kariya (JP)

(72) Inventors: Takehito Mizunuma, Kariya (JP); Ryou Sano, Kariya (JP); Akira Higuchi, Kariya (JP); Hiroki Shimada, Kariya (JP)

(73) Assignee: DENSO CORPORATION, Kariya (JP)

( * ) Notice: Subject to any disclaimer, the term of this patent is extended or adjusted under 35 U.S.C. 154(b) by 439 days.

(21) Appl. No.: 17/689,037

(22) Filed: Mar. 8, 2022

(65) Prior Publication Data

US 2022/0196157 A1 Jun. 23, 2022

Related U.S. Application Data

(63) Continuation of application No. PCT/JP2020/034162, filed on Sep. 9, 2020.

(30) Foreign Application Priority Data

Sep. 13, 2019 (JP) .................. 2019-167538

(51) Int. Cl.
*F16K 3/08* (2006.01)
*F16K 3/02* (2006.01)
(Continued)

(52) U.S. Cl.
CPC .............. *F16K 3/08* (2013.01); *F16K 3/0254* (2013.01); *F16K 11/074* (2013.01); *B60L 58/24* (2019.02); *B60L 2240/545* (2013.01); *F16K 3/18* (2013.01); *F16K 27/045* (2013.01); *F16K 31/041* (2013.01); *F16K 31/53* (2013.01); *F16K 31/535* (2013.01)

(58) Field of Classification Search
CPC ........ F16K 3/08; F16K 3/0254; F16K 27/045; F16K 31/041; F16K 31/535; F16K 31/53; B60L 2240/545
See application file for complete search history.

(56) References Cited

U.S. PATENT DOCUMENTS 2,516,795 A 7/1950 Norton
6,032,869 A 3/2000 Ito et al.
(Continued)

FOREIGN PATENT DOCUMENTS

JP S48-039285 11/1973
JP 6-159536 6/1994
(Continued)

*Primary Examiner* — Craig M Schneider
*Assistant Examiner* — Christopher D Ballman
(74) *Attorney, Agent, or Firm* — Nixon & Vanderhye P.C.

(57) ABSTRACT

A valve device includes a housing, a stator disposed in the housing and defining at least one passage hole, a driving portion, a shaft configured to be rotated by a rotational force generated by the driving portion, and a rotor in contact with the stator and configured to adjust an amount of the fluid flowing through the at least one passage hole by rotating about an axis along with the shaft. One of an inner circumferential side surface of the housing or an outer circumferential side surface of the stator has at least one engaging protrusion and the other has at least one engaging recess. The at least one engaging protrusion is engaged with the at least one engaging recess such that the stator is restricted from rotating in a circumferential direction of the axis.

14 Claims, 28 Drawing Sheets

(51) Int. Cl.
  *F16K 11/074*  (2006.01)
  *B60L 58/24*  (2019.01)
  *F16K 3/18*  (2006.01)
  *F16K 27/04*  (2006.01)
  *F16K 31/04*  (2006.01)
  *F16K 31/53*  (2006.01)

(56) References Cited

U.S. PATENT DOCUMENTS

| | | | | |
|---|---|---|---|---|
| 6,352,105 | B1* | 3/2002 | Serratto | F24F 3/08 |
| | | | | 236/1 C |
| 9,803,759 | B2* | 10/2017 | Bachofer | F16K 11/0743 |
| 9,976,654 | B2* | 5/2018 | Yokoe | F16K 31/535 |
| 10,781,932 | B2* | 9/2020 | Yokoe | F16K 11/0743 |
| 10,941,871 | B2* | 3/2021 | Yu | F16K 27/048 |
| 2002/0148516 | A1 | 10/2002 | Bartkus et al. | |
| 2004/0123911 | A1 | 7/2004 | Bartkus et al. | |
| 2007/0040138 | A1 | 2/2007 | Sekiya et al. | |
| 2015/0233476 | A1* | 8/2015 | Bachofer | F16J 15/447 |
| | | | | 251/319 |
| 2015/0233482 | A1* | 8/2015 | Bachofer | F16K 11/0743 |
| | | | | 137/625.15 |
| 2015/0233483 | A1* | 8/2015 | Bachofer | F16K 11/0743 |
| | | | | 137/625.15 |
| 2016/0167481 | A1 | 6/2016 | Makihara et al. | |
| 2018/0320793 | A1 | 11/2018 | Choi | |
| 2019/0301619 | A1 | 10/2019 | Wu et al. | |
| 2019/0309862 | A1 | 10/2019 | Yu et al. | |

FOREIGN PATENT DOCUMENTS

| | | |
|---|---|---|
| JP | 2020-200902 | 12/2020 |
| JP | 2021-042808 | 3/2021 |
| JP | 2021-042809 | 3/2021 |
| KR | 10-2009-0076577 | 7/2009 |

* cited by examiner

DEVICE COOLING MODE

OUTSIDE AIR COOLING MODE

OUTSIDE AIR HEAT ABSORBING MODE

VALVE DEVICE

CROSS REFERENCE TO RELATED APPLICATION

The present application is a continuation application of International Patent Application No. PCT/JP2020/034162 filed on Sep. 9, 2020, which designated the U.S. and claims the benefit of priority from Japanese Patent Application No. 2019-167538 filed on Sep. 13, 2019. The entire disclosures of all of the above applications are incorporated herein by reference.

TECHNICAL FIELD

The present disclosure relates to a valve device.

BACKGROUND

There is a valve device that includes a first valve seat defining a flow valve port through which a fluid flows, a second valve seat configured to adjust a flow rate of the fluid flowing through the flow valve port by rotating, a housing, and a positional restriction protrusion disposed on the bottom of the housing.

SUMMARY

A valve device includes a housing, a stator disposed in the housing and defining at least one passage hole through which a fluid flows, a driving portion configured to generate a rotational force, a shaft configured to be rotated by the rotational force generated by the driving portion, and a rotor in contact with the stator in the housing. The rotor is configured to adjust an amount of the fluid flowing through the at least one passage hole by rotating about an axis along with the shaft. The housing has an inner circumferential side surface and the stator has a stator body portion having a stator axis extending along the axis of the rotor and an outer circumferential side surface facing the inner circumferential side surface of the housing. One of the inner circumferential side surface or the outer circumferential side surface has at least one engaging protrusion and an other of the inner circumferential side surface or the outer circumferential side surface has at least one engaging recess. The at least one engaging protrusion is engaged with the at least one engaging recess such that the stator is restricted from rotating in a circumferential direction of the axis.

DESCRIPTION OF EMBODIMENTS

Figure 1:
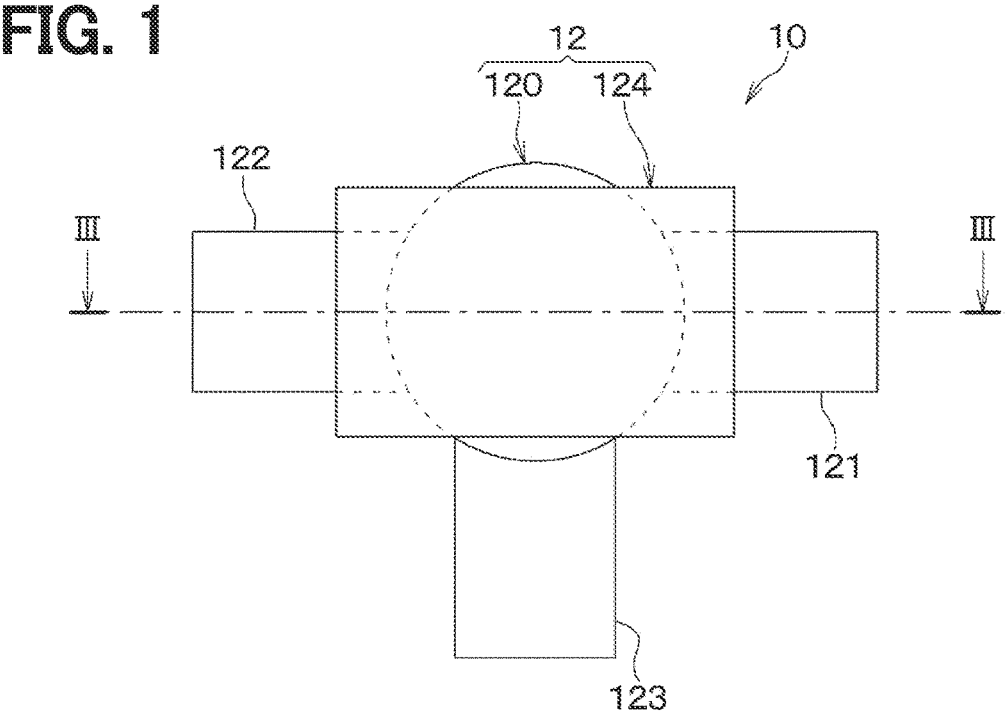
FIG. 1 is a schematic plan view of a valve device according to a first embodiment.

To begin with, examples of relevant techniques will be described.

There is a valve device that includes a first valve seat defining a flow valve port through which a fluid flows, a second valve seat configured to adjust a flow rate of the fluid flowing through the flow valve port by rotating, a positional restriction protrusion configured to restrict the first valve seat from rotating in a circumferential direction, and a housing. The first valve seat has a sector shape in a plan view. The first valve seat has a first flat contact portion and a second flat contact portion that form two straight portions of the sector shape. The first flat contact portion and the second flat contact portion are connected at the center of the circle forming the sector shape. Further, the positional restriction protrusion has a sector shape that can fit between the flat contact portions of the first valve seat in a plan view. The positional restriction protrusion has a first flat stopper facing the first contact portion and a second flat stopper facing the second contact portion. The positional restriction protrusion is disposed on the bottom of the housing.

As a result, even if the second valve seat rotates, one of the contact portions of the first valve seat comes into contact with the stopper facing the one of the contact portions, so that the first valve seat is restricted from being displaced in the circumferential direction. The first valve seat functions as a stator that is relatively fixed to the housing.

The present inventors examined misalignment of the first valve seat in the circumferential direction in the valve device described above, and found that the closer a contact position between the contact portion of the first valve seat and the stopper facing the contact portion was to a rotational axis of the second valve seat, the larger the misalignment became.

For example, in the valve device described above, each of the contact portions deeply extends from the outer circumferential surface of the first valve seat toward a center of the first valve seat in a radial direction. The contact portions may come into contact with the facing stoppers at the vicinity of the center of the first valve seat. In this case, when the distance between the rotational axis of the second valve seat and the contact position between the contact portion and the stopper is small, the misalignment of the first valve seat in the circumferential direction becomes large due to fitting tolerance between the first valve seat and the housing. The misalignment of the first valve seat in the circumferential direction is not preferable because it causes deterioration of the flow rate accuracy of the fluid flowing through the flow valve port.

It is an objective of the present disclosure to provide a valve device that can suppress a misalignment of a stator in a circumferential direction.

According to an aspect of the present disclosure, a valve device is provided. The valve device includes a housing, a stator disposed in the housing and defining at least one passage hole through which a fluid flows, a driving portion configured to generate a rotational force, a shaft configured to be rotated by the rotational force generated by the driving portion, and a rotor in contact with the stator in the housing. The rotor is configured to adjust an amount of the fluid flowing through the at least one passage hole by rotating about an axis along with the shaft. The housing has an inner circumferential side surface and the stator has a stator body portion having a stator axis extending along the axis of the rotor and an outer circumferential side surface facing the inner circumferential side surface of the housing. One of the inner circumferential side surface or the outer circumferential side surface has at least one engaging protrusion and an other of the inner circumferential side surface or the outer circumferential side surface has at least one engaging recess. The at least one engaging protrusion is engaged with the at least one engaging recess such that the stator is restricted from rotating in a circumferential direction of the axis.

As described above, the outer circumferential side surface of the stator and the inner circumferential side surface of the housing can be engaged with each other, so that misalignment of the stator in the circumferential direction due to fitting tolerance between the stator and the housing can be reduced.

Hereinafter, embodiments of the present disclosure will be described with reference to the drawings. In the following embodiments, portions that are the same as or equivalent to those described in the preceding embodiments are denoted by the same reference numerals, and a description of the same or equivalent portions may be omitted. In addition, when only a part of the components is described in the embodiment, the components described in the preceding embodiment can be applied to other parts of the components. The respective embodiments described herein may be partially combined with each other as long as no particular problems are caused even without explicit statement of these combinations.

First Embodiment

The present embodiment will be described with reference to FIGS. 1 to 11. In the present embodiment, an example where a valve device 10 of the present disclosure is applied to a control valve mounted in a vehicle will be described. Although not illustrated, the valve device 10 illustrated in FIG. 1 is applied to a fluid circulation circuit that circulates a fluid (in the present example, cooling water) to a traveling power source, a radiator, and the like. The fluid circulating in the fluid circulation circuit flows through the valve device 10.

The valve device 10 can increase or decrease the flow rate of the fluid in the passage via the valve device 10 in the fluid circulation circuit and can also block the flow of the fluid in the passage. As the fluid, for example, LLC containing ethylene glycol is used. LLC is an abbreviation for long life coolant.

Figure 2:
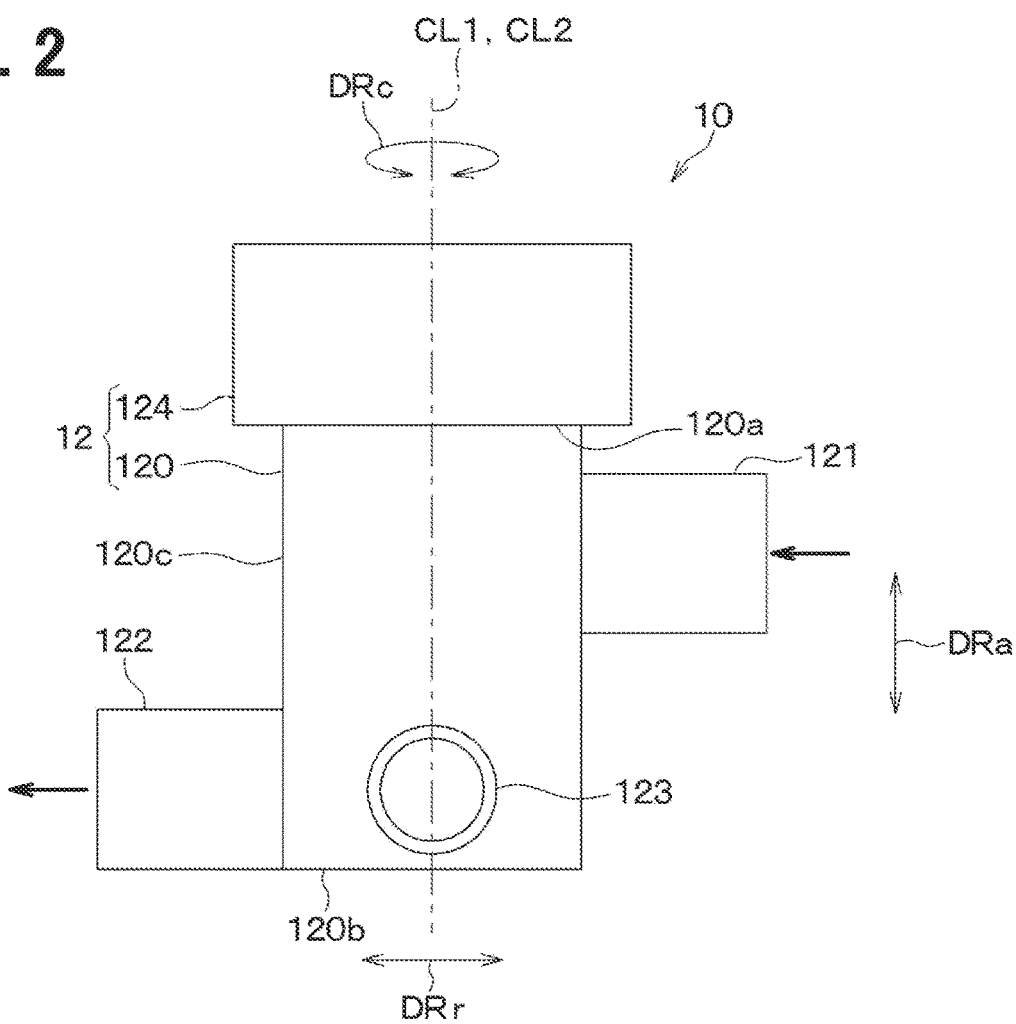
FIG. 2 is a schematic front view of the valve device according to the first embodiment.

As illustrated in FIGS. 1 and 2, the valve device 10 has a housing 12 forming an outer contour. The valve device 10 is a three-way valve defining, in the housing 12, an inlet portion 121 into which a fluid flows, a first outlet portion 122 from which the fluid is allowed to flow out, and a second outlet portion 123 from which the fluid is allowed to flow out. The valve device 10 not only functions as a passage switching valve but also functions as a flow rate adjusting valve that adjusts a flow rate ratio between the fluid flowing from the inlet portion 121 to the first outlet portion 122 and the fluid flowing from the inlet portion 121 to the second outlet portion 123.

The valve device 10 is configured as a disc valve that performs a valve switching operation by a disc-shaped valve body rotating about an axis CL of a shaft 20, which will be described later. In this embodiment, the direction along the axis CL1 of the shaft 20 to be described later is defined as an axial direction DRa, and the direction that is perpendicular to the axial direction DRa and radially extends from the axial direction DRa is defined as a radial direction DRr. With this definition, configurations of the valve device 10 will be described. Further, in this embodiment, the direction around the axis CL1 of the shaft 20 is defined as a circumferential direction DRc.

Figure 3:
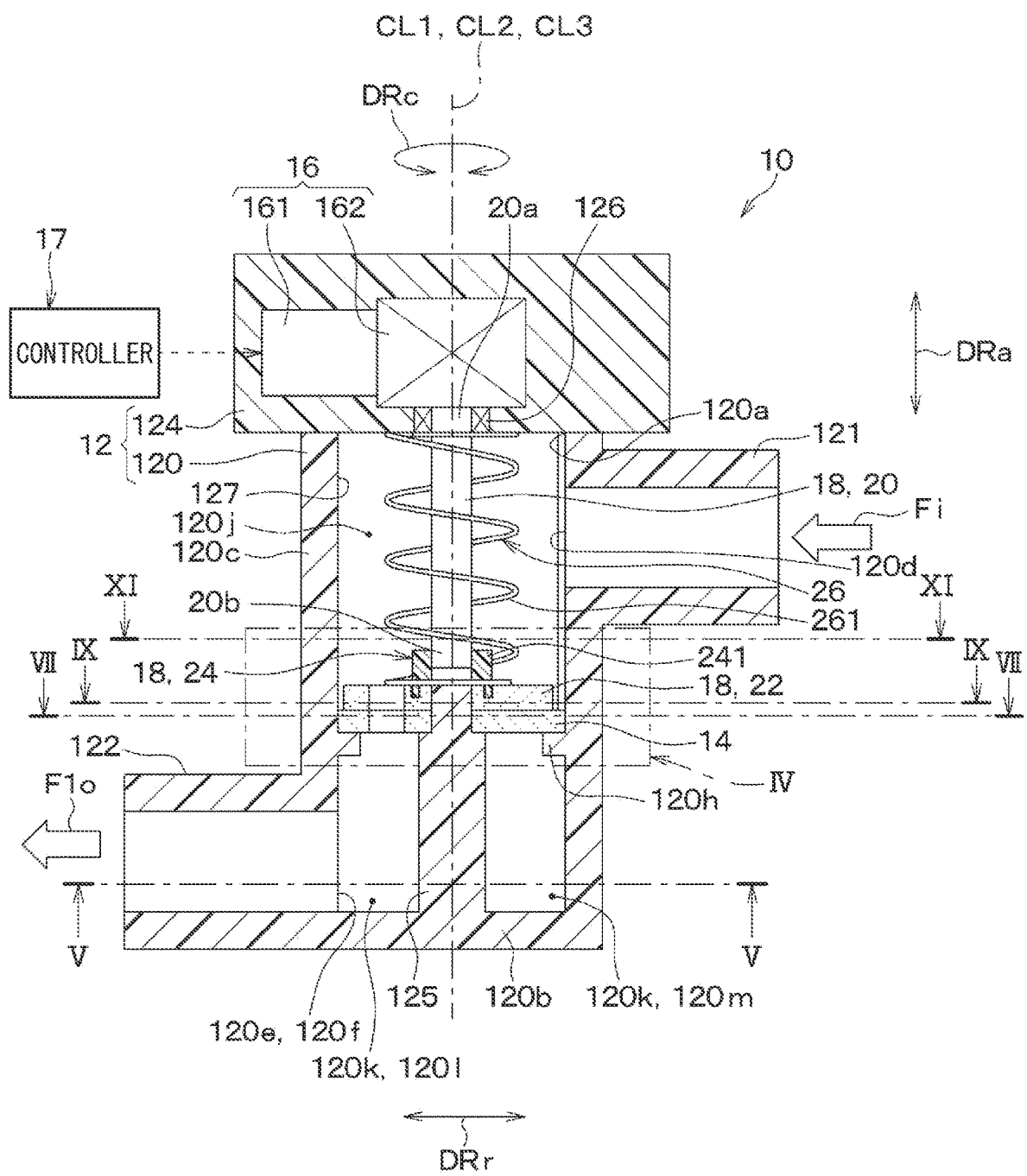
FIG. 3 is a cross-sectional view taken along the line III-III of FIG. 1.

As illustrated in FIG. 3, in the valve device 10, a stator 14, a driving portion 16, a rotating portion 18, an elastic member 26, and the like are housed inside the housing 12.

The housing 12 is a non-rotating member that does not rotate. The housing 12 is made of, for example, a resin material or the like. The housing 12 has a bottomed cylindrical body portion 120 having a housing axis CL2 extending along the axial direction DRa, and a main body cover 124 that closes an opening portion 120a of the cylindrical body portion 120. In the present embodiment, the housing 12 is formed so that the housing axis CL2 is coaxial with the axis CL1 of the shaft 20.

Figure 5:
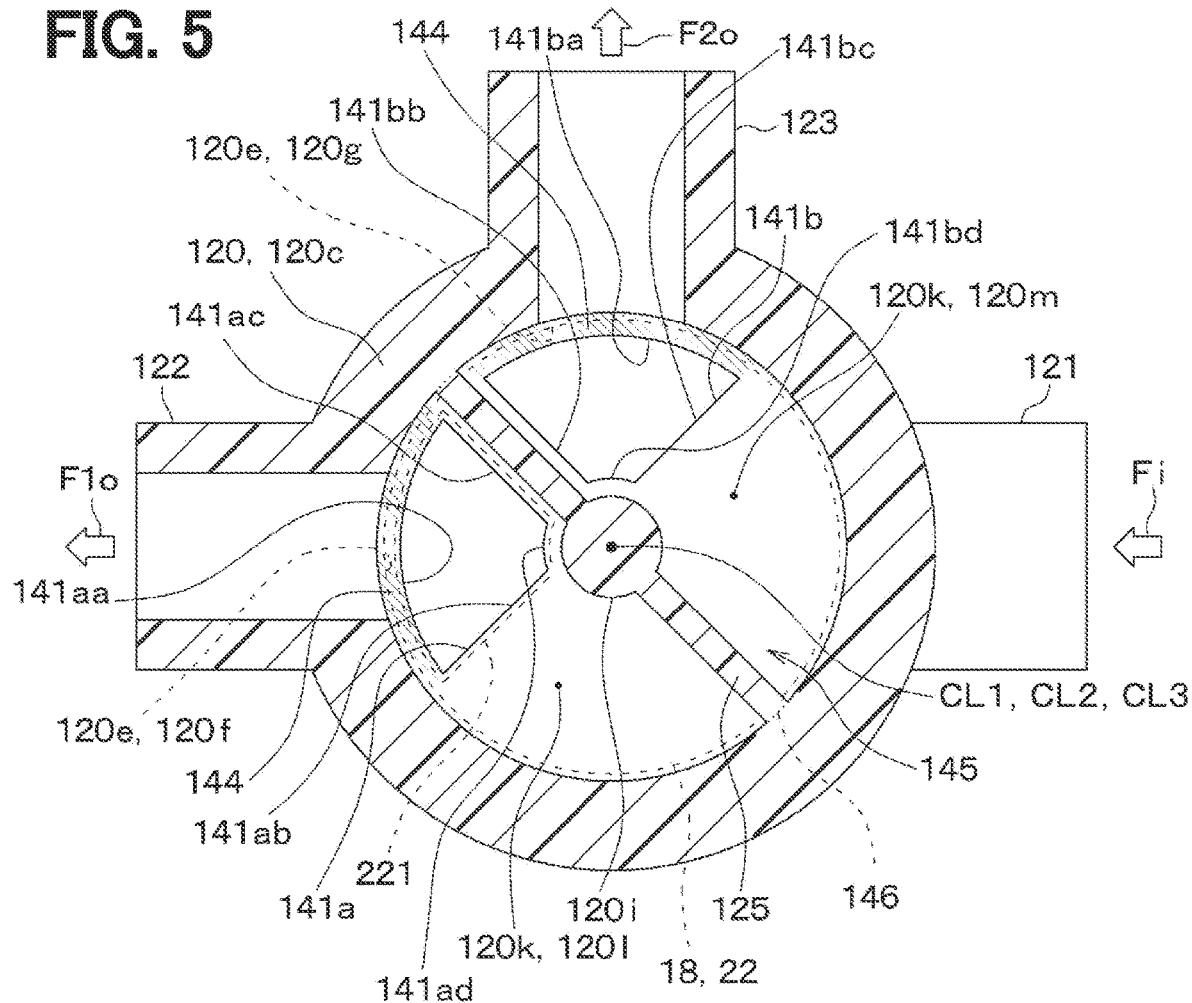
FIG. 5 is a schematic cross-sectional view taken along the line V-V in FIG. 3.

As shown in FIGS. 3 and 5, the cylindrical body portion 120 has a bottom wall portion 120b forming a bottom surface and a side wall portion 120c surrounding the housing axis CL2. An inlet portion 121 is fluidly connected to the cylindrical body portion 120 at a position of the side wall portion 120c closer to the opening portion 120a than to the bottom wall portion 120b. Further, a first outlet portion 122 and a second outlet portion 123 are fluidly connected to the cylindrical body portion 120 at a position of the side wall portion 120c closer to the bottom wall portion 120b than to the opening portion 120a.

The side wall portion 120c of the cylindrical body portion 120 defines an inlet opening 120d through which the fluid flows into the cylindrical body portion 120 and an outlet opening 120e through which the fluid flows out of the cylindrical body portion 120. The outlet opening 120e includes a first outlet opening 120f and a second outlet opening 120g. The first outlet opening 120f is located away from the second outlet opening 120g by 90° in the circumferential direction DRc of the housing axis CL2. In the cylindrical body portion 120, the inlet opening 120d is in communication with the inlet portion 121, the first outlet opening 120f is in communication with the first outlet portion 122, and the second outlet opening 120g is in communication with the second outlet portion 123. The inner diameters of the first outlet opening 120f and the second outlet opening 120g are the same.

Further, in the cylindrical body portion 120, a stator supporter 120h for arranging the stator 14 inside the cylindrical body portion 120 is formed on an inner surface of the side wall portion 120c. The stator supporter 120h annularly protrudes from the inner surface of the side wall portion 120c toward the housing axis CL2 such that the stator supporter 120h can support a supporting surface 143 of the stator 14. The supporting surface 143 is an opposite surface of an opening surface 140 of the stator 14 which will be described later.

Further, the cylindrical body portion 120 has a housing insertion portion 120i that is inserted into the stator 14 and the rotor 22 that are disposed inside the cylindrical body portion 120. The housing insertion portion 120i protrudes from a partition 125 in one direction of the axial direction DRa. The partition 125 defines a space through which the fluid flows inside the cylindrical body portion 120.

The inside of the cylindrical body portion 120 is partitioned by the stator 14 into an inlet-side space 120j and an outlet-side space 120k. The inlet-side space 120j is a space in communication with the inlet portion 121 inside the housing 12. The outlet-side space 120k is a space in communication with the first outlet portion 122 and the second outlet portion 123 inside the housing 12.

Further, the partition 125 having a plate shape is formed inside the cylindrical body portion 120. The partition 125 divides the outlet-side space 120k into a first outlet-side space 120l and a second outlet-side space 120m. The partition 125 is provided so as to cross the outlet-side space 120k along the radial direction DRr.

Figure 4:
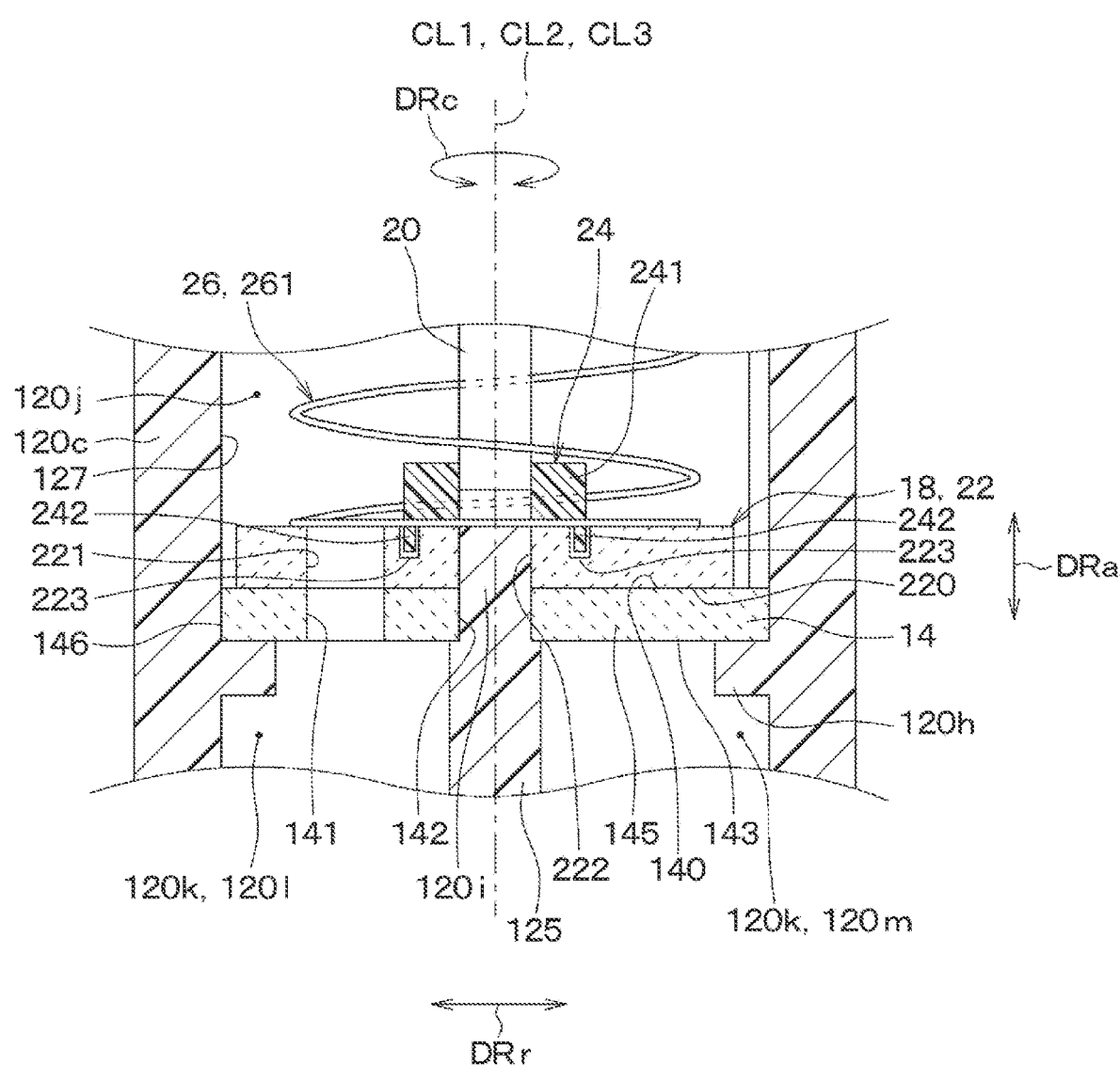
FIG. 4 is a schematic cross-sectional view illustrating a part of the valve device according to the first embodiment.

As shown in FIGS. 3 and 4, the stator 14 is formed of a substantially disk-shaped member having a thickness direction in the axial direction DRa. The stator 14 has an outer circumferential side surface 146 that forms an outer circumferential surface and is housed inside the cylindrical body portion 120 such that the outer circumferential side surface 146 faces an inner circumferential side surface 127 of the side wall portion 120c.

Further, the stator 14 has a stator axis CL3 extending in the axial direction DRa. The stator 14 includes a stator body portion 145 forming a disk shape of the stator 14 and an engaging protrusion 32 formed on the outer circumferential side surface 146 which will be described later. The stator 14 is arranged inside the cylindrical body portion 120 so that the stator axis CL3 is coaxial with the axis CL1 of the shaft 20. Further, the stator 14 is restricted from moving in the circumferential direction DRc by an engaging structure 30 formed on the inner circumferential side surface 127 and the outer circumferential side surface 146. The engaging structure 30 will be described later.

The stator body portion 145 has a circular shape in a plan view. The outer diameter of the stator body portion 145 is slightly smaller than the inner diameter of the side wall portion 120c and larger than the inner diameter of the stator supporter 120h. When the stator body portion 145 is housed inside the cylindrical body portion 120 so that the stator axis CL3 is coaxial with the axis CL1, there is a slight gap between the outer circumferential side surface 146 and the inner circumferential side surface 127.

The stator body portion 145 has the opening surface 140 on which the rotor 22 described later slides and the supporting surface 143 supported by the stator supporter 120h. The opening surface 140 faces one direction of the axial direction Dra and the supporting surface 143 faces the other direction of the axial direction Dra. The opening surface 140 has a circular edge. The opening surface 140 is a sealing surface facing a sliding surface 220 of the rotor 22, which will be described later. Further, the stator body portion 145 defines a stator insertion hole 142 at a substantially center of the supporting surface 143. When the stator body portion 145 is housed in the cylindrical body portion 120, the housing insertion portion 120i is inserted into the stator insertion hole 142. The edge of the supporting surface 143 has a circular shape. The stator axis CL3 in the present embodiment passes through a geometric center of a figure defined by the edge of the opening surface 140 (circular in the present embodiment) and a geometric center of a figure defined by the edge of the supporting surface 143 (circular in the present embodiment).

The stator 14 is desirably formed of a material having a small linear expansion coefficient and excellent wear resistance as compared to the constituent material of the housing 12. The stator 14 is made of a high hardness material having higher hardness than the housing 12. Specifically, the stator 14 is made of ceramic. In the stator 14, only a portion forming the opening surface 140 may be formed of a material such as ceramic, having a small linear expansion coefficient and excellent wear resistance as compared to the constituent material of the housing 12. Further, the stator 14 may be made of resin or metal as long as it has a smaller linear expansion coefficient and is excellent in wear resistance as compared to the constituent material of the housing 12. Further, the stator 14 may be configured by combining multiple components.

Figure 7:
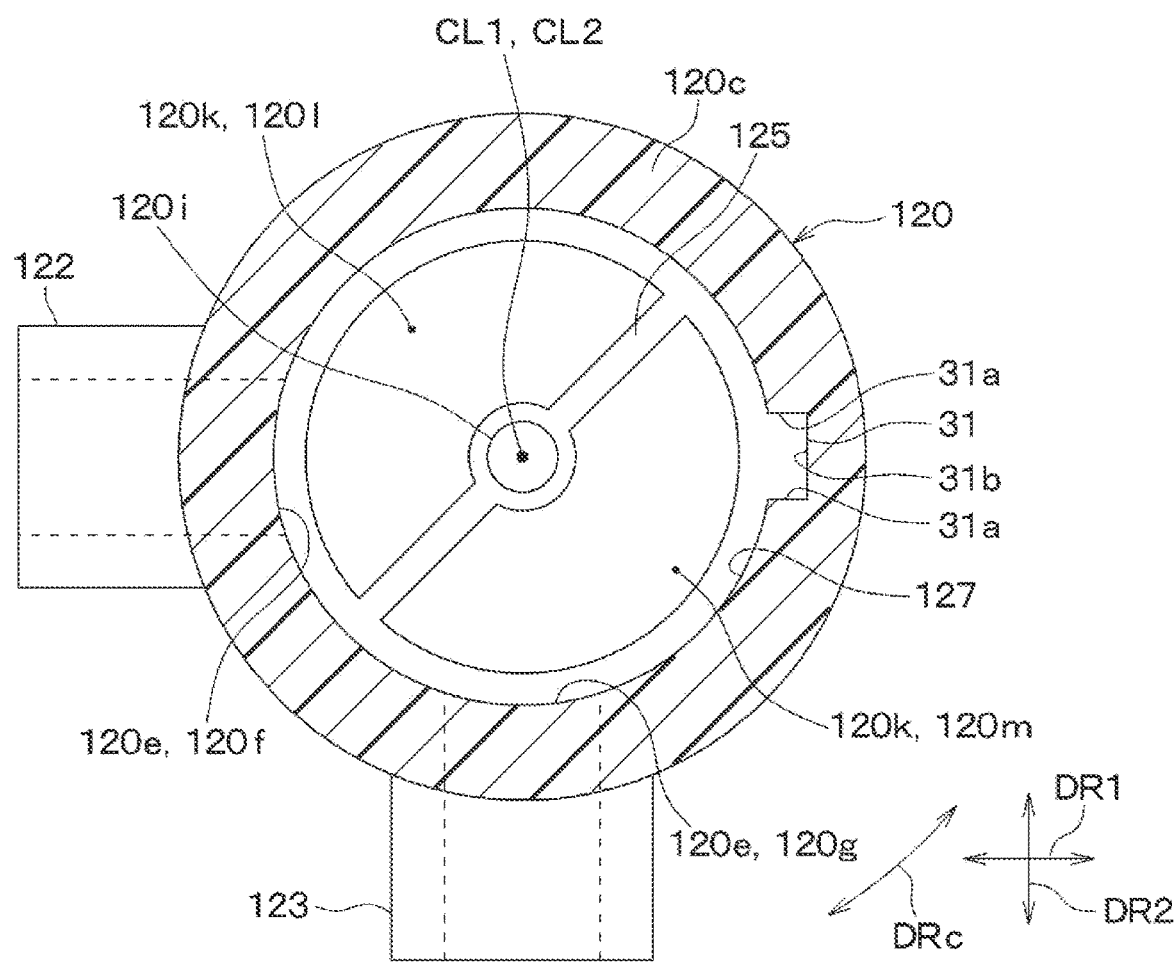
FIG. 7 is a schematic cross-sectional view taken along the line VII-VII in FIG. 3.
Figure 8:
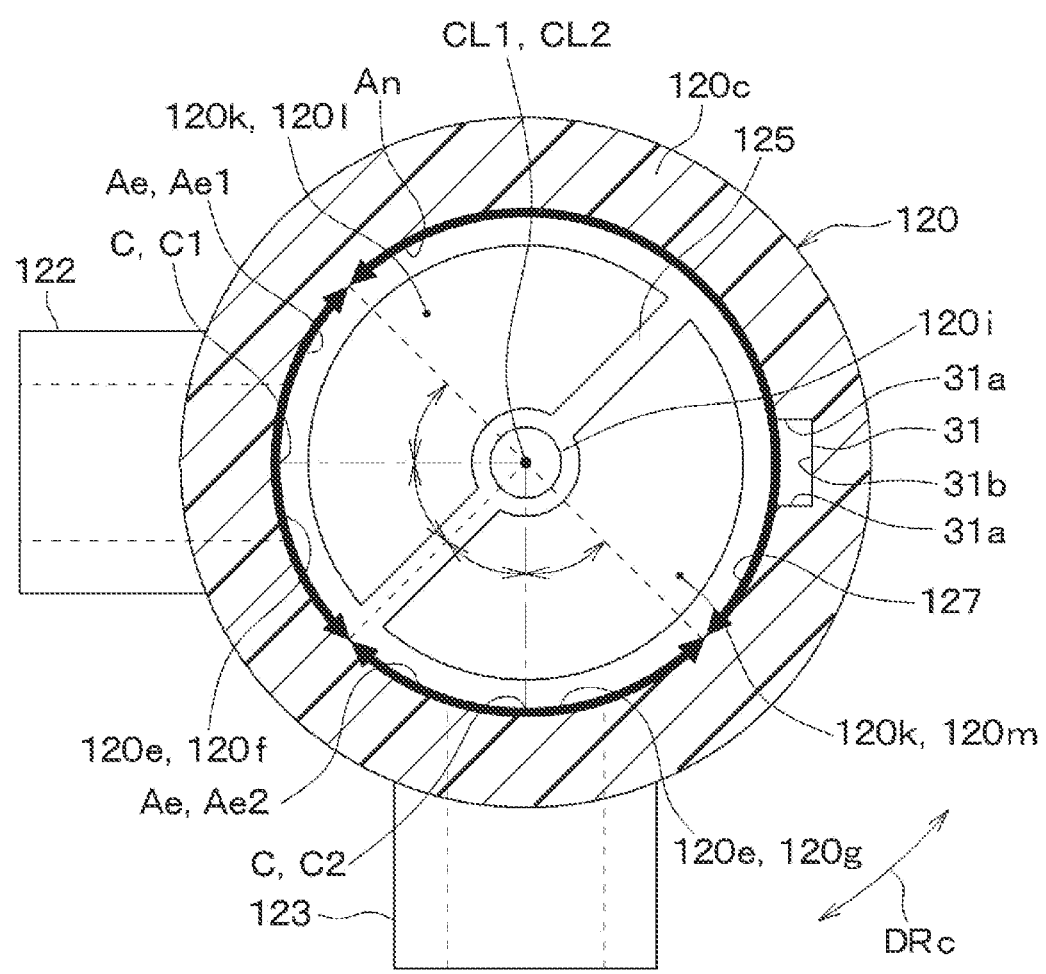
FIG. 8 is a view for explaining a position of an engaging structure of the valve device according to the first embodiment.

The stator 14 constitutes a passage formation part defining a passage hole 141 through which the fluid flows. As shown in FIG. 5, the stator body portion 145 defines a first passage hole 141a and a second passage hole 141b through which the fluid flows. The stator body portion 145 has a thin portion 144 between the first passage hole 141a and the outer circumferential side surface 146 and a thin portion 144 between the second passage hole 141b and the outer circumferential side surface 146. The thin portions 144 shown in FIGS. 5 and 7 are hatched with diagonal lines to facilitate understanding of the thin portions 144 in the drawings.

The first passage hole 141a and the second passage hole 141b are defined at a position of the stator body portion 145 distanced away from the stator axis CL3 not to overlap with the stator axis CL3 and the stator insertion hole 142. The first passage hole 141a and the second passage hole 141b are sector-shaped through holes, and function as communication passages between the inlet-side space 120j and the outlet-side space 120k.

Specifically, the first passage hole 141a is provided at a position of the stator body portion 145 corresponding to the first outlet-side space 120l so as to be in communication with the first outlet-side space 120l. The second passage hole 141b is defined at a position of the stator body portion 145 corresponding to the second outlet-side space 120m so as to be in communication with the second outlet-side space 120m.

The stator body portion 145 includes a first passage curved surface portion 141aa, a first passage flat portion 141ab, a first passage flat portion 141ac, and a first passage center portion 141ad that define the first passage hole 141a. Further, the stator body portion 145 includes a second passage curved surface portion 141ba, a second passage flat portion 141bb, a second passage flat portion 141bc, and a second passage center portion 141bd that define the second passage hole 141b.

The first passage hole 141a is surrounded by the first passage curved surface portion 141aa forming an arc portion of the sector-shape, the first passage flat portions 141ab and 141ac forming straight line portions of the sector-shape, and the first passage center portion 141ad connected to the first passage flat portions 141ab and 141ac.

The first passage curved surface portion 141aa curvedly extends along the circumferential direction DRc. One end of the first passage curved surface portion 141aa in the circumferential direction DRc is connected to the first passage flat portion 141ab and the other end is connected to the first passage flat portion 141ac. The first passage flat portions 141ab and 141ac extend straight from both ends, in the circumferential direction DRc, of the first passage curved surface portion 141aa toward the stator axis CL3. An end of each of the first passage flat portions 141ab and 141ac near the stator axis CL3 is connected to the first passage center portion 141ad. The first passage center portion 141ad is curvedly extends along the circumferential direction DRc from the end of the first passage flat portion 141ac near the stator axis CL3 to the end of the first passage flat portion 141ac near the stator axis CL3. When the stator body portion 145 is inserted into the housing insertion portion 120i, the first passage center portion 141ad is arranged at a position distanced away from the housing insertion portion 120i by a predetermined distance in the radial direction DRr not to overlap with the housing insertion portion 120i.

The second passage hole 141b has substantially the same shape as the first passage hole 141a. The second passage hole 141b is located away from the first passage hole 141a by 90° in the circumferential direction DRc with respect to the stator axis CL3. The second passage hole 141b is surrounded by the second passage curved surface portion 141ba, the second passage flat portions 141bb and 141bc, and the second passage center portion 141bd that correspond respectively to the first passage curved surface portion 141aa, the first passage flat surface portions 141ab and 141ac, and the first passage center portion 141ad.

In the plan view, the first passage hole 141a and the second passage hole 141b are formed such that the lengths of the first passage curved surface portion 141aa, the first passage flat surface portions 141ab and 141ac, and the first passage center portion 141ad are the same respectively as the lengths of the second passage curved surface portion 141ba, the second passage flat portions 141bb and 141bc, and the second passage center portion 141bd. Further, the first passage hole 141a has the same opening area as that of the second passage hole 141b. In the present embodiment, the first passage curved surface portion 141aa and the second passage curved surface portion 141ba correspond to a passage curved surface portion.

The thin portions 144 are portions of the stator body portion 145 located outside of the first passage hole 141a in the radial direction of the stator axis (i.e., in the radial direction DRr) and located outside of the second passage hole 141b in the radial direction of the stator axis CL3 (i.e., in the radial direction DRr). Each of the thin portions 144 is an arch-shaped plate member extending along the circumferential direction DRc and having a thickness in the radial direction DRr. Each of the thin portions 144 forms a part of the outer circumferential side surface 146. The thickness of each of the thin portions 144 in the radial direction DRr is as thin as possible to secure an enough opening area of the first passage hole 141a while securing an enough strength of the stator body portion 145.

The driving portion 16 is a device for outputting rotational force. The driving portion 16 includes a motor 161 as a driving source and a gear unit 162 as a power transmission member that transmits the output of the motor 161 to the shaft 20.

The motor 161 is a drive source that rotates by receiving power supply. As the motor 161, for example, a DC motor or a stepping motor is adopted. The motor 161 rotates in accordance with control signals from a valve controller 17 electrically coupled to the motor 161.

The valve controller 17 is a computer having a memory that is a non-transitory tangible storage medium, a processor, and the like. The valve controller 17 executes a computer program stored in the memory and executes various control processing in accordance with the computer program.

The gear unit 162 has a plurality of gears. The gear unit 162 transmits the rotational operation of the motor 161 to the rotating portion 18 by the meshing of the plurality of gears to rotate the rotating portion 18. Specifically, the gear unit 162 transmits the rotational operation of the motor 161 to the shaft 20 of the rotating portion 18 to rotate the shaft 20 and the rotor 22 constituting the rotating portion 18.

Further, the gear unit 162 is set at an optimum reduction ratio according to the configuration of the gears so that a sufficient rotational force can be transmitted to the shaft 20 and the rotor 22. For example, it is desirable that the reduction ratio R of the gear unit 162 composed of the gears is set to satisfy $300 \leq R \leq 700$. Furthermore, it is desirable that the reduction ratio R of the gear unit 162 composed of the gears falls within a range of 450≤R≤550. The gear unit 162 of the present embodiment is formed of a gear mechanism including a helical gear or a spur gear as a gear.

In the valve device 10, the rotating portion 18 rotates about the axis CL1 of the shaft 20 by the output of the driving portion 16. The rotating portion 18 includes the shaft 20, the rotor 22 as a valve body, and an intermediate element 24 that couples the rotor 22 to the shaft 20.

The shaft 20 is a rotational shaft that rotates about the predetermined axis CL1, which is an axis of the shaft 20, by a rotational force output by the driving portion 16. The shaft 20 extends along the axial direction DRa. The shaft 20 has one end portion 20a, in the axial direction DRa, to which the rotational force is transmitted from the driving portion 16, and the other end portion 20b that is opposite to the one end portion 20a in the axial direction DRa. The one end portion 20a is connected to the gear unit 162. The other end portion 20b is connected to the rotor 22 via the intermediate element 24 so as to be relatively non-rotatable.

The one end portion 20a of the shaft 20 is rotatably supported by one end bearing portion 126 disposed at the main body cover 124 and the other end portion 20b of the shaft 20 is non-rotatably supported by the intermediate element 24.

The rotor 22 is a valve body that increases or decreases the opening degree of the first passage hole 141a and the opening degree of the second passage hole 141b by rotating about the predetermined axis CL1 along with the rotation of the shaft 20. The rotor 22 is arranged so that the rotational axis of the rotor 22 is coaxial with the predetermined axis CL1. The opening degree of the first passage hole 141 is a degree to which the first passage hole 141 is opened, and the full opening and the full closing of the first passage hole 141 are expressed as 100% and 0%, respectively. The full opening of the first passage hole 141 is, for example, a state where the first passage hole 141 is not closed by the rotor 22 at all. The fully closing of the first passage hole 141 is, for example, a state where the entire first passage hole 141 is closed by the rotor 22. The opening degree of the second passage hole 141b is similar to the opening degree of the first passage hole 141.

The rotor 22 has a circular shape in a plan view, and is formed of a disk-shaped member having the thickness direction in the axial direction DRa. The rotor 22 is disposed in the inlet-side space 120j to face the stator 14 in the axial direction DRa. The rotor 22 has the sliding surface 220 facing the opening surface 140 of the stator 14, and defines a rotor insertion hole 222 at a substantially center portion of the sliding surface 220. The housing insertion portion 120i is inserted into the rotor insertion hole 222. When the rotor 22 is housed inside the cylindrical body portion 120, the housing insertion portion 120i is inserted into the rotor insertion hole 222.

Here, the sliding surface 220 is circular, and the distance from the center of the sliding surface 220 located on the predetermined axis CL1 to the outer edge forming the outer circumferential portion of the sliding surface 220 is substantially the same over the entire circumference. Further, the opening surface 140 of the stator body portion 145 that slides on the sliding surface 220 is circular, and the distance from the center of the opening surface 140 located on the stator axis CL3 to the outer circumferential portion of the opening surface 140 is the same over the entire circumference. The sliding surface 220 is formed so that the maximum value of the distance from the center of the sliding surface 220 to the outer edge of the sliding surface 220 is equal to or less than the minimum value of the distance from the center of the opening surface 140 to the outer edge of the opening surface 140.

Further, the rotor 22 is formed in a disk shape so that the distance from the center of the sliding surface 220 to the outer edge of the sliding surface 220 is equal to the distance from the predetermined axis CL1 to the outer circumferential portion of the rotor 22. Further, the stator body portion 145 is formed in a disk shape, and the distance from the center of the opening surface 140 to the outer edge of the opening surface 140 is the same as the distance from the stator axis CL3 to the outer circumferential portion of the stator body portion 145. That is, in the stator 14, the minimum value of the distance from the stator axis CL3 to the outer circumferential portion of the stator body portion 145 is equal to or greater than the maximum value of the distance from the predetermined axis CL1 to the outer circumferential portion of the rotor 22. In the present embodiment, the outer diameter of the sliding surface 220 is formed to be slightly smaller than the outer diameter of the stator body portion 145.

The rotor 22 is desirably formed of a material having a small linear expansion coefficient and excellent wear resistance as compared to the constituent material of the housing 12. The rotor 22 is made of a high hardness material having higher hardness than the housing 12. Specifically, the rotor 22 is made of ceramic. In the rotor 22, only a portion forming the sliding surface 220 may be formed of a material, such as ceramic, having a small linear expansion coefficient and excellent wear resistance as compared to the constituent material of the housing 12. Further, the rotor 22 may be made of resin or metal as long as it has a smaller linear expansion coefficient and is excellent in wear resistance as compared to the constituent material of the housing 12. Further, the rotor 22 may be formed by combining a plurality of components.

As shown in FIG. 5, the rotor 22 defines a rotor hole 221 at a position offset from the axis CL1 of the shaft 20. The rotor hole 221 is a through hole passing through the rotor 22 in the axial direction DRa. The rotor hole 221 is formed at a portion of the rotor 22 that overlaps the first passage hole 141a and the second passage hole 141b in the axial direction DRa when rotating about the shaft 20.

In the valve device 10, when the rotor 22 is rotated such that the rotor hole 221 overlaps the first passage hole 141 in the axial direction DRa, the first passage hole 141 is opened. In the valve device 10, when the rotor 22 is rotated such that the rotor hole 221 overlaps the second passage hole 141b in the axial direction DRa, the second passage hole 141b is opened.

The rotor 22 is configured to adjust a flow rate ratio of the fluid passing through the first passage hole 141 and the fluid passing through the second passage hole 141b. That is, the rotor 22 is configured such that the opening degree of the second passage hole 141b decreases as the opening degree of the first passage hole 141 increases.

The intermediate element 24 constitutes a part of a coupling structure that couples the rotor 22 to the shaft 20. The intermediate element 24 also functions as a rotation-prevention mechanism that prevents the rotation of the rotor 22. The intermediate element 24 couples the rotor 22 to the shaft 20 such that a gap is defined between the other end portion 20b and the rotor 22. The intermediate element 24 is provided between the rotor 22 and the one end portion 20a in the axial direction DRa.

The intermediate element 24 has an intermediate tubular portion 241 surrounding the shaft 20 and two intermediate pins 242 protruding from the intermediate tubular portion 241 toward the rotor 22 in the axial direction DRa. The intermediate tubular portion 241 is coupled to the shaft 20 by coupling means such as press-fitting, fitting, or bonding so as to be rotatable together with the shaft 20. The intermediate pins 242 are members that transmit the rotation of the shaft 20 to the rotor 22. The intermediate pins 242 can be fit into pin receiving portions 223 formed on the surface of the rotor 22 opposite to the sliding surface 220.

The intermediate element 24 configured as described above is configured to prevent the rotation of the rotor 22 by fitting the intermediate pins 242 into the pin receiving portions 223. The rotation-prevention mechanism of the rotor 22 is not limited to the above-described one but may be achieved by another means.

Figure 6:
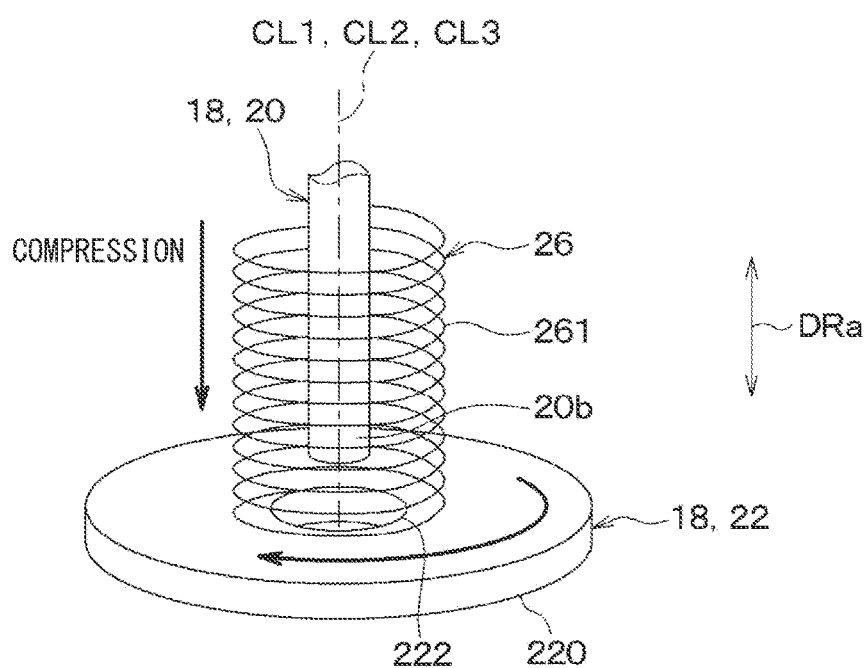
FIG. 6 is a view for explaining an elastic member of the valve device according to the first embodiment.

The elastic member 26 is a member that biases the rotor 22 toward the stator 14 corresponding to the passage formation portion. As illustrated in FIG. 6, the elastic member 26 is formed of a coil-shaped compression spring 261 that applies a compressive load to the rotor 22. The compression spring 261 elastically deforms in the axial direction DRa of the shaft 20.

The compression spring 261 is formed by being wound around the axis CL of the shaft 20. That is, the shaft 20 is disposed inside the compression spring 261. The compression spring 261 is compressed between the driving portion 16 and the rotor 22.

Specifically, the compression spring 261 is disposed inside the housing 12 such that one end of the compression spring 261 in the axial direction DRa is in contact with the main body cover 124 and the other end of the compression spring 261 in the axial direction DRa is in contact with the rotor 22. The compression spring 261 is not fixed to at least one of the rotor 22 and the main body cover 124 so as not to function as a torsion spring.

As the compression spring 261, a spring having close ends at both ends is employed so as to be hardly inclined with respect to the axis CL of the shaft 20. In the closed-ended spring, the winding angle of only a winding at the spring end is changed, and the end of the spring wire is attached to the adjacent winding so as to improve the installation of the spring. As the compression spring 261, a spring having open ends at both ends may be employed.

The compression spring 261 presses the rotor 22 against the stator 14, whereby a contact state between the opening surface 140 of the stator 14 and the sliding surface 220 of the rotor 22 is kept. This contact state is a state where the opening surface 140 of the stator 14 and the sliding surface 220 of the rotor 22 are in surface contact.

Subsequently, the engaging structure 30 formed on the inner circumferential side surface 127 and the outer circumferential side surface 146 of the present embodiment will be described with reference to FIGS. 7 to 10. Note that illustrations of the stator 14 housed inside the housing 12 are omitted in FIGS. 7 and 8 in order to clearly illustrate the engaging structure 30.

As shown in FIG. 7, the cylindrical body portion 120 has a radial cross section having a cylindrical shape, and the wall thickness of the side wall portion 120c is substantially equal in the circumferential direction DRc. That is, in the cylindrical body portion 120, each axis of the outer circumferential portion and the inner circumferential side surface 127 of the cylindrical body portion 120 is not offset from the housing axis CL2. Each axis of the outer circumferential portion and the inner circumferential side surface 127 of the cylindrical body portion 120 is coaxial with the housing axis CL2.

Further, the inner circumferential side surface 127 defines a single engaging recess 31 recessed from the inner circumferential side surface 127 in a direction away from the housing axis CL2. The engaging recess 31 has a substantially rectangular shape in a plan view. In other words, the cross-sectional shape of the engaging recess 31 on the surface perpendicular to the housing axis CL2 is substantially rectangular. The engaging recess 31 includes two recess side surface portions 31a extending outward from the inner circumferential surface of the side wall portion 120c and a recess circumferential surface portion 31b connected to ends of the two recess side surface portions 31a.

The engaging recess 31 is recessed in the radial direction of the housing axis CL2 (that is, the radial direction DRr). Here, the direction from the housing axis CL2 toward the engaging recess 31 (that is, the direction in which the engaging recess 31 is recessed) is defined as the first direction DR1, and the direction perpendicular to both the first direction DR1 and the housing axis CL2 is defined as the second direction DR2. Each of the two recess side surface portions 31a extends in a planer manner along the first direction DR1 and is parallel to each other. Each of the recess side surface portions 31a has an end in the first direction DR1 away from the housing axis CL2 that is connected to the recess circumferential surface portion 31b.

The recess circumferential surface portion 31b has a flat shape and extends along the second direction DR2 from one of the recess side surface portions 31a to the other. The dimension of the recess circumferential surface portion 31b in the second direction DR2 is larger than the dimension of each of the recess side surface portions 31a in the first direction DR1. In the present embodiment, the dimension of the recess circumferential surface portion 31b in the second direction DR2 is about twice the dimension of each of the recess side surface portions 31a in the first direction DR1.

In other words, the engaging recess 31 is formed such that the dimension of each of the recess side surface portions 31a that defines a depth of the engaging recess 31 in a direction from an inside to an outside of the side wall portion 120c (i.e., the first direction DR1) is about one second of the thickness of the side wall portion 120c. The dimension of the engaging recess 31 in the first direction DR1 may be less than one second of the thickness of the side wall portion 120c or greater than one second of the thickness of the side wall portion 120c.

Further, the engaging recess 31 is disposed at a position offset from the outlet opening 120e in the circumferential direction of the housing axis CL2. In other words, when the inner circumferential side surface 127 is divided into a region where the outlet opening 120e is defined and a region where the outlet opening 120e is not defined, the engaging recess 31 is formed in the region where the outlet opening 120e is not defined. The position of the engaging recess 31 will be described with reference to FIG. 8.

The inner circumferential side surface 127 can be divided into the region where the outlet opening 120e is defined and the region where the outlet opening 120e is not defined by an arc forming a part of a circle centered on the housing axis CL2. Hereinafter, the region where the outlet opening 120e is defined is also referred to as an outlet region Ae, and the region where the outlet opening 120e is not defined is also referred to as a non-outlet region An.

For example, the outlet region Ae can be defined in a predetermined area on the inner circumferential side surface 127 with the center C of the outlet opening 120e in the circumferential direction DRc set as a starting point. Specifically, the outlet region Ae can be set as an area between points that are away from the center C of the outlet opening 120*e* in both directions of the circumferential direction DRc. The points are distanced from the center C by a predetermined angle relative to the housing axis CL2 as a center of rotation.

In the present embodiment, the first outlet region Ae1 is located between points away from the center C1 of the first outlet opening 120*f* in the circumferential direction DRc by 45° relative to the housing axis CL2 as the center of rotation. That is, the first outlet region Ae1 is a region set by an arc portion in which the center of the circle is the housing axis CL2 and the central angle is 90°. Further, the first outlet region Ae1 is a region in which the center of the arc portion corresponds to the center C1 of the first outlet opening 120*f* in the circumferential direction DRc.

Further, the second outlet region Ae2 is located between points away from the center C2 of the second outlet opening 120*g* in the circumferential direction DRc by 45° relative to the housing axis CL2 as the center of rotation. That is, the second outlet region Ae2 is a region set by an arc portion in which the center of the circle is the housing axis CL2 and the central angle is 90°. Further, the second outlet region Ae2 is a region in which the center of the arc portion corresponds to the center C2 of the second outlet opening 120*g* in the circumferential direction DRc.

Here, the predetermined angle when defining the range of the outlet region Ae can be arbitrarily set depending on the quantity and size of the passage hole 141 and the outlet-side space 120*k*. For example, if the predetermined angle is within the range in which the inner circumferential side surface 127 is formed (that is, the range larger than 0° and smaller than 360°), the predetermined angle may be set as an angle different from 45° in both directions from the center C of the outlet opening 120*e* in the circumferential direction DRc. Further, as the predetermined angle, an angle from the center C of the outlet opening 120*e* in one direction of the circumferential direction DRc may be different from an angle from the center C in the other direction of the circumferential direction DRc.

Further, in the present embodiment, the region of the inner circumferential side surface 127 different from the first outlet region Ae1 and the second outlet region Ae2 is a region where the engaging recess 31 is formed. That is, in the present embodiment, when the region is referred to as the non-outlet region An, the engaging recess 31 is arranged in the non-outlet region An which is a region facing the first outlet region Ae1 and the second outlet region Ae2.

Further, the engaging recess 31 may be located at a position that is different from a portion interposed between the predetermined axis CL1 and the outlet opening 120*e* in the radial direction of the housing axis CL2 and that faces the outlet opening 120*e*. For example, in the present embodiment, the engaging recess 31 is formed in a portion of the non-outlet region An facing the first outlet opening 120*f* in the radial direction of the housing axis CL2. In other words, the engaging recess 31 is formed in the non-outlet region An at a position opposite to the portion where the first outlet opening 120*f* is formed with respect to the housing axis CL2. The engaging recess 31 may be formed in a portion of the non-outlet region An facing the second outlet opening 120*g* in the radial direction of the housing axis CL2. That is, the engaging recess 31 may be formed in the non-outlet region An at a position opposite to the portion where the second outlet opening 120*g* is formed with respect to the housing axis CL2.

Further, the engaging recess 31 extends in the axial direction DRa from the opening portion 120*a* to the stator supporter 120*h* supporting the supporting surface 143 of the stator 14. The engaging recess 31 is formed so as to receive an engaging protrusion 32 formed on the outer circumferential side surface 146 when the stator 14 is arranged inside the cylindrical body portion 120.

Figure 9:
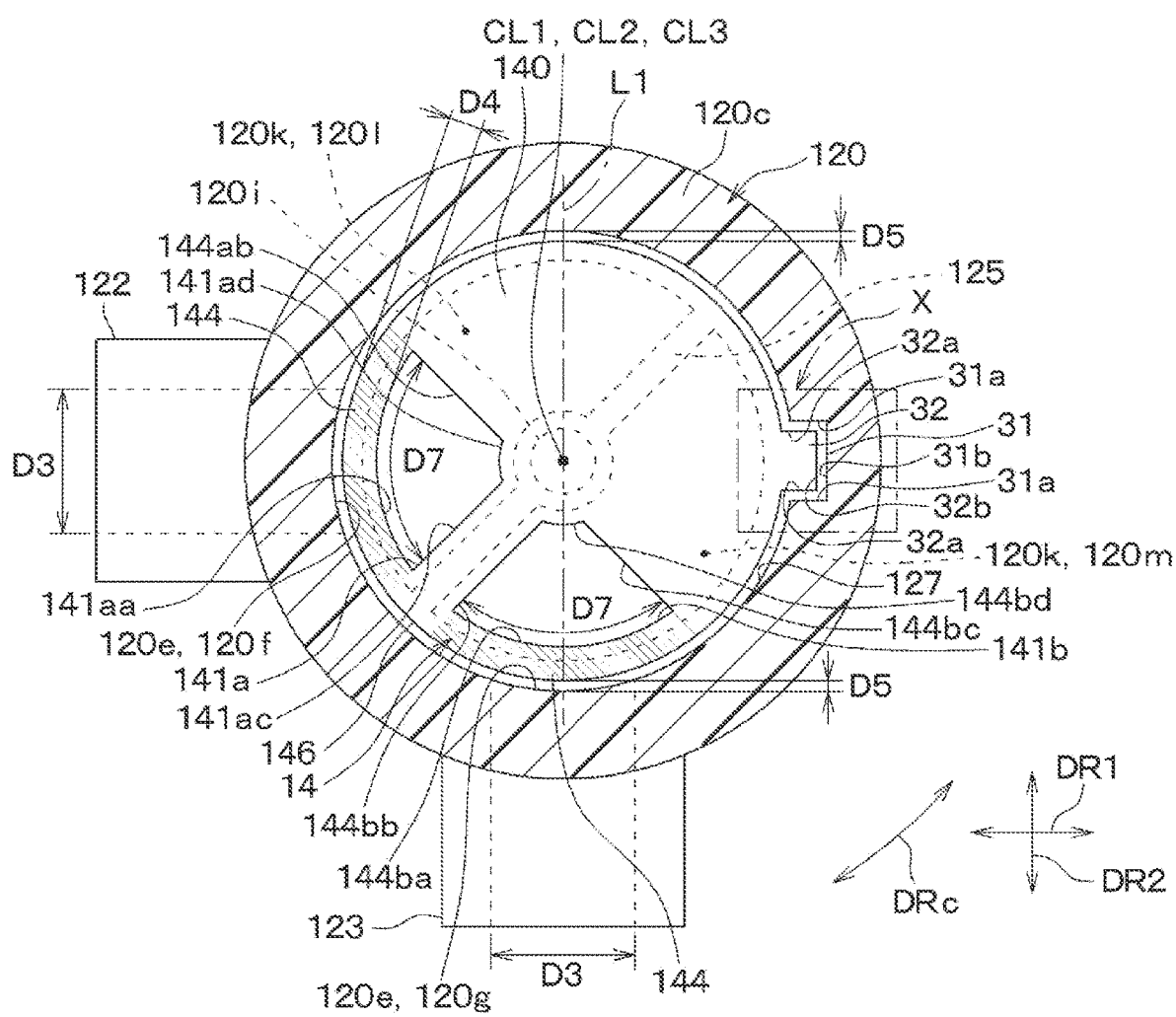
FIG. 9 is a cross-sectional view taken along the line IX-IX of FIG. 3.
Figure 10:
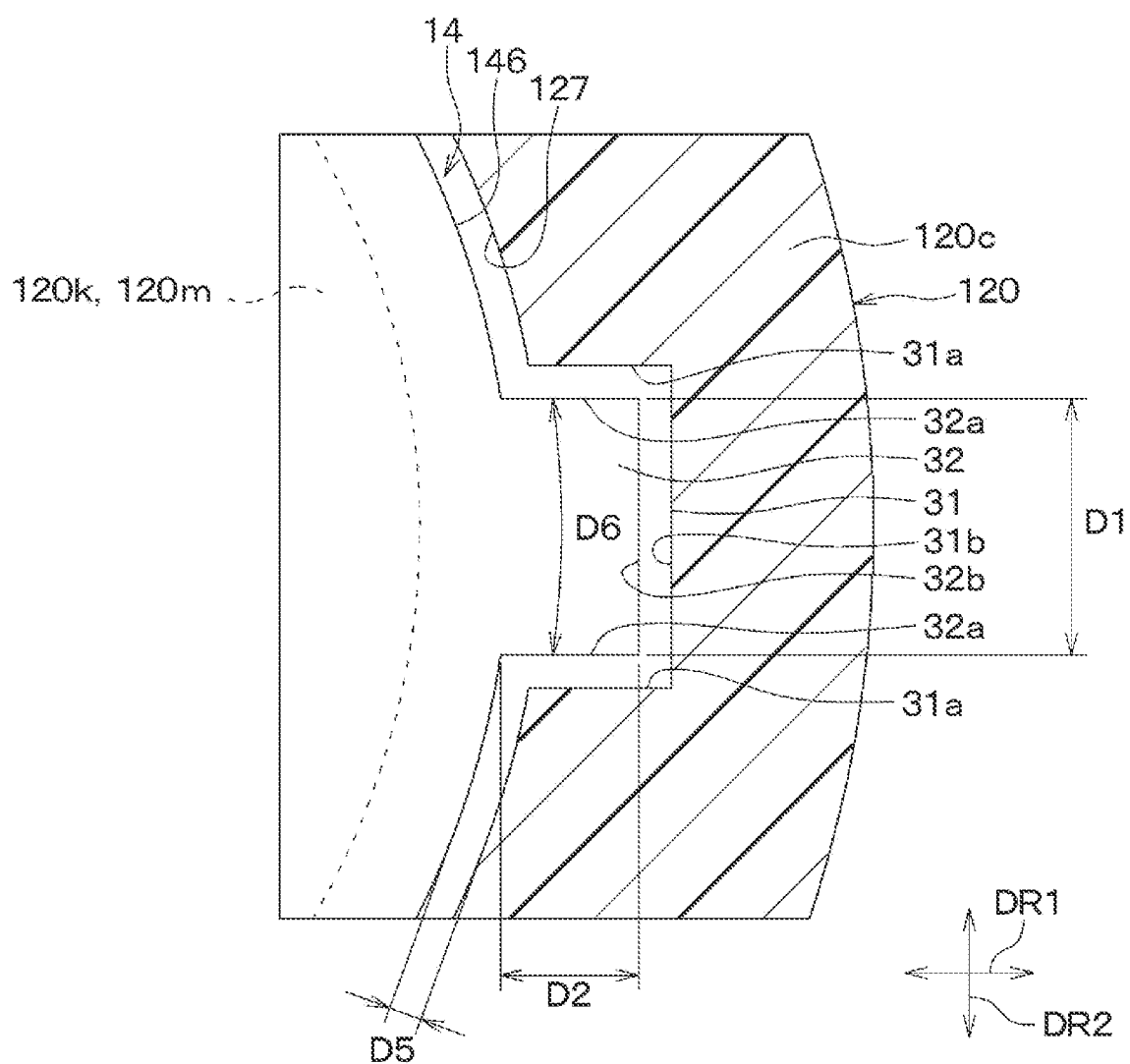
FIG. 10 is an enlarged view of a part X of FIG. 9.
Figure 11:
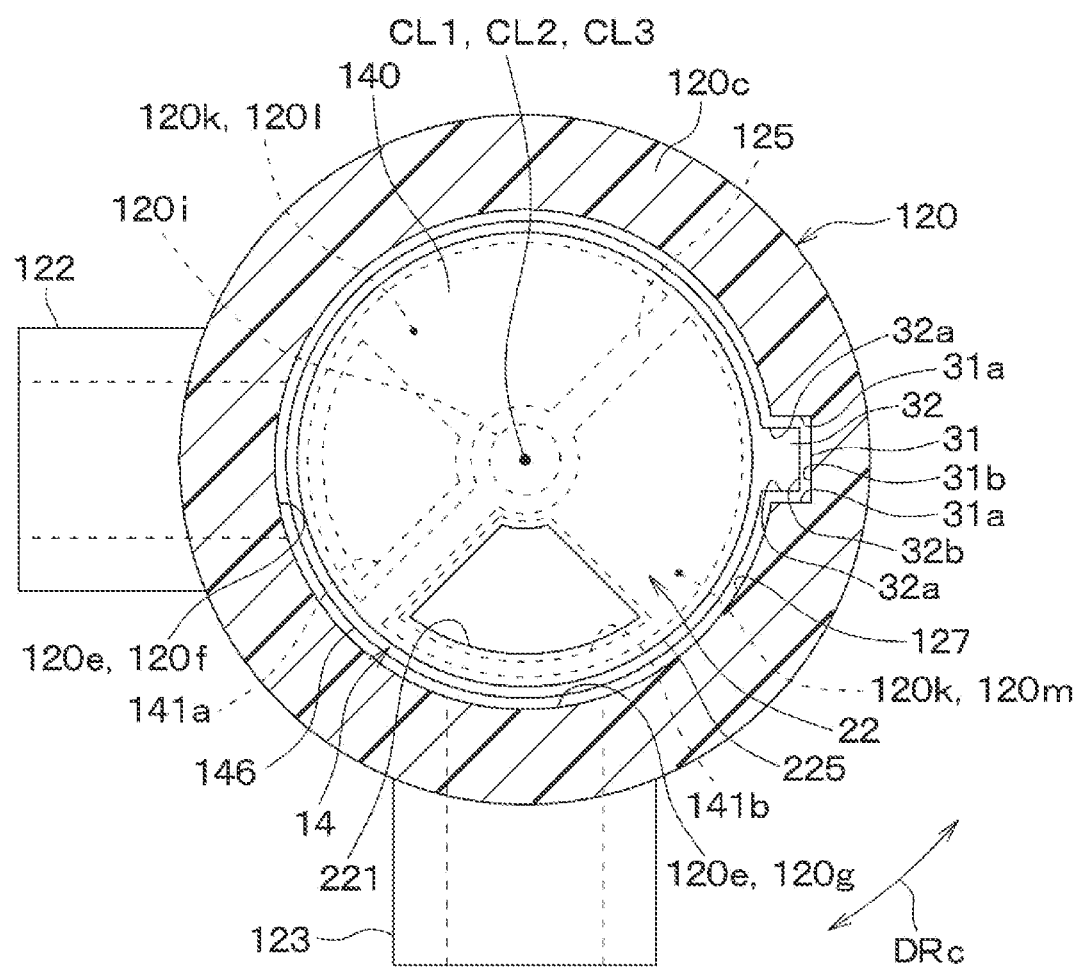
FIG. 11 is a schematic cross-sectional view taken along the line XI-XI of FIG. 3.

Subsequently, a state in which the stator 14 is housed inside the housing 12 will be described with reference to FIGS. 9 to 11. In FIGS. 9 to 11, illustrations of the rotating portion 18 and the elastic member 26 housed inside the housing 12 are omitted in order to clearly illustrate the engaging protrusion 32.

As shown in FIG. 9, the outer circumferential side surface 146 has the single engaging protrusion 32 protruding from the outer circumferential side surface 146 in a direction away from the stator axis CL3. The engaging protrusion 32 is formed at a position facing the engaging recess 31 in the radial direction of the housing axis CL2 when the stator 14 is housed in the cylindrical body portion 120. That is, the engaging protrusion 32 is arranged at a position overlapping the non-outlet region An in the radial direction of the housing axis CL2. In other words, the engaging protrusion 32 is formed at a position away from the first passage hole 141*a* and the second passage hole 141*b*.

Further, the engaging protrusion 32 protrudes from the outer circumferential side surface 146 toward the inner circumferential side surface 127 along the radial direction of the stator axis CL (that is, the radial direction DRr). Specifically, the engaging protrusion 32 protrudes in an opposite direction to a direction from the stator axis CL3 toward the first outlet opening 120*f*. The opposite direction to the direction from the stator axis CL3 toward the first outlet opening 120*f* corresponds to the first direction DR1. The engaging protrusion 32 has a substantially rectangular shape in a plan view (that is, the cross-sectional shape of the engaging protrusion 32 on the surface perpendicular to the stator axis CL3 is substantially rectangular). The engaging protrusion 32 has two protrusion side surface portions 32*a* facing the recess side surface portions 31*a* and a protrusion outer surface portion 32*b* facing the recess side surface portion 31*a*.

Each of the two protrusion side surface portions 32*a* extends in a planer manner along the first direction DR1 that is a protruding direction of the engaging protrusion 32. The two protrusion side surface portions 32*a* are parallel with each other and parallel with the recess side surface portions 31*a* facing with each other. Each of the two protrusion side surface portions 32*a* has an end in the first direction DR1 away from the stator axis CL2 that is connected to the protrusion outer surface portion 32*b*.

The protrusion outer surface portion 32*b* extends in a planer manner along the second direction DR2 between one of the protrusion side surface portions 32*a* to the other of the protrusion side surface portions 32*a*. Further, the protrusion outer surface portion 32*b* is parallel to the recess circumferential surface portion 31*b*. Then, as shown in FIG. 10, the dimension D1 of the protrusion outer surface portion 32*b* in the second direction Dr2 is larger than the dimension D2 of each of the two protrusion side surface portions 32*a* in the first direction DR1. In the present embodiment, the dimension D1 of the protrusion outer surface portion 32*b* in the second direction DR2 is substantially twice the dimension D2 of each of the two protrusion side surface portions 32*a* in the first direction DR1.

Further, the dimension D1 of the protrusion outer surface portion 32*b* in the second direction DR2 is less than the inner diameter D3 of each of the first outlet opening 120*f* and the second outlet opening 120*g* as shown in FIG. 9. The dimension D2 of each of the protrusion side surface portions 32a in the first direction DR1 is substantially the same as the thickness D4 of each of the thin portions 144 in the radial direction DRr.

Further, a dimension of each of the protrusion side surface portions 32a in a direction from the inside to the outside of the side wall portion 120c (i.e., the first direction DR1) is smaller than the dimension of each of the recess side surface portions 31a in the first direction DR1 such that the engaging protrusion 32 is able to be engaged with the engaging recess 31. Further, the engaging protrusion 32 is formed so that the distance between the protrusion side surface portions 32a facing each other is smaller than the distance between the recess side surface portions 31a facing each other. In other words, the dimension of the protrusion outer surface portion 32b in the second direction DR2 is larger than the dimension of the recess circumferential surface portion 31b in the second direction DR2.

The engaging protrusion 32 is formed such that the dimension D2 of each of the protrusion side surface portions 32a in the first direction DR1 is at least twice the dimension D5 of the gap between the outer circumferential side surface 146 and the inner circumferential side surface 127. In other words, when a virtual line L1 is defined as a line extending along the radial direction DRr not to pass through the engaging recess 31, two gaps are defined on the virtual line L1 between the outer circumferential side surface 146 and the inner circumferential side surface 127. The gaps are defined on both sides of the housing axis CL2. The dimension D2 of each of the protrusion side surface portions 32a is equal to or larger than a total of the dimensions D5 of the two gaps. In the present embodiment, the dimension D2 of each of the protrusion side surface portions 32a is formed to be about three times as large as the dimension D5 of the gap.

Further, the dimension D6 of the engaging protrusion 32 in the circumferential direction of the stator axis CL3 (that is, the circumferential direction DRc) is less than the dimension of each of the first passage hole 141a and the second passage hole 141b in the circumferential direction DRc. Specifically, the dimension D6 of the engaging protrusion 32 is less than the dimension D7 of each of the first passage curved surface 141aa and the second passage curved surface 141ba in the circumferential direction DRc that is shown in FIG. 9.

Further, the dimension of the engaging protrusion 32 in the axial direction DRa is substantially the same as the dimension of the stator 14 in the axial direction DRa to have an enough size to restrict the stator 13 from moving in the circumferential direction DRc.

As described above, the engaging structure 30 is formed of the engaging protrusion 32 formed on the outer circumferential side surface 146 and the engaging recess 31 formed on the inner circumferential side surface 127. Then, in the engaging structure 30, the engaging protrusion 32 is engaged with the engaging recess 31, so that even if the rotor 22 rotates, one of the protrusion side surface portions 32a comes into contact with the facing recess side surface portion 31a. Thus, the movement of the stator 14 in the circumferential direction DRc can be restricted.

Subsequently, a state in which the stator 14 and the rotor 22 are housed inside the housing 12 will be described with reference to FIG. 11. In FIG. 11, illustrations of the shaft 20 housed inside the housing 12, the elastic member 26, and the pin receiving portions 223 are omitted.

As shown in FIG. 11, the rotor 22 is arranged so that the predetermined axis CL1 is coaxial with the housing axis CL2. Further, the rotor 22 is formed so that the outer diameter of the rotor 22 is smaller than the outer diameter of the stator body portion 145. Therefore, in the radial direction DRr of the predetermined axis CL1, the engaging protrusion 32 formed on the outer circumferential side surface 146 is located radially outward of the rotor outer circumferential surface 225 that forms outer circumference of the rotor 22.

Next, the operation of the valve device 10 of the present embodiment will be described. In the valve device 10, as illustrated in FIGS. 3 and 5, the fluid flows from the inlet portion 121 into the inlet-side space 120j as indicated by an arrow Fi. When the first passage hole 141a is open, the fluid flows from the inlet-side space 120j to the first outlet-side space 120l via the first passage hole 141a. The fluid flowing into the first outlet-side space 120l flows out of the first outlet-side space 120l through the first outlet portion 122 as indicated by an arrow Flo. In this case, the flow rate of the fluid passing through the first passage hole 141a is determined in accordance with the opening degree of the first passage hole 141a. That is, the flow rate of the fluid flowing from the inlet portion 121 to the first outlet portion 122 via the first passage hole 141a increases as the opening degree of the first passage hole 141a increases.

On the other hand, when the second passage hole 141b is open, the fluid flows from the inlet-side space 120j into the second outlet-side space 120m via the second passage hole 141b. The fluid flowing into the second outlet-side space 120m flows out of the second outlet-side space 120m to the outside of the valve device 10 via the second outlet portion 123 as indicated by an arrow F2o. In this case, the flow rate of the fluid passing through the second passage hole 141b is determined in accordance with the opening degree of the second passage hole 141b. That is, the flow rate of the fluid flowing from the inlet portion 121 to the second outlet portion 123 via the second passage hole 141b increases as the opening degree of the second passage hole 141b increases.

In the valve device 10 of the present embodiment described above, the rotor 22 rotates about the predetermined axis CL2 along with the rotation of the shaft 20 while sliding on the opening surface 140 of the stator 14. Further, the gear unit 162 is configured to have an optimum reduction ratio by the gears in order to generate a sufficient rotational force in the rotor 22. Therefore, when the rotor 22 slides on the stator 14 and rotates, the rotational force is easily transmitted to the stator 14 via the rotor 22.

Here, in the valve device 10, if the stator 14 is displaced in the circumferential direction DRc along with the rotation of the rotor 22, the overlapping area of the passage hole 141 and the rotor hole 221 may be displaced. Further, the degree in which the overlapping area between the passage hole 141 and the rotor hole 221 is displaced increases as the distance from the predetermined axis CL1 increases.

In contrast, in the valve device 10 of the present disclosure, the outer circumferential side surface 146 and the inner circumferential side surface 127 can be engaged with each other by the engaging structure 30 formed of the engaging recess 31 and the engaging protrusion 32. Thus, the movement of the stator 14 in the circumferential direction DRc is restricted. Therefore, the valve device 10 can increase the distance from the predetermined axis CL1 to the engaging structure 30 as compared with the case where the engaging structure 30 is formed radially inward of the outer circumferential side surface 146. Therefore, the valve device 10 can suppress the misalignment of the stator 14 in the circumferential DRc due to the fitting tolerance between the stator 14 and the housing 12.

Further, since the valve device 10 can reduce the misalignment of the stator 14 in the circumferential DRc due to the fitting tolerance between the stator 14 and the housing 12, it is possible to reduce the influence of the processing accuracy on the outer circumferential side surface 146. Therefore, high-accuracy machining is not necessary when manufacturing the stator 14 in the valve device 10.

Further, in the valve device 10, since the engaging protrusion 32 protrudes from the outer circumferential side surface 146 toward the inner circumferential side surface 127, the distance between the center of the stator 14 and the engaging structure 30 can be increased compared with a case where the outer circumferential side surface 146 has the engaging recess 31. Therefore, in the valve device 10, the misalignment of the stator 14 in the circumferential direction DRc due to the fitting tolerance between the stator 14 and the housing 12 can be reduced compared to the case where the outer circumferential side surface 146 has the engaging recess 31 and the inner circumferential side surface 127 has the engaging protrusion 32.

Further, in the valve device 10, the dimension D2 of each of the protrusion side surface portions 32a is at least twice the dimension D5 of the gap. Therefore, even if the stator axis CL3 is offset from the predetermined axis CL1 so that the engaging protrusion 32 is away from the engaging recess 31 due to a sliding between the rotor 22 and the stator 14, the protrusion side surface portions 32a can be reliably brought into contact with the recess side surface portions 31a.

By the way, when the protrusion side surface portions 32a come into contact with the recess side surface portions 31a, a shearing force in the circumferential direction DRc is generated on the engaging protrusion 32. Thus, it is desired that the dimension D1 of the protrusion outer surface portion 32b is as large as possible from the viewpoint of preventing damage. In the present embodiment, in the valve device 10, the dimension D1 of the protrusion outer surface portion 32b is larger than the dimension D2 of each of the protrusion side surface portions 32a. Therefore, the engaging protrusion 32 is less likely to be damaged by the shearing force generated on the engaging protrusion 32 when the protrusion side surface portions 32a come into contact with the recess side surface portions 31a, compared with the case the dimension D1 of the protrusion outer surface portion 32b is less than the dimension D2 of each of the protrusion side surface portions 32a.

Further, in the valve device 10, it is desired that the dimension D1 of the protrusion outer surface portion 32b is as large as possible from the viewpoint of preventing damage. However, the larger the dimension D1, the larger the dimension D6 in the circumferential direction DRc. The larger the dimension D6, the larger the manufacturing error in the dimension of the engaging protrusion 32 in the circumferential direction DRc. This causes a large misalignment of the overlapping area between the rotor hole 221 and each of the first passage hole 141a and the second passage hole 141b. The larger the manufacturing error in the dimension of the engaging protrusion 32 in the circumferential DRc compared to that in the dimension of the first passage hole 141a and the second passage hole 141b in the circumferential direction DRc, the larger the misalignment of the overlapping area.

On the other hand, in the engaging protrusion 32, the dimension D6 of the engaging protrusion 32 is less than the dimension D7 of each of the first passage curved surface portion 141aa and the second passage curved surface portion 141ba. Therefore, the manufacturing errors in the dimension D6 of the engaging protrusion 32 can be easily reduced compared to the case where the dimension D6 of the engaging protrusion 32 is larger than the dimension D7 of each of the first passage curved surface 141aa and the second passage curved surface 141ba. Therefore, the misalignment of the overlapping area between the rotor hole 221 and each of the first passage hole 141a and the second passage hole 141b due to the manufacturing error of the engaging protrusion 32 is reduced, and the error in the flow rate flowing out of the valve device 10 can be reduced.

Further, in order for the engaging recess 31 and the engaging protrusion 32 to be securely engaged with each other, it is necessary to sufficiently secure the dimension of each of the recess side surface portions 31a in the first direction DR1 and the dimension D2 of each of the protrusion side surface portions 32a in the first direction DR1. However, if the dimension D2 of each of the protrusion side surface portions 32a is excessively increased, the dimension of each of the recess side surface portions 31a in the second direction DR2 corresponding to the protrusion side surface portions 32a also needs to be increased. Thus, it becomes difficult to secure the wall thickness of the portion where the engaging recess 31 is formed. If the wall thickness cannot be sufficiently secured, the side wall portion 120c may be damaged due to the impact when the engaging protrusion 32 comes into contact with the engaging recess 31. Thus, it is not preferable.

On the other hand, in the present embodiment, the engaging recess 31 is formed so that the dimension of each of the recess side surface portions 31a in the first direction DR1 is approximately one second of the wall thickness of the side wall portion 120c. Therefore, the engaging recess 31 can secure a sufficient depth for engaging the engaging protrusion 32 while securing a sufficient size for preventing damage of the side wall portion 120c due to an impact when the engaging protrusion 32 comes into contact with the engaging recess 31.

Further, if the stator 14 and the engaging protrusion 32 are made of resin, the larger the dimension D2 of each of the protrusion side surface portions 32a is, the more likely sink marks due to shrinkage during resin molding is to occur. Thus, the processing accuracy of the engaging protrusion 32 deteriorates.

On the other hand, in the present embodiment, the dimension D2 of each of the protrusion side surface portions 32a is substantially the same as the thickness D6 of the thin portion 144. The thickness D6 of the thin portion 144 is determined to secure the opening area of the first passage hole 141a and the second passage hole 141b while securing the strength of the stator body portion 145. Therefore, deterioration of processing accuracy due to excessively increasing the dimension D2 of each of the protrusion side surface portions 32a can be suppressed.

Further, in the valve device 10, the engaging recess 31 is formed on the inner circumferential side surface 127. Therefore, it is conceivable to increase the wall thickness of a portion of the side wall portion 120c where the engaging recess 31 is formed to secure the wall thickness. If the engaging recess 31 is formed at a portion of the cylindrical body portion 120 between the predetermined axis CL1 and the outlet opening 120e in the radial direction DRr and the wall thickness of the valve device 10 is increased, a length of a portion of the passage downstream of the outlet opening 120e is extended.

The valve device 10 has the engaging protrusion 32 formed on the outer circumferential side surface 146. Here, if the engaging protrusion 32 is formed at a portion of the outer circumferential side surface 146 that forms the thin portion 144, it is required to secure enough size of the thin portion 144 in the radial direction DRr to prevent the thin portion 144 from being damaged by an impact when the engaging protrusion 32 comes into contact with the engaging recess 31. In this case, it is necessary to increase the size of the thin portion 144 in the radial direction DRr compared to the case where the engaging protrusion 32 in this embodiment is formed in a portion of the outer circumferential side surface 146 outside of the thin portion 144. However, as the size of the thin portion 144 in the radial direction DRr increases, the length of the passage downstream of the outlet opening 120e is extended.

The extension of the passage length downstream of the outlet opening 120e by increasing the wall thickness of the cylindrical body portion 120 and the size of the thin portion 144 in the radial direction DRr is not preferable because this causes an increase in pressure loss generated in the housing 12.

On the other hand, in the valve device 10 of the present embodiment, the engaging recess 31 is arranged at a position of the cylindrical body portion 120 offset from the outlet opening 120e in the circumferential direction DRc. Further, in the valve device 10, the engaging protrusion 32 is arranged at a position of the cylindrical body portion 120 offset from the outlet opening 120e in the radial direction DRr. Therefore, the valve device 10 can avoid extending the passage between the passage hole 141 and the outlet opening 120e due to the engaging recess 31 provided on the inner circumferential side surface 127 and the engaging protrusion 32 provided on the outer circumferential side surface 146. Thus, the increase in pressure loss due to the extension of the passage can be suppressed.

By the way, when the engaging protrusion 32 restricts the stator 14 from moving in the circumferential direction DRc and the protrusion side surface 32a comes into contact with the recess side surface portion 31a, the shearing force in the circumferential direction DRc is generated in the engaging protrusion 32. That is, the shearing force in the circumferential direction DRc is generated at the portion of the outer circumferential side surface 146 where the engaging protrusion 32 is formed. Therefore, when the engaging protrusion 32 is formed at a position close to the first passage hole 141a and the second passage hole 141b and the size, in the radial direction DRr, of a portion of the stator body portion 145 at which the engaging protrusion 32 is formed is small, the stator 14 may be damaged.

On the other hand, in the stator 14 of the present embodiment, the engaging protrusion 32 is formed at a position away from the first passage hole 141a and the second passage hole 141b. Therefore, the valve device 10 can prevent the stator 14 from being damaged by the shearing force when the engaging protrusion 32 restricts the stator 14 from moving in the circumferential direction DRc.

Further, in the engaging structure 30 of the valve device 10, The protrusion side surfaces 32a and the recess side surface portions 31a, which come into contact with each other, are each formed in a planar shape. Therefore, since the portions that come into contact with each other are planar, a contact area between the engaging protrusion 32 and the engaging recess 31 can be easily secured when the engaging protrusion 32 comes into contact with the engaging recess 31 compared to a case that the contact portions are not planar. Thus, movement of the stator 14 can be easily restricted.

Further, in the valve device 10 of the present disclosure, the engaging protrusion 32 is formed outside of the rotor outer circumferential surface 225 of the rotor 22 in the radial direction of the predetermined axis CL1. Further, in the valve device 10 of the present disclosure, the minimum value of the distance from the stator axis CL3 to the outer edge of the opening surface 140 is equal to or greater than the maximum value of the distance from the predetermined axis CL1 to the outer edge of the sliding surface 220.

Therefore, in the valve device 10, the opening surface 140 can cover the sliding surface 220, so that the sealing property between the sliding surface 220 and the opening surface 140 for the fluid can be inhibited from deteriorating and leakage of the fluid through a gap between the stator 14 and the rotor 22 can be inhibited.

Modification of First Embodiment

In the first embodiment described above, an example where the engaging structure 30 is formed of one engaging recess 31 formed in the outer circumferential side surface 146 and one engaging protrusion 32 formed in the inner circumferential side surface 127 is described. However, the present disclosure is not limited to this.

Figure 12:
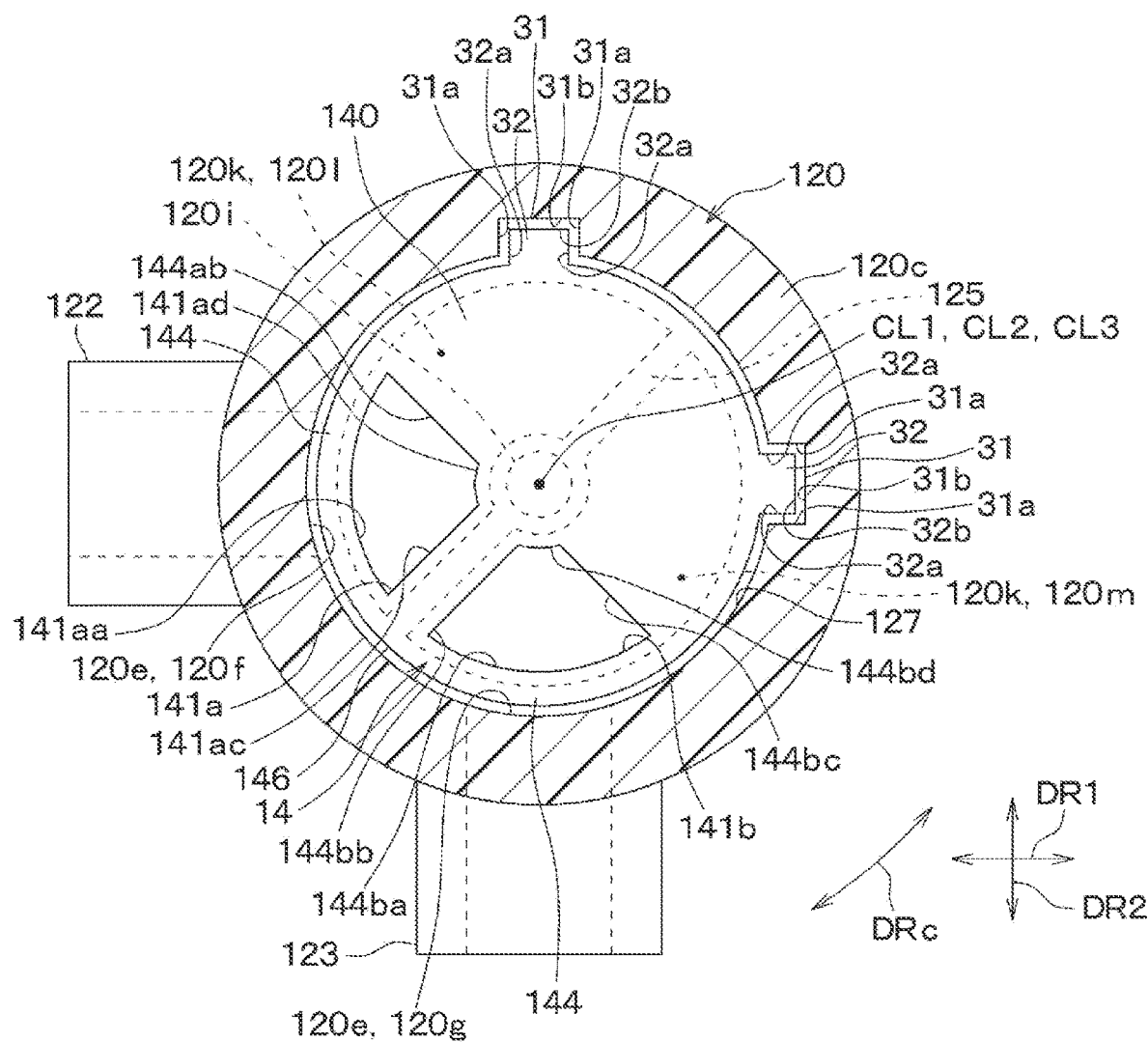
FIG. 12 is a view of a valve device of a first modification of the first embodiment, which corresponds to FIG. 9.

For example, the engaging structure 30 may be formed of a plurality of engaging recesses 31 formed in the inner circumferential side surface 127 and a plurality of engaging protrusions 32 formed in the outer circumferential side surface 146. In this case, as shown in FIG. 12, each of the plurality of engaging recesses 31 may be formed at a portion offset from the outlet opening 120e in the circumferential direction of the housing axis CL2.

As a result, the valve device 10 can avoid extending a passage between the first passage hole 141a and the first outlet opening 120f and a passage between the second passage hole 141b and the second outlet opening 120g due to the plurality of the engaging recesses 31 on the inner circumferential side surface 127. Therefore, it is possible to suppress an increase in pressure loss due to the extension of the passages.

Second Modification of First Embodiment

In the first embodiment described above, an example where the engaging recess 31 is formed at a position offset from the outlet opening 120e in the circumferential direction of the housing axis CL2 has been described. However, the present disclosure is not limited to this.

Figure 13:
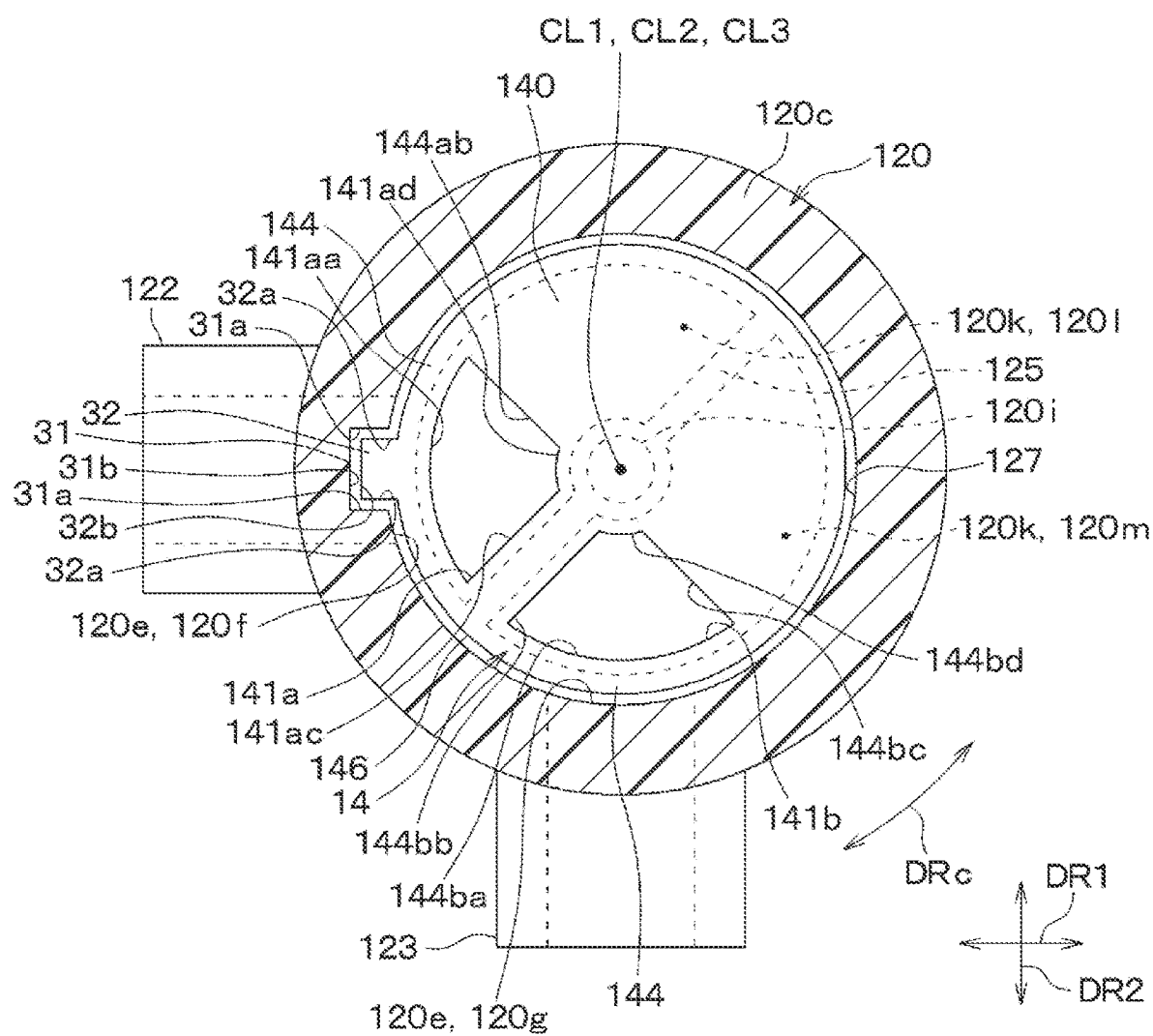
FIG. 13 is a view of a valve device of a second modification of the first embodiment, which corresponds to FIG. 9.
Figure 14:
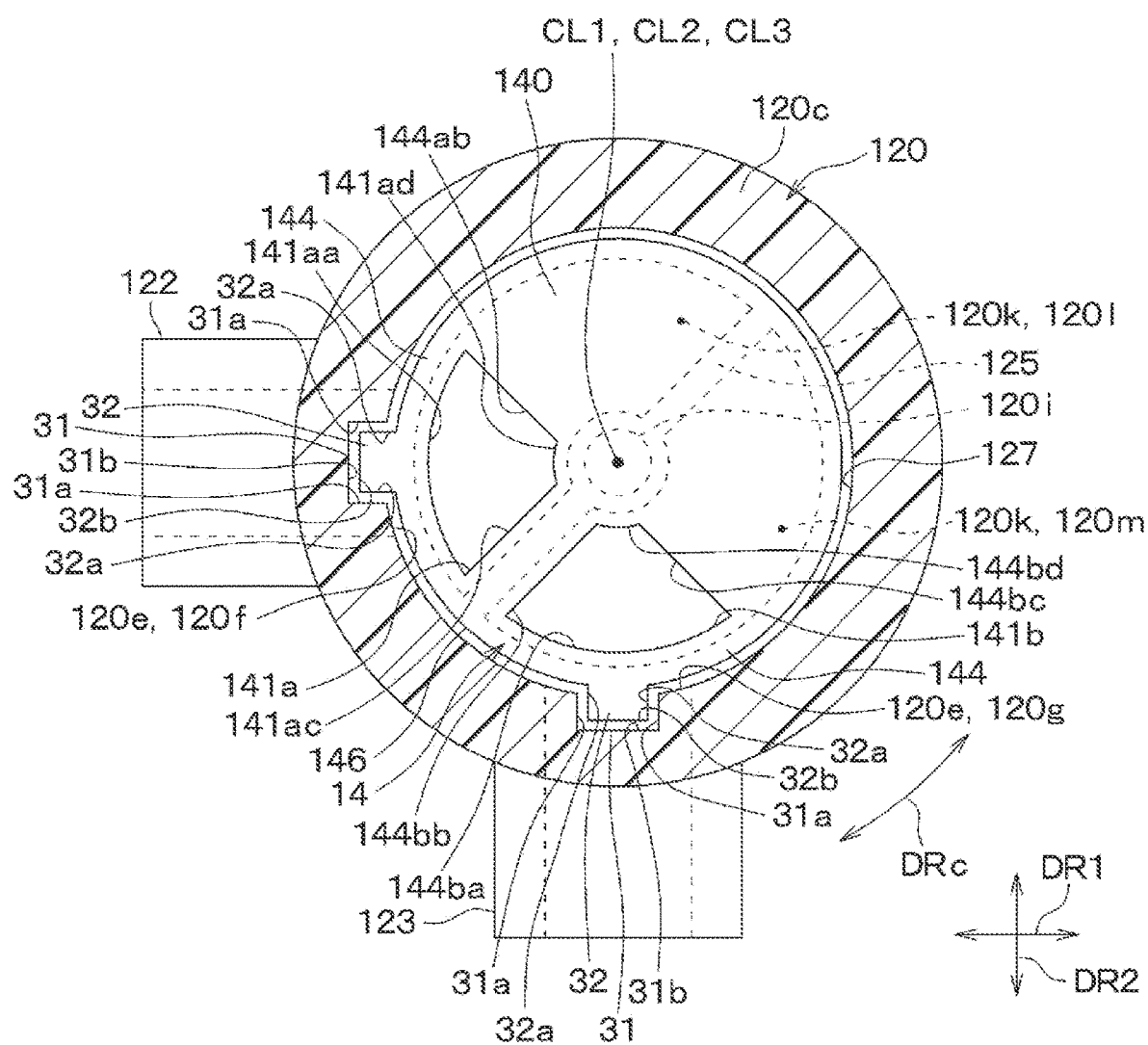
FIG. 14 is a view of a valve device of a second another modification of the first embodiment, which corresponds to FIG. 9.

For example, as shown in FIG. 13, one engaging recess 31 may be formed between the housing axis CL2 and the outlet opening 120e in the radial direction of the housing axis CL2. When a plurality of engaging recesses 31 are formed, each of the plurality of engaging recesses may be formed between the housing axis CL2 and the outlet opening 120e in the radial direction of the housing axis CL2.

Third Modification of First Embodiment

In the first embodiment described above, an example where the engaging recess 31 is formed only in a position offset from the outlet opening 120e in the circumferential direction of the housing axis CL2 is described. However, the present disclosure is not limited to this.

Figure 15:
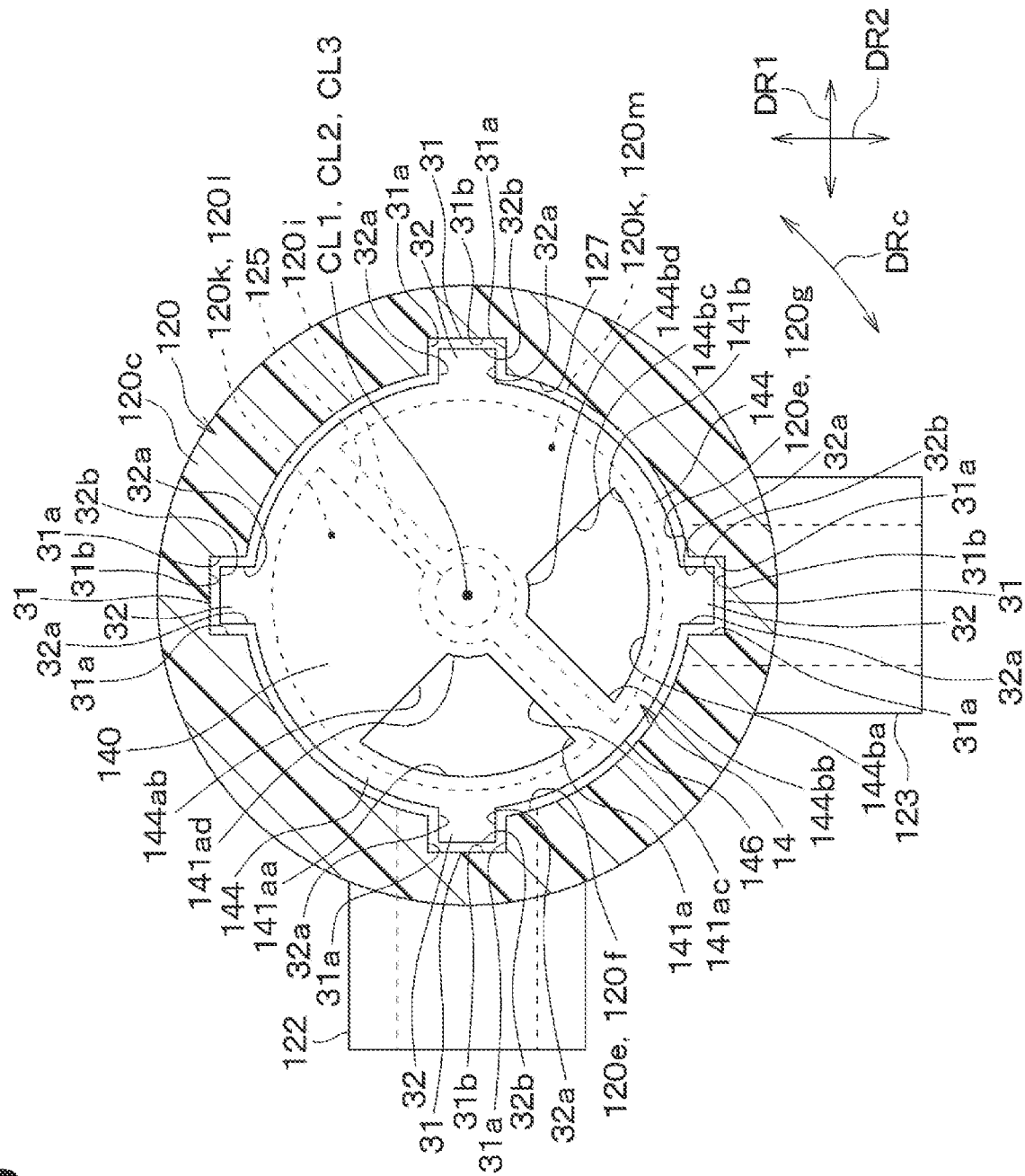
FIG. 15 is a view of a valve device of a third modification of the first embodiment, which corresponds to FIG. 9.

For example, when a plurality of engaging recesses 31 are formed, as shown in FIG. 15, one or some of the plurality of engaging recesses 31 may be formed between the housing axis CL2 and the outlet opening 120e in the radial direction of the housing axis CL2. Further, the remaining engaging recesses 31 of the plurality of engaging recesses 31 may be formed at a portion that is different from a portion between the housing axis CL2 and the outlet opening 120e in the radial direction of the housing axis CL2.

Second Embodiment

Next, a second embodiment will be described with reference to FIGS. 16 and 17. In the present embodiment, differences from the first embodiment will be mainly described.

Figure 16:
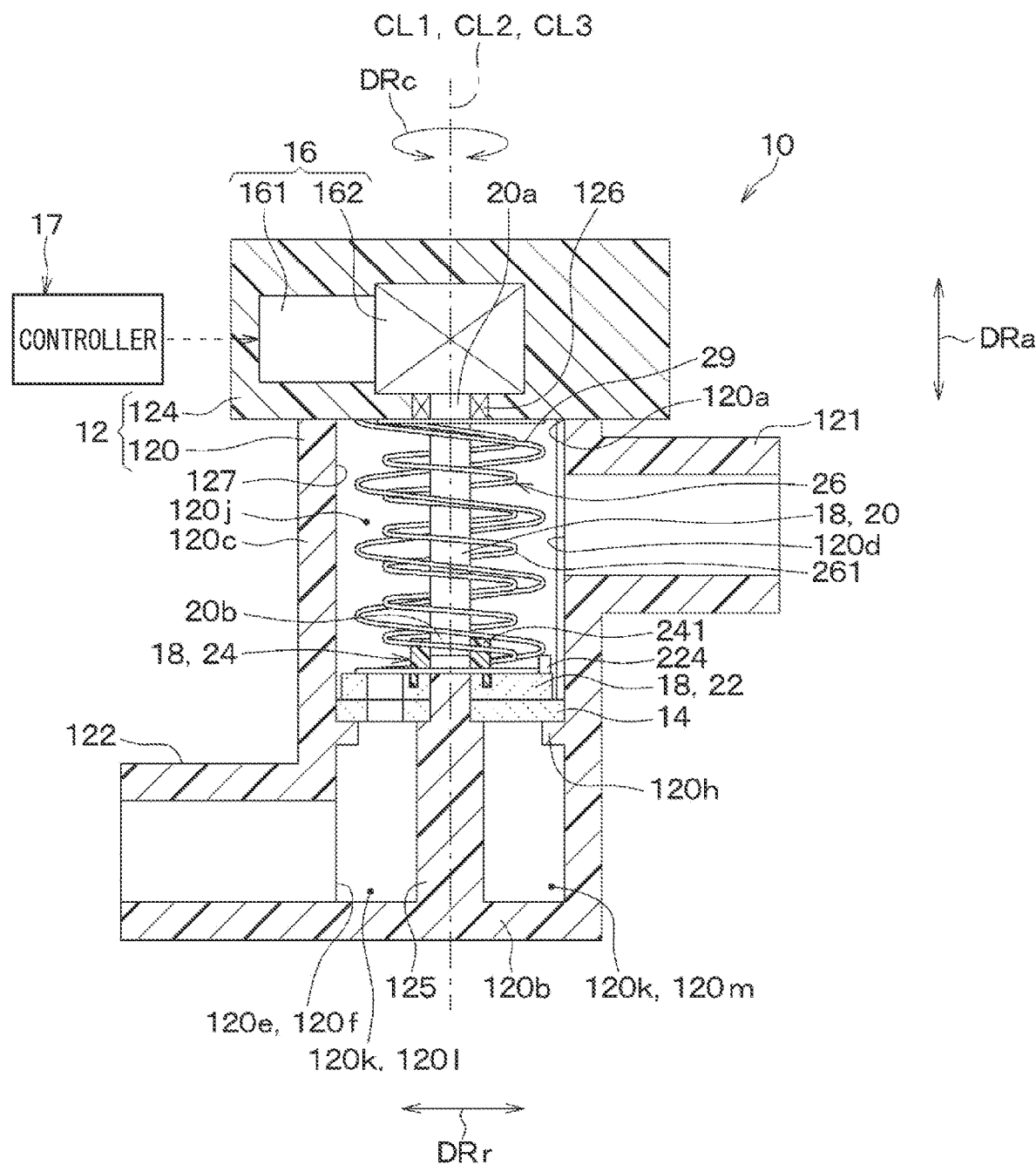
FIG. 16 is a schematic cross-sectional view of a valve device according to a second embodiment.
Figure 17:
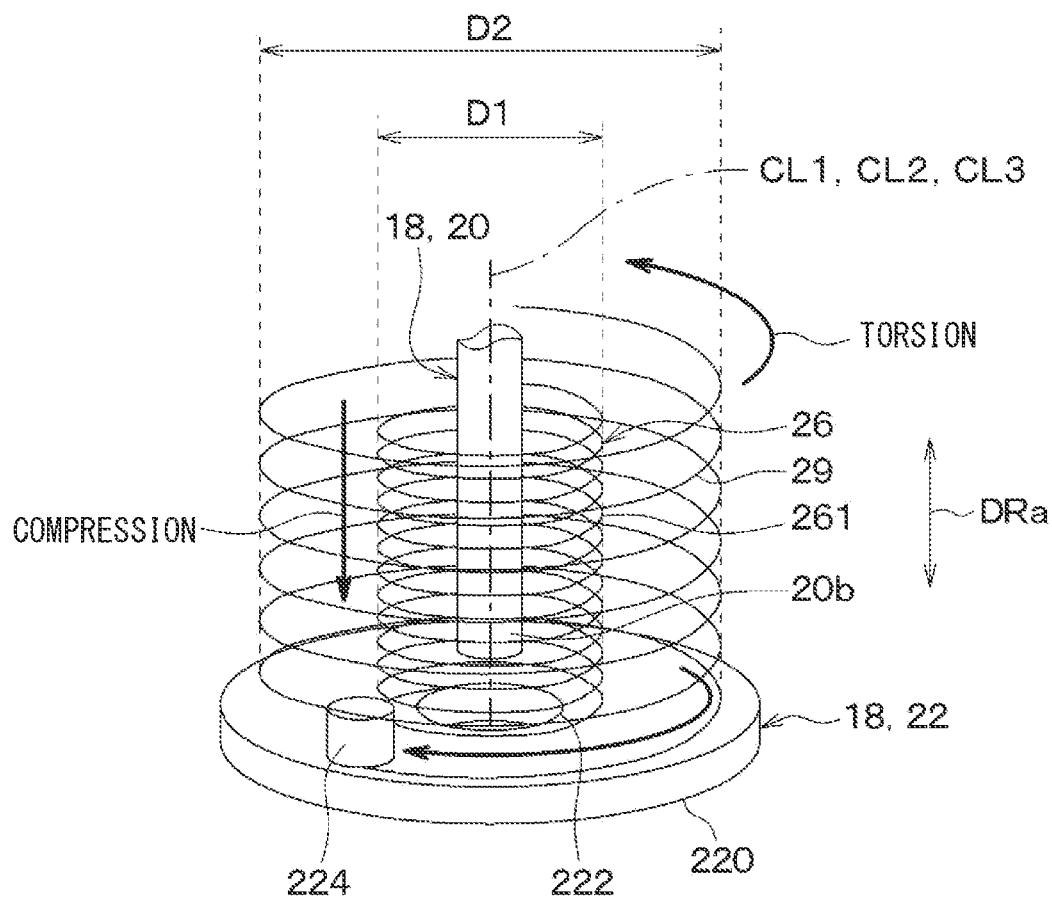
FIG. 17 is a schematic view illustrating a biasing member of the valve device according to the second embodiment.

As shown in FIGS. 16 and 17, the valve device 10 includes a biasing member 29 that biases the rotor 22 in one direction of the circumferential direction DRc of the predetermined axis CL1. The biasing member 29 is formed of a torsion spring formed in a coil shape. The biasing member 29 is arranged between the driving portion 16 and the rotor 22. The biasing member 29 is formed by being wound around the axis CL1 of the shaft 20. The coil diameter D2 of the biasing member 29 is larger than the coil diameter D1 of the compression spring 261. The compression spring 261 is arranged inside the biasing member 29.

Unlike the compression spring 261, the biasing member 29 is fixed to each of the rotor 22 and the main body cover 124. The biasing member 29 has one end in the axial direction DRa that is coupled to the main body cover 124 in a relatively non-rotatable manner and the other end in the axial direction DRa that is coupled to the rotor 22 in a relatively non-rotatable manner. Although various methods for coupling the biasing member 29 to the rotor 22 are conceivable, the end of the biasing member 29 is coupled to the rotor 22, for example, by being locked to a fixing pin 224 fixed to the rotor 22.

The biasing member 29 is used in a state of being twisted in the circumferential direction DRc to generate elastic deformation. The biasing member 29 generates a biasing force for biasing the rotor 22 in one direction of the circumferential direction DRc by its own elastic deformation. The biasing member 29 is merely twisted in the circumferential direction DRc and is not compressed in the axial direction DRa.

The other configurations are the same as those of the first embodiment. As in the first embodiment, the valve device 10 of the present embodiment can obtain effects exhibited by a configuration similar or equal to those of the first embodiment.

In the valve device 10 configured in this way, since the biasing force of the biasing member 29 acts on the stator 14 via the rotor 22, the misalignment of the stator 14 can be suppressed by the biasing force of the biasing member 29. That is, since the valve device 10 can reduce the misalignment of the overlapping area between the passage hole 141 and the rotor hole 221, the flow rate of the fluid flowing through the passage hole 141 can be accurately controlled.

Third Embodiment

Next, a twelfth embodiment will be described with reference to FIGS. 18 and 19. In the present embodiment, differences from the second embodiment will be mainly described.

Figure 18:
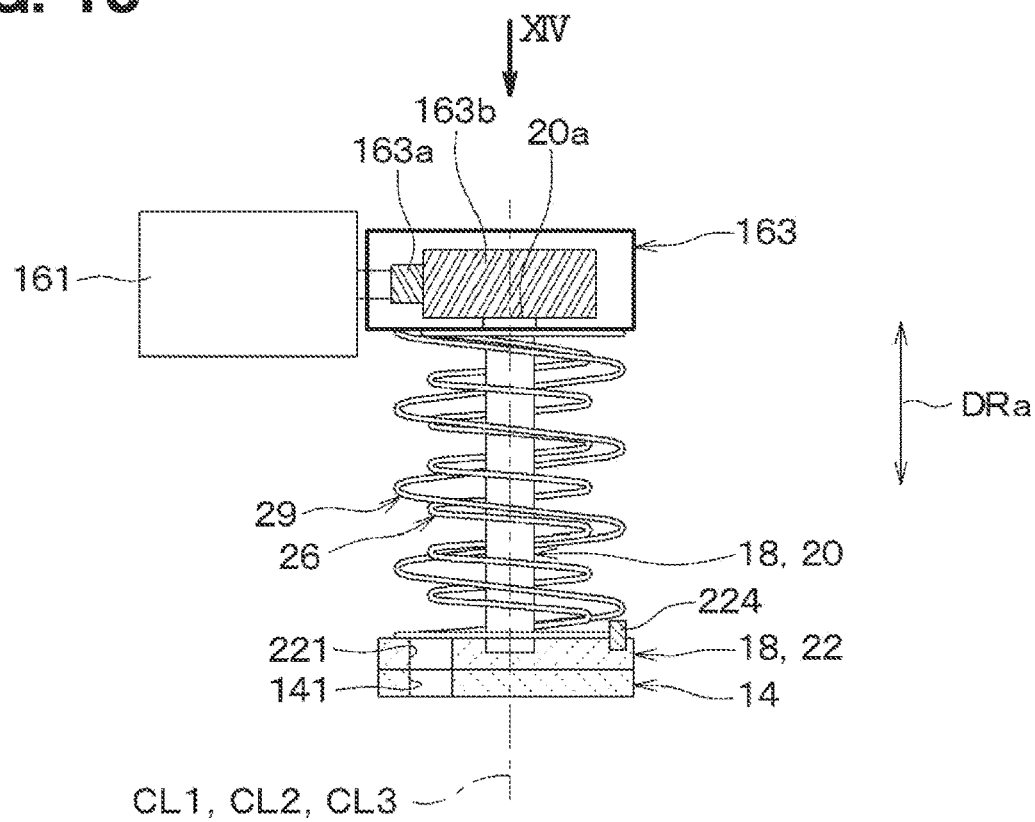
FIG. 18 is a schematic view illustrating a gear unit of a valve device according to a third embodiment.
Figure 19:
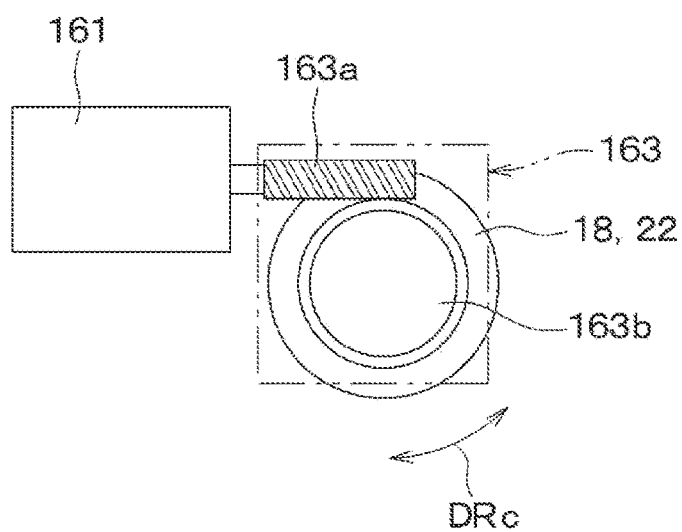
FIG. 19 is a schematic view illustrating the gear unit of the valve device according to the third embodiment.

As shown in FIGS. 18 and 19, the gear unit 162 of the present embodiment has a worm 163a having spiral teeth and a worm wheel 163b that meshes with the worm 163a, instead of the plurality of gears. That is, the gear unit 162 of the present embodiment is formed of the worm gear 163. In FIGS. 18 and 19, the illustration of the housing 12 is omitted in order to clearly illustrate the worm gear 163.

The worm 163a is provided on the rotating shaft of the motor 161 and is connected to the rotating shaft of the motor 161 not to rotate relative to each other. The worm wheel 163b is attached to one end portion 20a of the shaft 20 and connected to the shaft 20 so as not to rotate relative to each other. As a result, for example, when the motor 161 generates a rotational force, the rotational force of the motor 161 is transmitted through the worm 163a and the worm wheel 163b in this order, and is transmitted to the rotor 22 through the worm wheel 163b and the shaft 20.

Further, since the gear unit 162 is formed of the worm gear 163, the worm 163a does not rotate even if the rotational force is to be transmitted from the worm wheel 163b to the worm 163a. That is, the worm 163a is configured to prevent the rotational force from transmitting from the worm wheel 163b to the motor 161. In other words, the worm 163a is configured as a reverse transmission blocking gear that prevents the rotational force from transmitting to the motor 161 in the opposite direction to the direction of the rotational force transmitted from the motor 161 to the rotor 22.

The other configurations are similar to those of the second embodiment. As in the second embodiment, the valve device 10 of the present embodiment can obtain effects exhibited by a configuration similar or equal to those of the second embodiment.

In the valve device 10 configured in this way, the worm 163a can prevent the rotational force from transmitting from the worm wheel 163b to the motor 161.

By the way, in this embodiment as well as in the second embodiment, the biasing member 29 biases the rotor 22 in one direction of the circumferential direction DRc. In this case, when the motor 161 does not rotate the rotor 22, the valve device 10 needs a reaction force that opposes the biasing force of the biasing member 29 in order to hold the rotational position of the rotor 22.

On the other hand, in the valve device 10 of the present embodiment, the worm 163a cannot transmit the rotational force from the worm wheel 163b to the motor 161, so that the motor 161 is not rotated due to the rotational force of the rotor 22 generated by the biasing member 29. Therefore, the valve device 10 can suppress the misalignment of the stator 14 in the circumferential direction DRc by holding the rotational position of the rotor 22 without energizing the motor 161.

Further, since the gear unit 162 of the present embodiment is formed of the worm gear 163, the number of parts can be reduced compared to a case where a structure other than the worm gear 163 is used as a structure to prevent transmission of the rotational force from the rotor 22 to the motor 161. Therefore, it is easy to simplify the structure and the manufacturing process when using the gear unit 162.

Fourth Embodiment

Next, a fourth embodiment will be described with reference to FIGS. 20 and 21. In the present embodiment, differences from the first embodiment will be mainly described.

Figure 20:
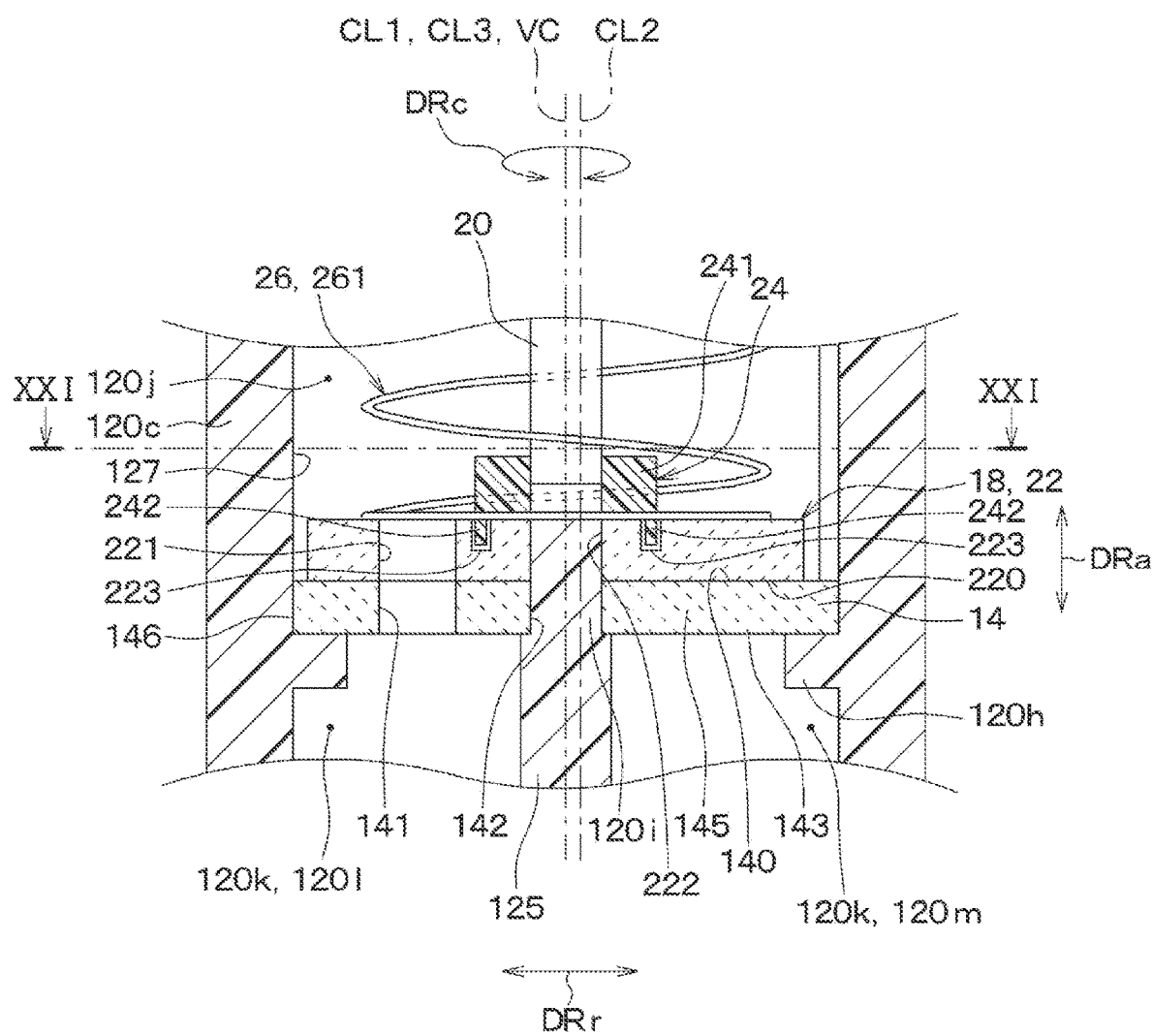
FIG. 20 is a schematic cross-sectional view illustrating a part of a valve device according to a fourth embodiment.
Figure 21:
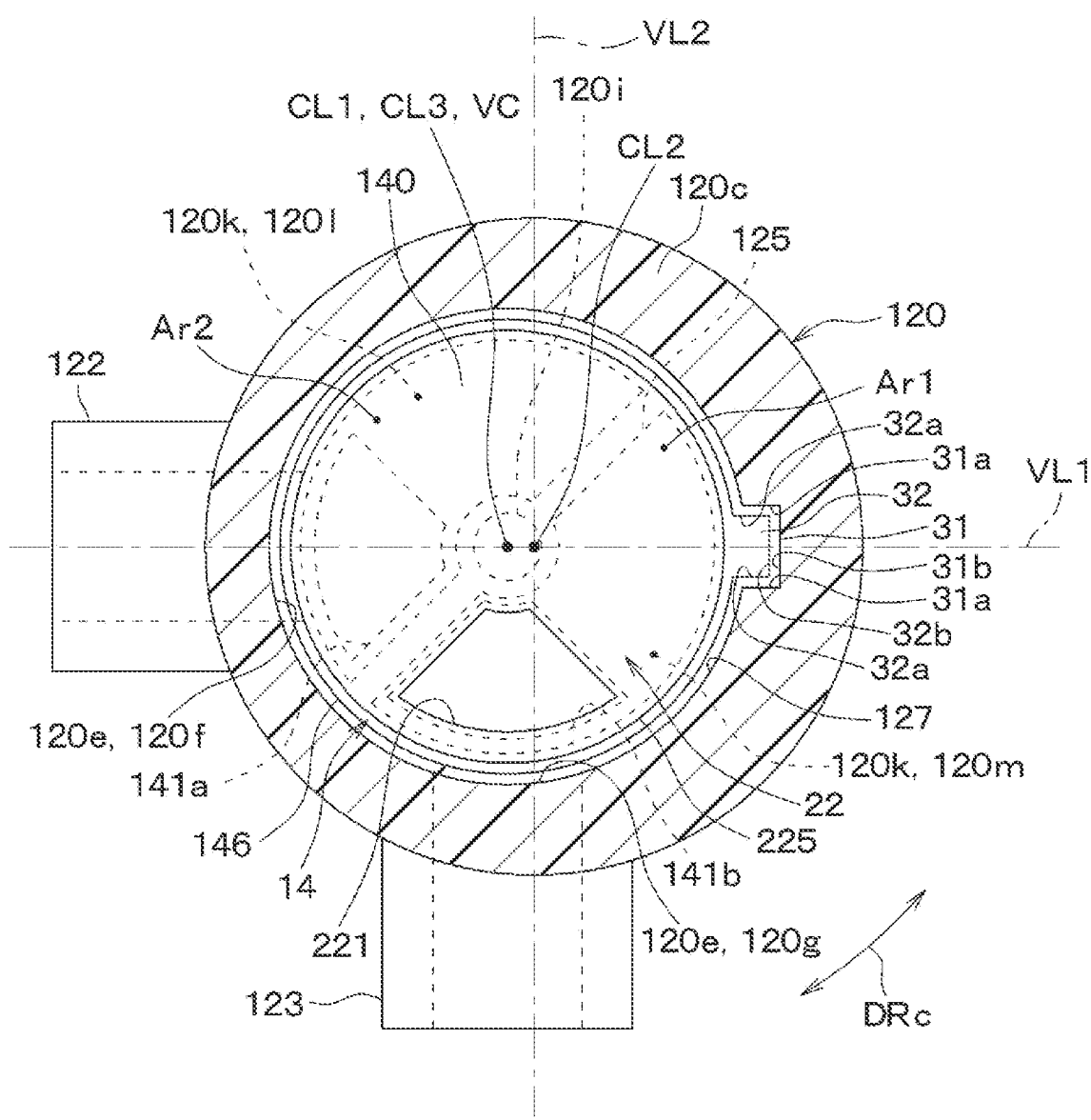
FIG. 21 is a schematic cross-sectional view taken along the line XXI-XXI of FIG. 20.

As shown in FIGS. 20 and 21, an axis of the shaft 20 of the present embodiment is arranged to be offset from an axis of the cylindrical body portion 120. That is, the shaft 20 is arranged inside the cylindrical body portion 120 so that the predetermined axis CL1 is not coaxial with the housing axis CL2. As in the first embodiment, the rotor 22 is arranged inside the cylindrical body portion 120 so that the rotation axis of the rotor 22 is coaxial with the predetermined axis CL1.

Further, in the cylindrical body portion 120 of the present embodiment, an axis of the inner circumferential side surface 127 is offset from an axis of the outer circumferential portion of the cylindrical body portion 120 and the thickness of the side wall portion 120c varies in the circumferential direction DRc. Specifically, the cylindrical body portion 120 is formed so that the axis of the outer circumferential portion is coaxial with the housing axis CL2. Further, the cylindrical body portion 120 is formed so that the center VC of the virtual circle defined by a portion of the inner circumferential side surface 127 in which the engaging recess 31 is not formed is coaxial with the predetermined axis CL1. That is, the housing axis CL2 of the present embodiment is a line equidistant from the outer circumferential portion of the cylindrical body portion 120, not a line equidistant from the inner circumferential side surface 127.

The axis of the stator 14 is arranged to be offset from the axis of the cylindrical body portion 120, and the position of the stator axis CL3 is set in a region defined between the predetermined axis CL1 and the housing axis CL2.

Here, a first virtual line VL1 is defined as a line connecting between the predetermined axis CL1 and the housing axis CL1 in the radial direction of the housing axis CL2, and a second virtual line VL2 is defined as a line perpendicular to the first virtual line VL1 and passing through the housing axis CL2. In this case, the cylindrical body portion 120 is divided by the second virtual line VL2 into two areas of one region Ar1 and the other region Ar2.

Then, the stator 14 is arranged in the cylindrical body portion 120 such that the engaging protrusion 32 is positioned in the one region Ar1 and the stator axis CL3 is positioned in the other region Ar2. In the present embodiment, the stator 14 is arranged inside the cylindrical body portion 120 so that the stator axis CL3 is coaxial with the predetermined axis CL1 as in the first embodiment.

The other configurations are the same as those of the first embodiment. As in the first embodiment, the valve device 10 of the present embodiment can obtain effects exhibited by a configuration similar or equal to those of the first embodiment.

By the way, it is desirable that the side wall portion 120c has a sufficient thickness at a portion where the engaging recess 31 is formed. In other words, it is preferable that the wall thickness of a portion of the side wall portion 120c where the engaging recess 31 is formed does not become thinner due to the engaging recess 31 than the wall thickness of a portion of the side wall portion 120c where the engaging recess 31 is not formed. However, when the housing axis CL2 and the stator axis CL3 are coaxially arranged and the wall thickness of the portion where the engaging recess 31 is formed is increased, the wall thickness of the portion where the engaging recess 31 is not formed is also increased. Thus, the outer diameter of the cylindrical body portion 120 is increased.

On the other hand, in the present embodiment, the stator 14 is arranged so that the engaging protrusion 32 is positioned in the one region Ar1 and the stator axis CL3 is positioned in the other region Ar2 different from the one region Ar1. That is, the stator 14 is arranged so that the stator axis CL3 is positioned in the region that does not include the portion of the inner circumferential side surface 127 where the engaging recess 31 is formed. Therefore, the valve device 10 can easily secure the wall thickness of the side wall portion 120c at a position where the engaging recess 31 is formed, and decrease the outer diameter of the cylindrical body portion 120 compared to the case where the housing axis CL2 and the stator axis CL3 are coaxially arranged.

Modification of Fourth Embodiment

In the fourth embodiment described above, an example of the arrangement of the stator 14 having one engaging protrusion 32 at the outer circumferential side surface 146 is described. However, the present disclosure is not limited to this. For example, even when a plurality of engaging protrusions 32 are formed on the outer circumferential side surface 146, the stator 14 can be arranged to be offset from the cylindrical body portion 120 as described above.

In this case, the stator 14 is arranged inside the cylindrical body portion 120 such that at least one of the plurality of engaging protrusions 32 is located in the one region Ar1 and the stator axis CL3 is located in the other region Ar2.

Fifth Embodiment

Next, a fifth embodiment will be described with reference to FIG. 22. In the present embodiment, differences from the first embodiment will be mainly described.

Figure 22:
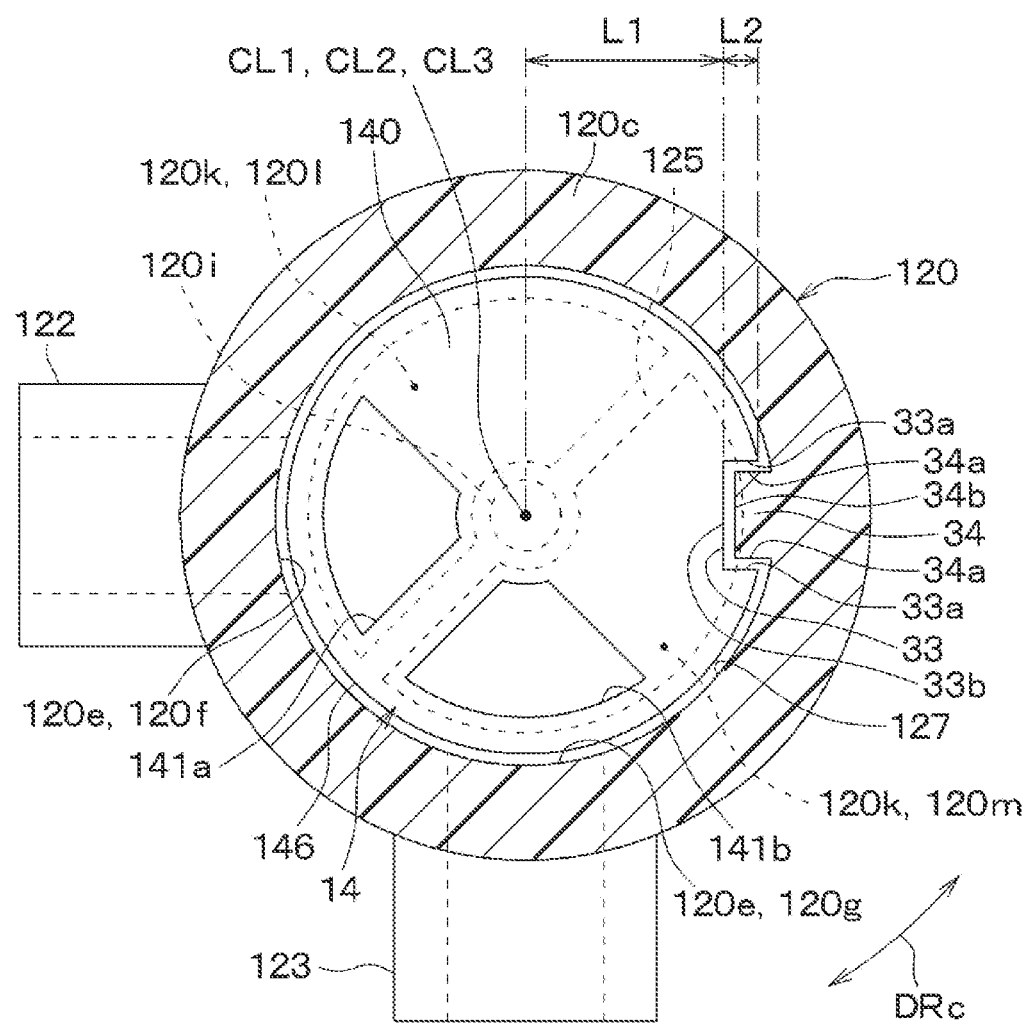
FIG. 22 is a view for explaining an engaging structure of a valve device according to a fifth embodiment.

As shown in FIG. 22, the stator 14 of the present embodiment has an engaging recess 33 recessed from the outer circumferential side surface 146 toward the stator axis CL3. The engaging recess 33 is formed such that the dimension of each of the recess side surfaces 33a, which defines a depth of the recess, in a direction from the outer circumferential side surface 146 toward an inner side of the outer circumferential side surface 146 is less than one second of the half diameter of the stator body portion 145. That is, the engaging recess 33 is formed such that a dimension L1 between the stator axis CL3 and each of the recess side surfaces 33a in the radial direction of the stator axis CL3 is larger than twice the dimension L2 between each of the recess side surfaces 33a and the outer circumferential portion of the virtual circle defined by the portion of the outer circumferential portion where the engaging recess 33 is not formed.

Further, as shown in FIG. 22, the inner circumferential side surface 127 in the present embodiment has an engaging protrusion 34 protruding toward the housing axis CL2. That is, the engaging protrusion 34 protrudes from the inner circumferential side surface 127 toward the outer circumferential side surface 146.

The other configurations are the same as those of the first embodiment. As in the first embodiment, the valve device 10 of the present embodiment can obtain effects exhibited by a configuration similar or equal to those of the first embodiment.

The engaging structure 30 of the present embodiment configured as described above is formed of the engaging recess 33 formed in the outer circumferential side surface 146 and the engaging protrusion 34 formed in the inner circumferential side surface 127. Therefore, in the valve device 10, the engaging recess 33 engages with the engaging protrusion 34, so that even if the rotor 22 rotates, one of the protrusion side surface portions 34a comes into contact with the facing recess side surface 33a and the stator 14 can be restricted from rotating in the circumferential direction DRc.

Further, in the side wall portion 120c, the engaging recess 33 of the engaging structure 30 formed of the engaging protrusion 34 and the engaging recess 33 is formed on the inner circumferential side surface 127, so that it is not necessary to increase the wall thickness of the side wall portion 120c to secure the wall thickness of the side wall portion 120c. Therefore, in the valve device 10, the outer diameter of the cylindrical body portion 120 can be reduced as compared with the case where the engaging protrusion 34 is formed on the inner circumferential side surface 127.

Sixth Embodiment

Next, a sixth embodiment will be described with reference to FIGS. 23 and 24. In the present embodiment, differences from the first embodiment will be mainly described.

Figure 23:
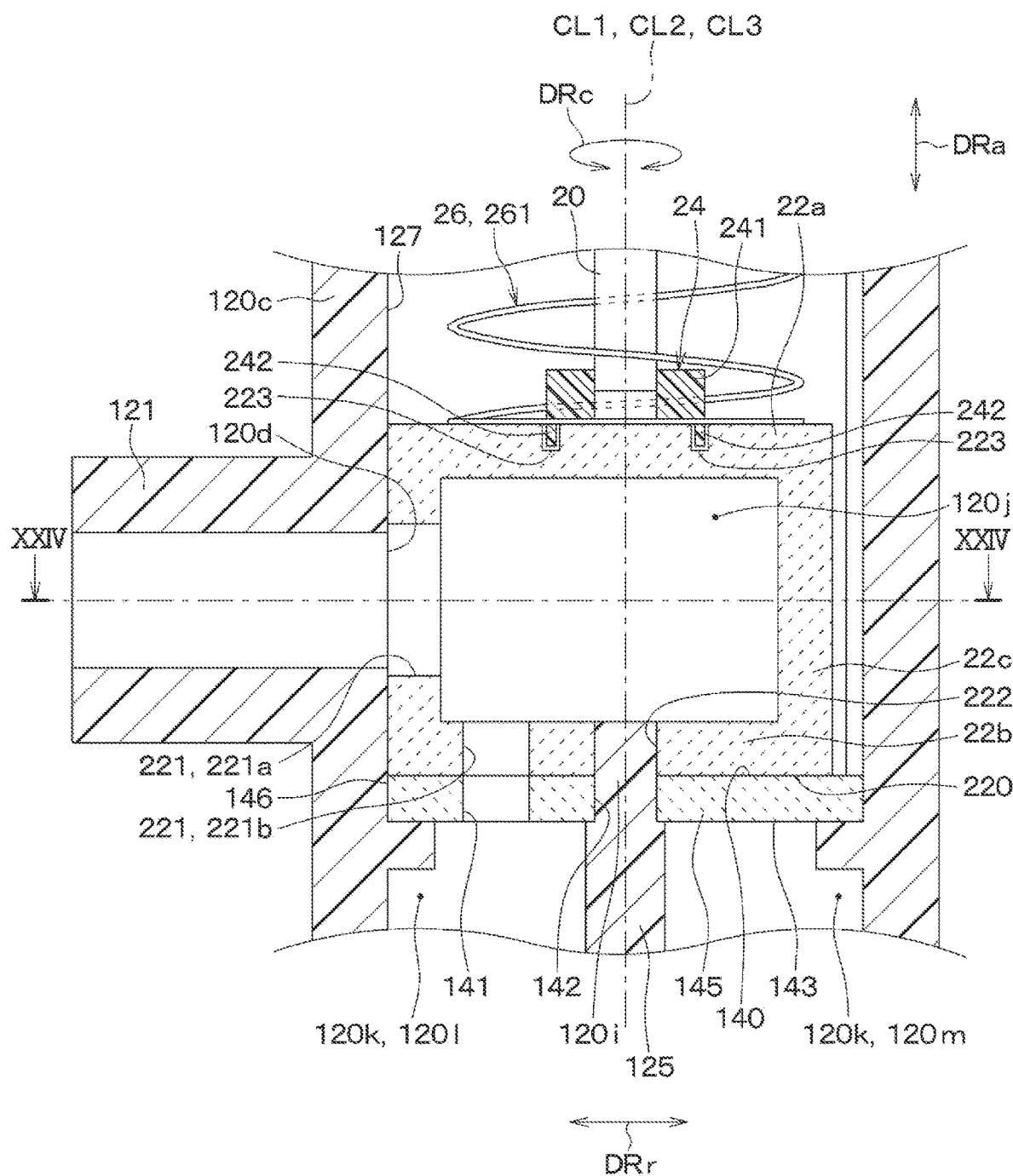
FIG. 23 is a schematic cross-sectional view illustrating a part of a valve device according to a sixth embodiment.
Figure 24:
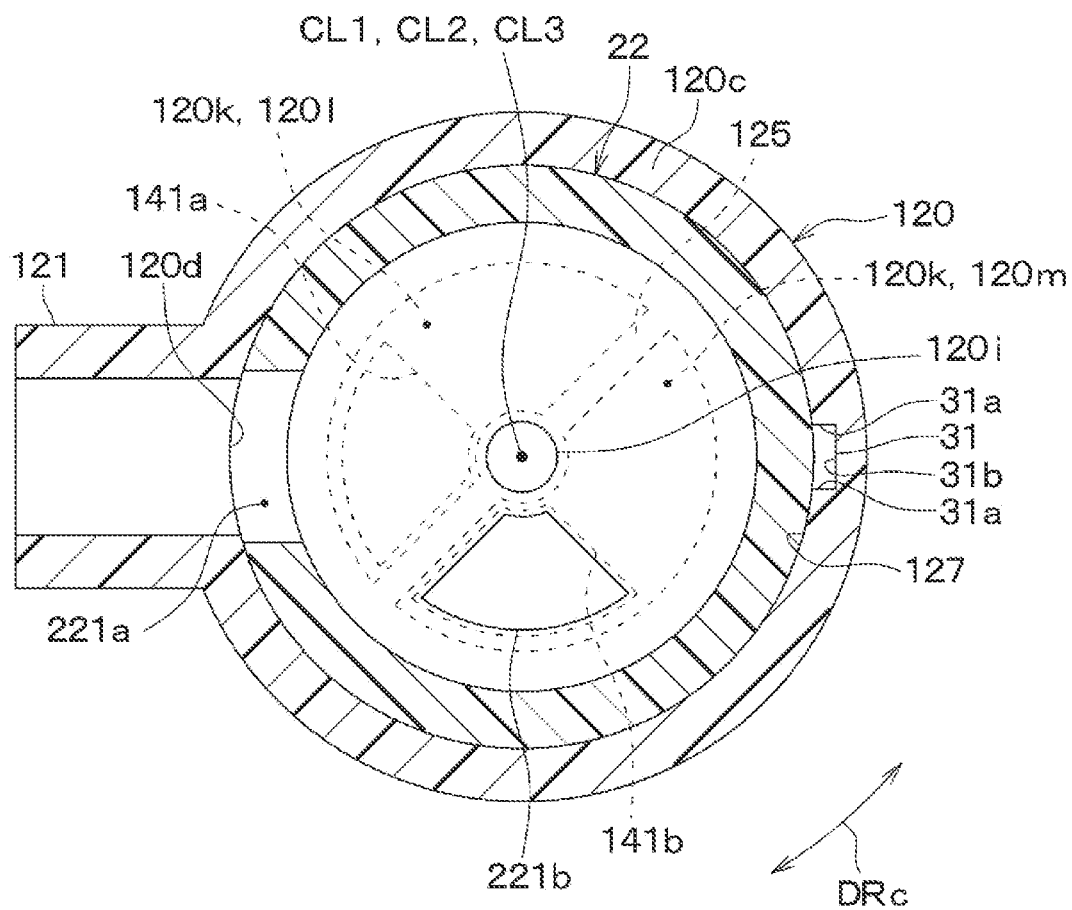
FIG. 24 is a cross-sectional view taken along a line XXIV-XXIV of FIG. 23.

As shown in FIGS. 23 and 24, in the present embodiment, the shape of the housing 12 is different from that of the first embodiment, and the inlet portion 121 is formed to be in communication with the rotor hole 221 of the rotor 22. Further, in the present embodiment, the shape of the rotor 22 is different from that of the first embodiment, and the rotor 22 is formed in a cylindrical shape.

The rotor 22 includes a top plate portion 22a, a bottom plate portion 22b, and a cylindrical portion 22c. The top plate portion 22a is formed in a disk shape about the predetermined axis CL1. The top plate portion 22a has a thickness in the axial direction DRa. The top plate portion 22a has a plate surface facing in the axial direction DRa to which the other ends of the intermediate element 24 and the compression spring 261 are connected.

The bottom plate portion 22b is formed in a disk shape about the predetermined axis CL1. The bottom plate portion 22b has a thickness in the axis direction DRa. The bottom plate portion 22b defines a second rotor hole 221b passing through the bottom plate portion 22b in the axis direction DRa and a rotor insertion hole 222 into which the housing inserting portion 120i is inserted. The bottom plate portion 22b is formed such that the second rotor hole 221b can overlap the first passage hole 141a and the second passage hole 141b in the axial direction DRa when the rotor 22 is rotated in the circumferential direction DRc of the axis CL1.

The cylindrical portion 22c is formed in a substantially cylindrical shape having an axis extending along the predetermined axis CL1, and has one opening end in the axial direction DRa that is closed by the top plate portion 22a and the other opening end that is closed by the bottom plate portion 22b.

The cylindrical portion 22c defines a through hole as the first rotor hole 221a on the outer circumferential portion. The first rotor hole 221a is fluidly connected to the inlet portion 121. That is, the cylindrical portion 22c is formed so as to overlap the inlet opening 120d in the radial direction DRr when the rotor 22 is rotated in the circumferential direction DRc of the axis CL1. Therefore, the cylindrical portion 22c allows fluid to flow from the outside of the valve device 10 into the inlet-side space 120j of the cylindrical portion 22c through the first rotor hole 221a.

When the rotor 22 configured in this way rotates along with the rotation of the shaft 20, the first rotor hole 221a is fluidly connected to the inlet opening 120d and the fluid flows into the inlet-side space 120j through the inlet portion 121. Then, the rotor 22 rotates along with the rotation of the shaft 20 to fluidly connect between the passage hole 141 and the second rotor hole 221b, the fluid in the inlet-side space 120j flows to the outlet-side space 120k.

That is, the rotor 22 can serve as a valve body that increases and decreases an opening degree of each of the second rotor hole 221b, the first passage hole 141a, and the second passage hole 141b by rotating about the predetermined axis CL1 along with the rotation of the shaft 20.

The shaft 20 and the compression spring 261 of this embodiment are not arranged in the inlet-side space 120j.

The other configurations are the same as those of the first embodiment. As in the first embodiment, the valve device 10 of the present embodiment can obtain effects exhibited by a configuration similar or equal to those of the first embodiment.

Seventh Embodiment

Next, a seventh embodiment will be described with reference to FIGS. 25 to 34. In the present embodiment, differences from the first embodiment will be mainly described. In the present embodiment, an example where the valve device 10 is applied to a control valve mounted in a temperature regulating device 1 shown in FIG. 25 will be described.

The temperature adjusting apparatus 1 is mounted in an electric vehicle that obtains a driving force for traveling from an electric motor. The temperature adjusting apparatus 1 is a device that regulates the temperature of ventilation air into a vehicle compartment, which is a space to be air-conditioned, and regulates the temperatures of a plurality of in-vehicle devices including a battery BT in the electric vehicle. The temperature adjusting apparatus 1 can be interpreted as an air conditioner with a temperature regulating function for an in-vehicle device.

Figure 25:
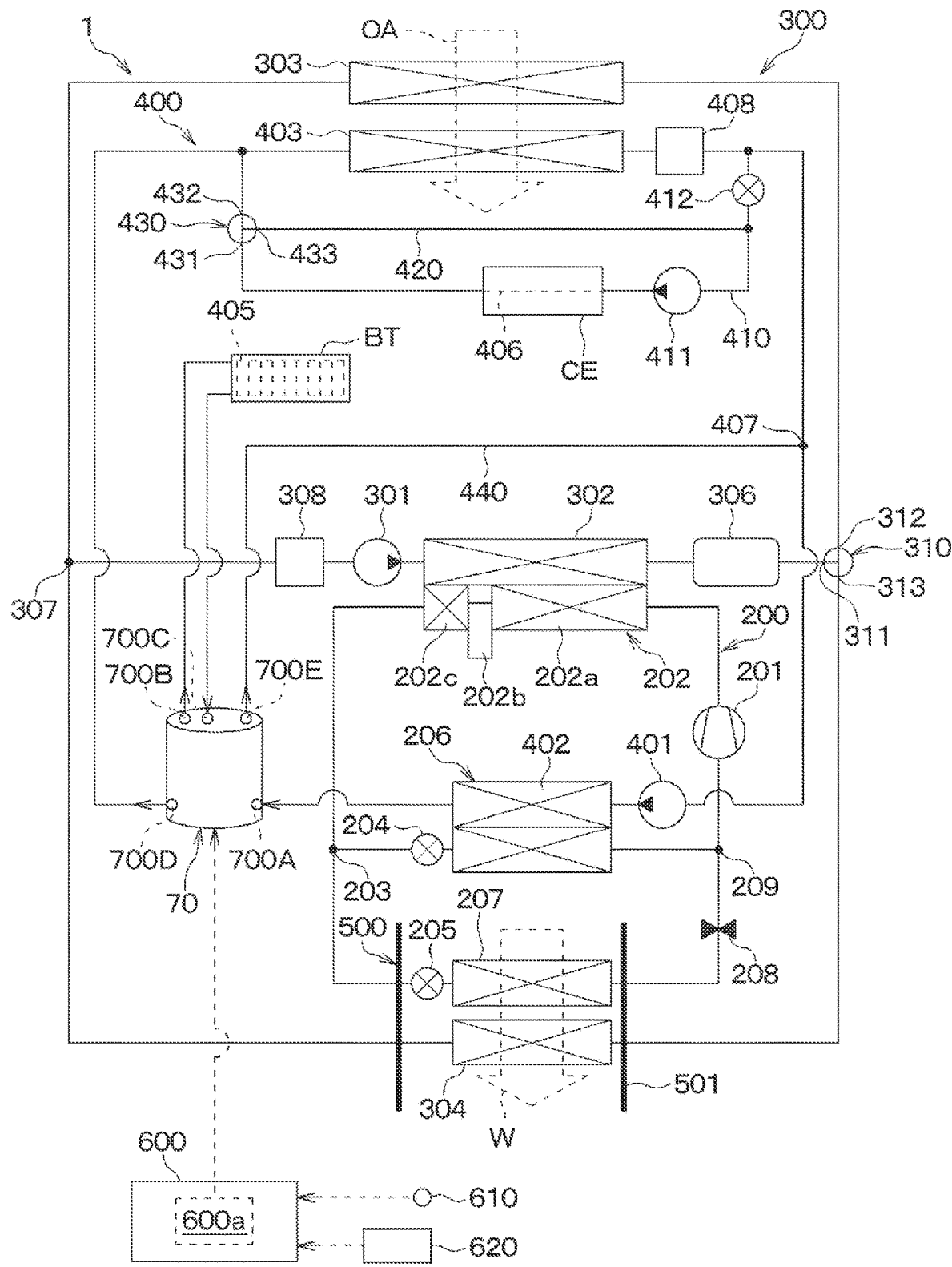
FIG. 25 is an overall configuration diagram of a temperature adjusting apparatus according to a seventh embodiment.

As illustrated in FIG. 25, the temperature adjusting apparatus 1 includes a refrigeration cycle device 200, a first fluid circulation circuit 300, a second fluid circulation circuit 400, an interior air conditioning unit 500, a control device 600, and the like.

The refrigeration cycle device 200 constitutes a vapor compression refrigeration cycle. The refrigeration cycle device 200 includes a compressor 201, a heat radiator 202, a first expansion valve 204, a second expansion valve 205, a chiller 206, an interior evaporator 207, an evaporating pressure regulating valve 208, and the like. The refrigeration cycle device 200 can switch a circuit configuration of a refrigerant circuit in accordance with various operation modes to be described later.

Here, in the refrigeration cycle device 200, an HFO refrigerant (for example, R1234yf) is used as the refrigerant. The refrigeration cycle device 200 constitutes a subcritical refrigeration cycle in which the maximum value of the refrigerant pressure does not exceed the critical pressure of the refrigerant. Refrigerant oil (e.g., polyalkylene glycol (PAG) oil) for lubricating the sliding portions of the compressor 201 and the like is mixed in the refrigerant. A part of the refrigerant oil circulates in the refrigerant circuit of the refrigeration cycle device 200 together with the refrigerant.

The compressor 201 is a device that compresses and discharges the sucked refrigerant. The compressor 201 is disposed in a drive system housing chamber on the front side of the vehicle. The drive system housing chamber is a space in which an electric motor or the like serving as a drive source for traveling is disposed. The drive system housing chamber and the inside of the vehicle compartment are separated from each other by a firewall.

In the compressor 201, the refrigerant inlet side of the heat radiator 202 is connected to the refrigerant discharge side of the compressor 201. The heat radiator 202 is a heat exchanger that exchanges heat between the refrigerant discharged from the compressor 201 and a high-temperature heat medium circulating in the first fluid circulation circuit 300 to dissipate heat from the refrigerant. The heat radiator 202 also functions as a heating heat exchanger that heats the high-temperature heating medium.

The refrigeration cycle device 200 employs a so-called subcooling heat exchanger as the heat radiator 202. That is, the heat radiator 202 is provided with a condensing part 202a, a receiver part 202b, and a subcooling part 202c.

The condensing part 202a is a condensing heat exchanging part that exchanges heat between the refrigerant discharged from the compressor 201 and the high-temperature heat medium to condense the high-pressure refrigerant. The receiver part 202b is a liquid reception part that separates the refrigerant flowing out of the condensing part 202a into gas and liquid and stores the separated liquid-phase refrigerant. The subcooling part 202c is a subcooling heat exchange part that exchanges heat between the liquid-phase refrigerant flowing out of the receiver part 202b and the high-temperature heat medium to subcool the liquid-phase refrigerant.

A refrigerant branch 203 is connected to the refrigerant outlet side of the heat radiator 202. The refrigerant branch 203 branches the flow of the refrigerant flowing out of the heat radiator 202. The refrigerant branch 203 is a three-way joint having three inflow outlets communicating with each other. One of the three inflow outlets of the refrigerant branch 203 is used as an inflow port, and the remaining two are used as outflow ports.

The refrigerant inlet side of the chiller 206 is connected to one outflow port of the refrigerant branch 203 via a first expansion valve 204. The refrigerant inlet side of the interior evaporator 207 is connected to the other outflow port of the refrigerant branch 203 via a second expansion valve 205.

The first expansion valve 204 is a decompression part that decompresses the refrigerant flowing out of the one outflow port of the refrigerant branch 203. The first expansion valve 204 is an electric variable throttle mechanism including a valve body that changes a throttle opening and an electric actuator (e.g., stepping motor) that shifts the valve body. The operation of the first expansion valve 204 is controlled by a control pulse output from the control device 600.

The second expansion valve 205 is a decompression part that decompresses the refrigerant flowing out of the other outflow port of the refrigerant branch 203. The basic configuration of the second expansion valve 205 is the same as that of the first expansion valve 204.

Each of the first expansion valve 204 and the second expansion valve 205 has a full-open function of functioning as a simple refrigerant passage while hardly exerting a refrigerant decompressing action and a flow rate regulating action by fully opening the valve opening degree. Further, each of the first expansion valve 204 and the second expansion valve 205 has a full-close function of closing the refrigerant passage by fully closing the valve opening degree.

The first expansion valve 204 and the second expansion valve 205 can switch refrigerant circuits in various operation modes by the full-open function and the full-close function. Accordingly, each of the first expansion valve 204 and the second expansion valve 205 also functions as a refrigerant circuit switching part that switches the circuit configuration of the refrigeration cycle device 200.

The refrigerant inlet side of the chiller 206 is connected to the refrigerant outlet side of the first expansion valve 204. The chiller 206 is a heat exchanger that exchanges heat between a low-pressure refrigerant decompressed by the first expansion valve 204 and a low-temperature heating medium circulating in the second fluid circulation circuit 400. The chiller 206 is an evaporation part that cools the low-temperature heating medium by evaporating the low-pressure refrigerant to exert a heat absorbing action.

Thus, the chiller 206 in the second fluid circulation circuit 400 is a cooling device that cools the low-temperature heat medium. One inflow port side of a refrigerant junction 209 is connected to the refrigerant outlet side of the chiller 206.

The refrigerant inlet side of the interior evaporator 207 is connected to the refrigerant outlet side of the second expansion valve 205. The interior evaporator 207 is a heat exchanger that exchanges heat between a low-pressure refrigerant decompressed by the second expansion valve 205 and a ventilation air W blown into the vehicle compartment. The interior evaporator 207 is a cooling heat exchange unit that cools the ventilation air W by evaporating the low-pressure refrigerant to exert a heat absorbing action. The interior evaporator 207 is disposed in a casing 501 of an interior air conditioning unit 500 to be described later.

The refrigerant inlet side of the evaporating pressure regulating valve 208 is connected to the refrigerant outlet side of the interior evaporator 207. The evaporating pressure regulating valve 208 is an evaporating pressure regulating part that holds the refrigerant evaporating pressure at the interior evaporator 207 at a predetermined reference pressure or higher.

The evaporating pressure regulating valve 208 is a mechanical variable throttle mechanism that increases the valve opening degree with an increase in pressure on the refrigerant outlet side of the interior evaporator 207. The evaporating pressure regulating valve 208 holds a refrigerant evaporation temperature at the interior evaporator 207 to be equal to or higher than a frosting prevention temperature (e.g., 1° C.) at which frosting at the interior evaporator 207 can be prevented. The refrigerant outlet side of the evaporating pressure regulating valve 208 is connected to the other inflow port side of the refrigerant junction 209.

The refrigerant junction 209 joins the flow of the refrigerant flowing out of the chiller 206 and the flow of the refrigerant flowing out of the evaporating pressure regulating valve 208. The refrigerant junction 209 is a three-way joint similar to the refrigerant branch 203. Two of the three inflow outlets of the refrigerant junction 209 are used as inflow ports, and the remaining one is used as an outflow port. The refrigerant suction side of the compressor 201 is connected to the outflow port of the refrigerant junction 209.

Next, the first fluid circulation circuit 300 will be described. The first fluid circulation circuit 300 is a fluid circulation circuit in which a high-temperature heat medium, which is a fluid, circulates. In the first fluid circulation circuit 300, an ethylene glycol aqueous solution is employed as the high-temperature heat medium. In the first fluid circulation circuit 300, a high-temperature-side pump 301, the heat radiator 202, a high-temperature-side radiator 303, a heater core 304, a high-temperature-side switching valve 310, and the like are disposed. The high-temperature-side radiator 303 and the heater core 304 correspond respectively to an outside heat exchanger and an inside heat exchanger.

The inlet side of a heat medium passage 302 of the heat radiator 202 is connected to a discharge port of the high-temperature-side pump 301. The high-temperature-side pump 301 pumps the high-temperature heat medium to the heat medium passage 302 of the heat radiator 202. The high-temperature-side pump 301 is an electric pump with its rotation speed (i.e., pumping capacity) controlled by a control voltage output from the control device 600.

An electric heater 306 is disposed on the outlet side of the heat medium passage 302 of the heat radiator 202. The electric heater 306 is a heating device that heats the high-temperature heat medium flowing out of the heat medium passage 302 of the heat radiator 202. In the first fluid circulation circuit 300, a positive temperature coefficient (PTC) heater having a PTC element (i.e., positive characteristic thermistor) is employed as the electric heater 306. The calorific value of the electric heater 306 is controlled by the control voltage output from the control device 600.

An inlet portion 311 of the high-temperature-side switching valve 310 is connected to the downstream side of the electric heater 306. The high-temperature-side switching valve 310 regulates a flow rate ratio between the high-temperature heat medium flowing into the high-temperature-side radiator 303 and the high-temperature heat medium flowing into the heater core 304. The high-temperature-side switching valve 310 constitutes the valve device of the present disclosure. The high-temperature-side switching valve 310 is configured as in the valve device 10 described in the first embodiment.

Figure 26:
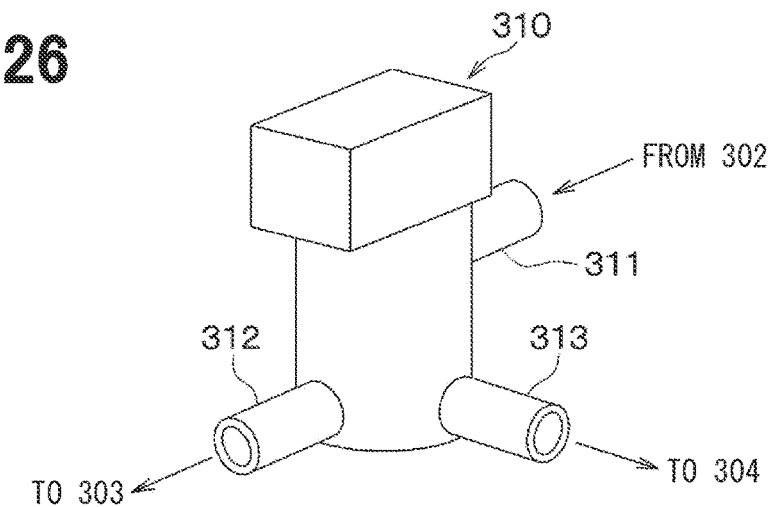
FIG. 26 is a schematic perspective view of a high-temperature-side switching valve according to the seventh embodiment.

As illustrated in FIG. 26, the high-temperature-side switching valve 310 includes an inlet portion 311 into which the high-temperature heat medium flows, a first outlet portion 312 from which the high-temperature heat medium is allowed to flow out to the high-temperature-side radiator 303, and a second outlet portion 313 from which the high-temperature heat medium is allowed to flow out to the heater core 304.

The first outlet portion 312 is connected to the fluid inlet side of the high-temperature-side radiator 303 and allows the high-temperature heat medium to flow out to the high-temperature-side radiator 303. The first outlet portion 312 corresponds to the first outlet portion 122 in the valve device 10 of the first embodiment.

The second outlet portion 313 is connected to the fluid inlet side of the heater core 304 and allows the high-temperature heating medium to flow out to the heater core 304. The second outlet portion 313 corresponds to the second outlet portion 123 in the valve device 10 of the first embodiment.

The inlet portion 311 is connected to the fluid outlet side of the high-temperature-side radiator 303 and the fluid outlet side of the heater core 304, and the high-temperature heat medium flows into the inlet portion 311 from the high-temperature-side radiator 303 and the heater core 304. The inlet portion 311 corresponds to the inlet portion 121 in the valve device 10 of the first embodiment.

The high-temperature-side switching valve 310 is configured such that a flow rate ratio between the high-temperature heat medium passing through the high-temperature-side radiator 303 and the high-temperature heat medium passing through the heater core 304 is regulated by rotationally shifting the rotor 22. Specifically, by increasing or decreasing the opening degree of the first passage hole 141a and the opening degree of the second passage hole 141b by the rotor 22, the high-temperature-side switching valve 310 regulates the flow rate ratio of the high-temperature heat medium passing through the high-temperature-side radiator 303 and the high-temperature heat medium passing through the heater core 304.

The operation of the high-temperature-side switching valve 310 is controlled by a control pulse output from the control device 600. The control device 600 also has a function as the valve controller 17 described in the first embodiment.

Returning to FIG. 25, the high-temperature-side radiator 303 is an exterior heat exchanger that exchanges heat between the high-temperature heat medium heated by the heat radiator 202 and the like and the air outside the vehicle compartment (i.e., outside air OA) blown from an outside air fan (not illustrated).

The high-temperature-side radiator 303 is disposed on the front side of the drive system housing chamber. During the traveling of the vehicle, traveling air (i.e., outside air OA) flowing into the drive system housing chamber via a grill can be blown against the high-temperature-side radiator 303. One inflow port side of a high-temperature-side junction 307 is connected to the fluid outlet side of the high-temperature-side radiator 303.

The heater core 304 is an interior heat exchanger that heats the ventilation air W by exchanging heat between the high-temperature heat medium heated by the heat radiator 202 and the like and the ventilation air W blown into the vehicle compartment. The heater core 304 is disposed in the casing 501 of the interior air conditioning unit 500. In the heater core 304, the ventilation air W is heated using the heat absorbed by the refrigerant in the chiller 206 as a heating source. The other inflow port side of the high-temperature-side junction 307 is connected to the fluid outlet side of the heater core 304.

The high-temperature-side junction 307 joins the flow of the refrigerant flowing out of the high-temperature-side radiator 303 and the flow of the refrigerant flowing out of the heater core 304. The high-temperature-side junction 307 is a three-way joint similar to the refrigerant junction 209. The fluid suction side of the high-temperature-side pump 301 is connected to the fluid outlet side of the high-temperature-side junction 307 via a high-temperature-side reserve tank 308.

The high-temperature-side reserve tank 308 is a storage part for a high-temperature heat medium that stores the high-temperature heat medium that is surplus in the first fluid circulation circuit 300. In the first fluid circulation circuit 300, by disposing the high-temperature-side reserve tank 308, a decrease in the liquid amount of the high-temperature heat medium circulating in the first fluid circulation circuit 300 is prevented. The high-temperature-side reserve tank 308 has a heat medium supply port for supplying the high-temperature heat medium when the liquid amount of the high-temperature heat medium circulating in the first fluid circulation circuit 300 is insufficient.

Next, the second fluid circulation circuit 400 will be described. The second fluid circulation circuit 400 is a fluid circulation circuit in which a low-temperature heating medium, which is a fluid, circulates. In the second fluid circulation circuit 400, the same type of heat medium as the high-temperature heat medium is employed as the low-temperature heat medium.

In the second fluid circulation circuit 400, a low-temperature-side pump 401, a heat medium passage 402 of the chiller 206, a low-temperature-side radiator 403, a passage switching valve 70, a cooling water passage 405 of the battery BT, a cooling water passage 406 of an in-vehicle device CE, and the like are disposed. The low-temperature-side radiator 403 and the cooling water passage 406 correspond respectively to an outside heat exchanger and a heat adjuster.

The inlet side of the heat medium passage 402 of the chiller 206 is connected to the fluid outlet side of the low-temperature-side pump 401. The low-temperature-side pump 401 is a pumping part that pumps the low-temperature heat medium to the heat medium passage 402 of the chiller 206. The basic configuration of the low-temperature-side pump 401 is the same as that of the high-temperature-side pump 301.

A first inlet portion 700A side of the passage switching valve 70 is connected to the fluid outlet side of the heat medium passage 402 of the chiller 206. The passage switching valve 70 is a circuit switching part that switches the circuit configuration of the second fluid circulation circuit 400. The passage switching valve 70 is provided with a plurality of inlets and a plurality of outlets. The cooling water passage 405 of the battery BT, and the low-temperature-side radiator 403, and the like are connected to these inlets and outlets. The detailed configuration of the passage switching valve 70 will be described later.

The battery BT supplies power to the electric in-vehicle device CE such as an electric motor. The battery BT is an assembled battery formed by electrically connecting a plurality of battery cells in series or in parallel. The battery cell is formed of a secondary battery that can be charged and discharged (e.g., lithium-ion battery). The battery BT is a battery in which the plurality of battery cells are stacked and arranged in a substantially rectangular parallelepiped shape and housed in a dedicated case.

In this type of battery BT, a chemical reaction is less likely to proceed, and the output is likely to decrease at a low temperature. The battery BT generates heat during charging and discharging. Further, the battery BT is likely to deteriorate at a high temperature. Therefore, the temperature of the battery BT is desirably held within an appropriate temperature range (e.g., 15° C. or higher and 55° C. or lower) in which the charge-discharge capacity of the battery BT can be utilized sufficiently.

The cooling water passage 405 of the battery BT is formed in the dedicated case of the battery BT. The cooling water passage 405 is a heat medium passage for exchanging heat between the low-temperature heat medium and the battery BT. More specifically, the cooling water passage 405 is a heat medium passage for absorbing heat that causes the low-temperature heat medium to absorb heat of the battery BT. Therefore, the battery BT also functions as a heating device that heats the low-temperature heating medium in the second fluid circulation circuit 400.

The passage configuration of the cooling water passage 405 of the battery BT is a passage configuration in which a plurality of passages are connected in parallel inside the dedicated case. As a result, the cooling water passage 405 of the battery BT is formed to be capable of uniformly absorbing heat from the entire region of the battery BT. In other words, the cooling water passage 405 is formed so as to uniformly absorb the heat of all the battery cells and uniformly cool all the battery cells.

The low-temperature-side radiator 403 is an exterior heat exchanger that exchanges heat between the low-temperature heat medium flowing out of a second outlet portion 700D of the passage switching valve 70 and the outside air OA blown from the outside air fan. The low-temperature-side radiator 403 is disposed on the front side of the drive system housing chamber and on the downstream side of the high-temperature-side radiator 303 in a flow direction of the outside air. Therefore, the low-temperature-side radiator 403 exchanges heat between the outside air OA having passed through the high-temperature-side radiator 303 and the low-temperature heat medium. The low-temperature-side radiator 403 may be formed integrally with the high-temperature-side radiator 303.

The heat medium outlet of the low-temperature-side radiator 403 is connected to one inflow port side of a low-temperature-side junction 407 via a low-temperature-side reserve tank 408.

The low-temperature-side reserve tank 408 is a storage part for a low-temperature heating medium that stores the low-temperature heating medium that is surplus in the second fluid circulation circuit 400. The basic configuration of the low-temperature-side reserve tank 408 is the same as that of the high-temperature-side reserve tank 308. The low-temperature-side junction 407 is a three-way joint similar to the high-temperature-side junction 307 and the like.

The fluid suction side of the low-temperature-side pump 401 is connected to the fluid outlet side of the low-temperature-side junction 407. In other words, the low-temperature-side pump 401 is disposed in the passage from the outflow port of the low-temperature-side junction 407 to the fluid inlet side of the heat medium passage 402 of the chiller 206 in the second fluid circulation circuit 400.

A device cooling passage 410 in which the cooling water passage 406 of the in-vehicle device CE is disposed is connected to the second fluid circulation circuit 400. The device cooling passage 410 is connected to the second fluid circulation circuit 400 to return the low-temperature heat medium on the downstream side of the low-temperature-side reserve tank 408 and on the upstream side of the low-temperature-side junction 407 to the inlet side of the low-temperature-side radiator 403 again.

A device pump 411 is disposed in the device cooling passage 410. The device pump 411 pumps the low-temperature heating medium to the cooling water passage 406 of the in-vehicle device CE. The basic configuration of the device pump 411 is the same as that of the low-temperature-side pump 401.

The in-vehicle device CE is a heat generator that generates heat during operation. Specifically, the in-vehicle device CE is an electric motor, an inverter, a control device for an advanced operation system, or the like. The electric motor is an in-vehicle device that outputs a driving force for traveling. The inverter is an in-vehicle device that supplies electric power to the electric motor. An advanced driving system control device is a control device for a so-called ADAS. ADAS is an abbreviation for advanced driver assistance system.

In order to appropriately operate the in-vehicle device CE, similarly to the battery BT, it is desirable that the in-vehicle device CE is held within an appropriate temperature range. However, an appropriate temperature range of the battery BT and an appropriate temperature range of the in-vehicle device CE are different. In the present embodiment, the upper limit value of the appropriate temperature range of the in-vehicle device CE is higher than the upper limit value of the appropriate temperature range of the battery BT.

The cooling water passage 406 through which the low-temperature heating medium is allowed to flow is formed inside a housing part or a case forming an outer shell of the in-vehicle device CE. The cooling water passage 406 is a heat-absorbing heat medium passage that causes the low-temperature heat medium to absorb heat (i.e., waste heat of the in-vehicle device CE) of the in-vehicle device CE. The cooling water passage 406 constitutes a temperature regulating part that regulates the temperature of the in-vehicle device CE which is a heat generator.

Further, a device bypass passage 420 is connected to the second fluid circulation circuit 400. The device bypass passage 420 corresponds to a bypass portion. The device bypass passage 420 is a heat medium passage that returns the low-temperature heat medium flowing out of the cooling water passage 406 of the in-vehicle device CE to the fluid inlet side of the device pump 411 again, while causing the low-temperature heat medium to bypass the low-temperature-side radiator 403 and the like. The device bypass passage 420 constitutes a bypass part that causes the low-temperature heat medium to bypass the low-temperature-side radiator 403 which is the exterior heat exchanger.

In the device cooling passage 410, a device flow rate regulating valve 412 is disposed on the upstream side of the connection part with the device bypass passage 420. The device flow rate regulating valve 412 is an electric flow rate regulating valve including a valve body that changes a passage cross-sectional area of the device cooling passage 410 and an electric actuator (e.g., stepping motor) that shifts the valve body. The operation of the device flow rate regulating valve 412 is controlled by a control pulse output from the control device 600.

A low-temperature-side switching valve 430 is disposed at a connection part between the device cooling passage 410 and the device bypass passage 420. The low-temperature-side switching valve 430 regulates a flow rate ratio between the low-temperature heat medium flowing into the low-temperature-side radiator 403 and the low-temperature heat medium flowing into the device bypass passage 420. The low-temperature-side switching valve 430 constitutes the valve device of the present disclosure similarly to the high-temperature-side switching valve 310. The low-temperature-side switching valve 430 is configured as in the valve device 10 described in the first embodiment.

Figure 27:
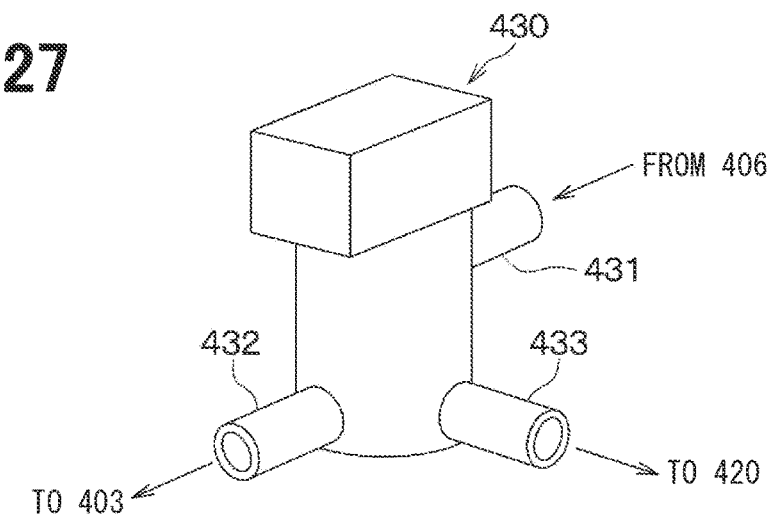
FIG. 27 is a schematic perspective view of a low-temperature-side switching valve according to the seventh embodiment.

As illustrated in FIG. 27, the low-temperature-side switching valve 430 includes an inlet portion 431 into which the low-temperature heat medium flows, a first outlet portion 432 from which the low-temperature heat medium is allowed to flow out to the low-temperature-side radiator 403, and a second outlet portion 433 from which the low-temperature heat medium is allowed to flow out to the device bypass passage 420.

The first outlet portion 432 is connected to the fluid inlet side of the low-temperature-side radiator 403 and allows the low-temperature heat medium to flow out to the low-temperature-side radiator 403. The first outlet portion 432 corresponds to the first outlet portion 122 in the valve device 10 of the first embodiment.

The second outlet portion 433 is connected to the fluid inlet side of the device bypass passage 420 and allows the low-temperature heating medium to flow out to the device bypass passage 420. The second outlet portion 433 corresponds to the second outlet portion 123 in the valve device 10 of the first embodiment.

The inlet portion 431 is connected to the fluid outlet side of the cooling water passage 406 of the in-vehicle device CE which is the temperature regulating part, and the fluid passing through the cooling water passage 406 flows into the inlet portion 431. The inlet portion 431 corresponds to the inlet portion 121 in the valve device 10 of the first embodiment.

The low-temperature-side switching valve 430 is configured such that a flow rate ratio between the low-temperature heat medium passing through the low-temperature-side radiator 403 and the low-temperature heat medium passing through the device bypass passage 420 is regulated by rotationally shifting the rotor 22. Specifically, by increasing or decreasing the opening degree of the first passage hole 141 and the opening degree of the second passage hole 141b by the rotor 22, the low-temperature-side switching valve 430 regulates the flow rate ratio of the low-temperature heat medium passing through the low-temperature-side radiator 403 and the low-temperature heat medium passing through the device bypass passage 420.

The operation of the low-temperature-side switching valve 430 is controlled by a control pulse output from the control device 600. The control device 600 also has a function as the valve controller 17 described in the first embodiment.

Returning to FIG. 25, the second fluid circulation circuit 400 is connected with a short-circuiting heat medium passage 440 that guides the low-temperature heat medium flowing out of the third outlet portion 700E of the passage switching valve 70 to the other inflow port of the low-temperature-side junction 407.

Figure 28:
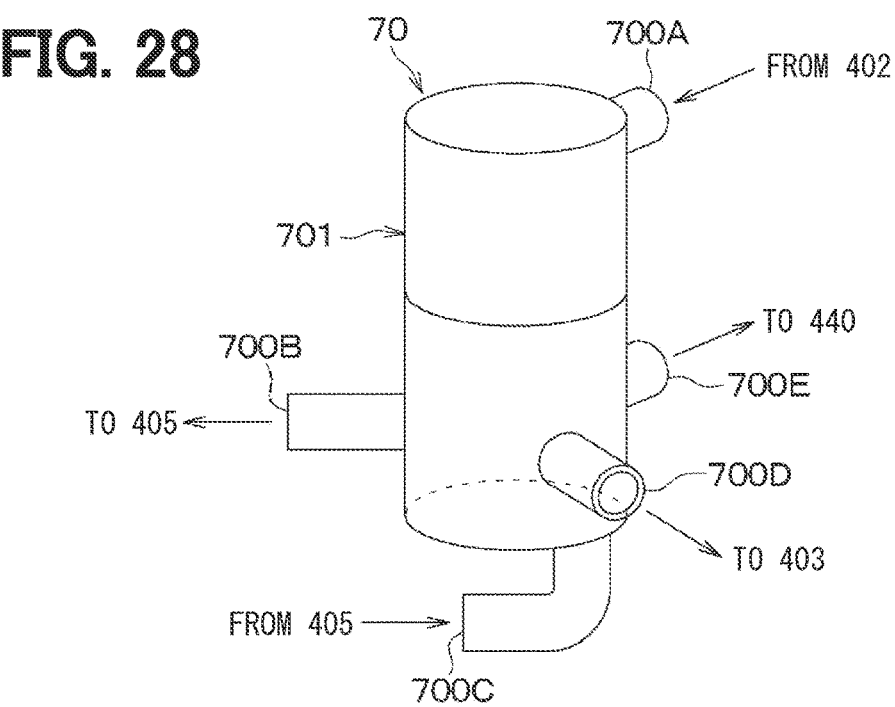
FIG. 28 is a schematic perspective view of a passage switching valve according to the seventh embodiment.
Figure 29:
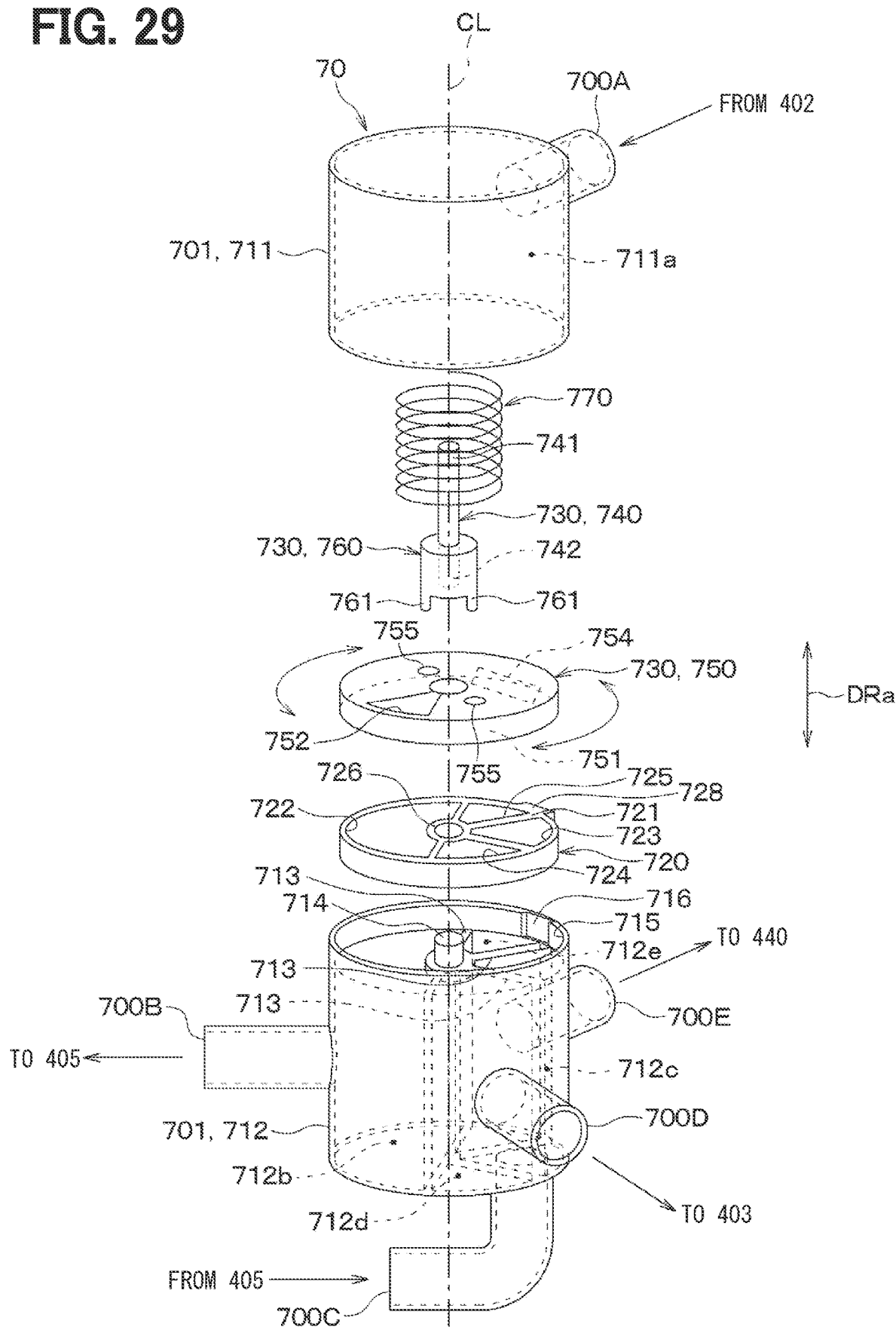
FIG. 29 is a schematic exploded perspective view of the passage switching valve.

Next, a detailed configuration of the passage switching valve 70 will be described with reference to FIGS. 28 and 29. As illustrated in the external perspective view of FIG. 28, the passage switching valve 70 has a body 701 made of resin and formed in a bottomed cylindrical shape. The body 701 is a housing having a plurality of inlets into which the low-temperature heating medium is allowed to flow and a plurality of outlets from which the low-temperature heating medium is allowed to flow out of the inside. Specifically, the body 701 of the present embodiment has two inlets and three outlets. Hence, the passage switching valve 70 is a five-way valve having five ports.

Specifically, the passage switching valve 70 is provided with the first inlet portion 700A and a second inlet portion 700C. The first inlet portion 700A is an inlet into which the low-temperature heat medium, which is pumped from the low-temperature-side pump 401 and has passed through the heat medium passage 402 of the chiller 206, flows. The second inlet portion 700C is an inlet into which the low-temperature heat medium flowing out of the cooling water passage 405 of the battery BT flows.

The passage switching valve 70 is provided with a first outlet portion 700B, the second outlet portion 700D, and a third outlet portion 700E. The first outlet portion 700B is an outlet from which the low-temperature heating medium is allowed to flow out to the fluid inlet side of the cooling water passage 405 of the battery BT. The second outlet portion 700D is an outlet from which the low-temperature heat medium is allowed to flow out to the fluid inlet side of the low-temperature-side radiator 403. The third outlet portion 700E is an outlet from which the low-temperature heat medium is allowed to flow out to the fluid inlet side of the heat medium passage 402 of the chiller 206 (i.e., to the short-circuiting heat medium passage 440).

Here, the cooling water passage 405 of the battery BT is disposed in the heat medium passage from the first outlet portion 700B to the second inlet portion 700C. In other words, the cooling water passage 405 of the battery BT is disposed in the heat medium passage from the first outlet portion 700B to the second inlet portion 700C. The second inlet portion 700C serves as an inlet through which the low-temperature heating medium flowing out of the body 701 from the first outlet portion 700B is allowed to flow into the inside again.

The body 701 of the passage switching valve 70 is divided into a first body 711 and a second body 712. The first body 711 and the second body 712 are both formed in a cylindrical shape and disposed coaxially. One end side of the first body 711 in the axial direction DRa is closed by the lid part, and the other end side is opened. The other end side in the axial direction DRa of the second body 712 is closed by the bottom part, and one end side is opened.

A stator 720 is disposed inside the body 701. The stator 720 is disposed near a connection part between the first body 711 and the second body 712. A plurality of spaces are formed inside the body 701 by the stator 720.

Specifically, a first inlet-side space 711a is formed inside the first body 711. The first inlet-side space 711a is a substantially columnar space communicating with the first inlet portion 700A. A first outlet-side space 712b, a second inlet-side space 712c, a second outlet-side space 712d, and a third outlet-side space 712e are formed inside the second body 712. More specifically, a plurality of partition plates 713 radially extending from an axis CL of a shaft 740 is disposed inside the second body 712.

The partition plates 713 partition the internal space of the second body 712 into a plurality of spaces in the circumferential direction DRc. Further, the partition plates 713 have a cylindrical holding portion 714 at a substantially central portion. The cylindrical holding portion 714 is inserted into the stator holding hole 726 of the stator 720. The cylindrical holding portion 714 protrudes from the partition plates 713 toward one side in the axial direction DRa.

The first outlet-side space 712b is a space communicating with the first outlet portion 700B. The second inlet-side space 712c is a space communicating with the second inlet portion 700C. The second outlet-side space 712d is a space communicating with the second outlet portion 700D. The third outlet-side space 712e is a space communicating with the third outlet portion 700E.

Each of the first outlet-side space 712b, the second inlet-side space 712c, the second outlet-side space 712d, and the third outlet-side space 712e is a columnar space formed in a sector shape (i.e., a fan shape) in cross section and extending in the axial direction DRa. The first outlet-side space 712b, the third outlet-side space 712e, the second inlet-side space 712c, and the second outlet-side space 712d are arranged in this order in the clockwise direction when viewed from the first body 711 side in the axial direction DRa. That is, the second inlet-side space 712c is disposed so as to be adjacent to both the second outlet-side space 712d and the third outlet-side space 712e in the circumferential direction DRc.

Further, the stator 720 has an engaging protrusion 728 at the stator outer wall portion 727 facing the inner wall portion 715 defining an inner space of the body 701. The engaging protrusion 728 is formed to be engaged with the engaging recess 716 formed in the inner wall portion 715. That is, the engaging protrusion 728 and the engaging recess 716 are stator movement restricting portions that restrict the stator 720 from moving in the circumferential direction DRc.

It is desirable that the engaging protrusion 728 is formed at a portion of the stator outer wall portion 727 located away from a portion defining a passage through which the fluid flows into the passage switching valve 70 or the portion defining the passage through which the fluid flows into the passage switching valve 70. Specifically, it is desirable that the engaging protrusion 728 is formed at a portion of the stator outer wall portion 727 near a portion defining a second passage hole 723 fluidly connected to the second inlet side space 712c or a portion of the stator outer wall portion 727 away from the portion defining the second passage hole 723. The second inlet side space 712c and the second passage hole 723 will be described later.

For example, in the present embodiment, the engaging protrusion 728 is formed at a portion near a portion defining the second passage hole 723 which will be described later. The engaging protrusion 728 may be formed at a portion distant from the portion defining the second passage hole 723 which will be described later. That is, the engaging protrusion 728 may be formed at a portion close to a portion facing the second passage hole 723 in the radial direction of the axis CL of the shaft 740.

The engaging protrusion 728 corresponds to the engaging protrusion 32 in the valve device 10 of the first embodiment. Further, the engaging recess 716 corresponds to the engaging recess 31 in the valve device 10 of the first embodiment. That is, the structure formed of the engaging protrusion 728 and the engaging recess 716 corresponds to the engaging structure 30 of the valve device 10 of the first embodiment. Since the engaging protrusion 728 and the engaging recess 716 have similar structure to the engaging structure 30 of the first embodiment, the description thereof will be omitted in the present embodiment.

The stator 720 is a member corresponding to the stator 14 of the valve device 10 of the first embodiment. The constituent material and the like of the stator 720 are configured in the same manner as those of the stator 14 of the first embodiment.

The stator 720 is formed of a disc-shaped member having a thickness direction in the axial direction DRa. The stator 720 has an opening surface 721 as a surface on which a rotor 750 to be described later slides. The opening surface 721 is a sealing surface corresponding to a sliding surface 751 of the rotor 750 to be described later.

The stator 720 constitutes a passage formation part formed with a passage hole through which a fluid passes. In the stator 720, a first passage hole 722, a second passage hole 723, a third passage hole 724, and a fourth passage hole 725 through which a fluid passes are formed.

Specifically, the first passage hole 722 is provided in a portion of the stator 720 corresponding to the first outlet-side space 712b so as to communicate with the first outlet-side space 712b. The second passage hole 723 is provided in a portion of the stator 720 corresponding to the second inlet-side space 712c so as to communicate with the second inlet-side space 712c. The third passage hole 724 is provided in a portion of the stator 720 corresponding to the second outlet-side space 712d so as to communicate with the second outlet-side space 712d. The fourth passage hole 725 is provided in a portion of the stator 720 corresponding to the third outlet-side space 712e so as to communicate with the third outlet-side space 712e. Further, the stator 720 has a stator holding hole 726 at a substantially central portion of the opposite surface in the axial direction DRa. The cylindrical holding portion 714 is inserted into the stator holding hole 726.

The driving portion is a device for outputting rotational force. The driving portion is a device corresponding to the driving portion 16 of the valve device 10 of the first embodiment. The driving portion of the present embodiment is configured in the same manner as the driving portion 16 of the first embodiment.

A rotating portion 730, which rotates by a rotational force output from the driving portion, and an elastic member 770 are disposed inside the body 701. The rotating portion 730 corresponds to the rotating portion 18 of the valve device 10 of the first embodiment. The rotating portion 730 includes the shaft 740, the rotor 750 as a valve body, and an intermediate element 760 that couples the rotor 750 to the shaft 740.

The shaft 740 is a rotational shaft that rotates about the predetermined axis CL that is an axis of the shaft 740 by a rotational force output by the driving portion. The shaft 740 extends along the axial direction DRa. The shaft 740 has one end portion 741 and the other end portion 742 in the axial direction DRa opposite to the one end portion 741. The rotational force is transmitted from the driving portion 16 to the one end portion 741. The other end portion 742 is coupled to the rotor 750 via the intermediate element 760 so as to be relatively non-rotatable.

The connection structure between the shaft 740 and the rotor 750 is similar to the connection structure between the shaft 20 and the rotor 22 of the valve device 10 of the first embodiment. That is, the connecting structure of the shaft 740 and the rotor 750 is configured by a structure in which the press-fitting pins 761 formed in the intermediate element 760 are press-fitted into the pin insertion portions 755 formed in the rotor 750. Since the connection structure of the present embodiment is similar to the connection structure of the first embodiment, the description thereof will be omitted.

The rotor 750 is a valve body that increases or decreases the opening degree of each of the passage holes 722 to 725 formed in the stator 720 with the rotation of the shaft 740. The rotor 750 is a member corresponding to the rotor 22 of the valve device 10 of the first embodiment. The constituent material and the like of the rotor 750 are configured in the same manner as those of the rotor 22 of the first embodiment.

The rotor 750 is disposed in the first inlet-side space 711a so as to face the stator 720 in the axial direction DRa. The rotor 750 has the sliding surface 751 facing the opening surface 721 of the stator 720. The sliding surface 751 is a sealing surface that seals the opening surface 721 of the stator 720.

A rotor hole 752 is formed in the rotor 750 at a position eccentric to the axis CL of the shaft 20. The rotor hole 752 is a through hole penetrating in the axial direction DRa. The rotor hole 752 is formed in a portion of the rotor 750 overlapping each of the passage holes 722 to 725 in the axial direction DRa when the rotor 750 is rotated.

The rotor 750 has a rotor holding hole 753 at a substantially central portion thereof. The rotor holding hole 753 is a through hole through which the cylindrical holding portion 714 formed in the partition plates 713 is inserted.

The intermediate element 760 is a member that couples the rotor 750 to the shaft 740, and forms a part of a coupling structure that couples the rotor 750 to the shaft 740. The intermediate element 760 is configured in the same manner as the intermediate element 24 of the valve device 10 of the first embodiment.

The elastic member 770 is a member that biases the rotor 22 toward the stator 720 corresponding to the passage formation part. The elastic member 770 is configured in the same manner as the elastic member 26 of the valve device 10 of the first embodiment.

The passage switching valve 70 of the present embodiment can cause the first inlet-side space 711a to communicate with any one of the outlet-side spaces 712b, 712d, 712e via the rotor hole 752 and one of the passage holes 723, 724, 725 by rotationally shifting the rotor 750. That is, the passage switching valve 70 can allow the low-temperature heat medium flowing in from the first inlet portion 700A to flow out of any one of the plurality of outlet portions 700B, 700D, 700E by rotationally shifting the rotor 750.

Specifically, the passage switching valve 70 can cause the first inlet-side space 711a to communicate with any one of the first outlet-side space 712b, the second outlet-side space 712d, and the third outlet-side space 712e by rotationally shifting the rotor 750. Accordingly, the low-temperature heat medium flowing in from the first inlet portion 700A can be switched to any one of a passage configuration for allowing the low-temperature heat medium to flow out of the first outlet portion 700B, a passage configuration for allowing the low-temperature heat medium to flow out of the second outlet portion 700D, and a passage configuration for allowing the low-temperature heat medium to flow out of the third outlet portion 700E.

In the passage configuration for allowing the low-temperature heat medium flowing in from the first inlet portion 700A to flow out of the first outlet portion 700B, the low-temperature heat medium flowing in the first inlet-side space 711a is allowed to flow from one side to the other side in the axial direction DRa of the body 701. This also applies to the passage configuration for allowing the low-temperature heat medium flowing in from the first inlet portion 700A to flow out of the second outlet portion 700D and the passage configuration for allowing the low-temperature heat medium flowing in from the first inlet portion 700A to flow out of the third outlet portion 700E.

Figure 30:
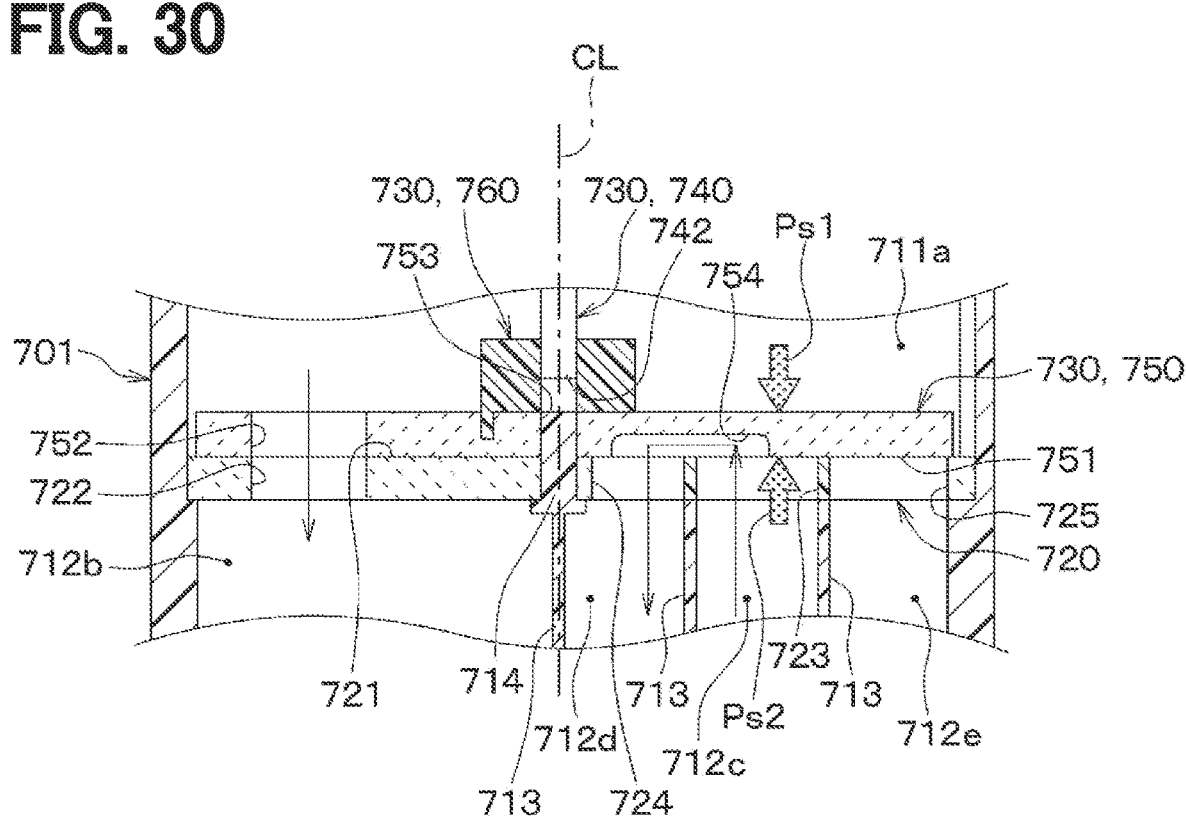
FIG. 30 is a view for explaining a passage configuration of the passage switching valve.

Here, as illustrated in FIG. 30, the sliding surface 751 of the rotor 750 is formed with a communication groove 754 that causes adjacent spaces among the second inlet-side space 712c, the second outlet-side space 712d, the first outlet-side space 712b, and the third outlet-side space 712e to communicate with each other. The rotor hole 752 and the communication groove 754 are disposed substantially symmetrically with respect to the axis CL of the shaft 740. That is, the rotor hole 752 and the communication groove 754 are arranged at an angle of about 180° around the axis CL of the shaft 740.

Thus, the second inlet-side space 712c can be caused to communicate with any one of the plurality of outlet-side spaces via the communication groove 754 by rotationally shifting the rotor 750. In the present embodiment, by appropriately setting the positional relationship between the rotor hole 752 and the communication groove 754, the outlet-side space communicating the first inlet-side space 711a is different from the outlet-side space communicating the second inlet-side space 712c.

In other words, by rotationally shifting the rotor 750, it is possible to switch to the passage configuration for allowing the low-temperature heat medium flowing in from the second inlet portion 700C to flow out of any one of the plurality of outlets. The outlet through which the low-temperature heat medium flowing in from the second inlet portion 700C flows out is different from the outlet through which the low-temperature heat medium flowing in from the first inlet portion 700A flows out.

In the present embodiment, specifically, the second inlet-side space 712c can be caused to communicate with any one of the second outlet-side space 712d and the third outlet-side space 712e by rotationally shifting the rotor 750. Accordingly, the low-temperature heat medium flowing in from the second inlet portion 700C can be switched to either the passage configuration for allowing the low-temperature heat medium to flow out of the second outlet portion 700D or the passage configuration for allowing the low-temperature heat medium to flow out of the third outlet portion 700E.

In the passage configuration for allowing the low-temperature heat medium flowing in from the second inlet portion 700C to flow out of the second outlet portion 700D, the flow of the low-temperature heat medium flowing in the second inlet-side space 712c from the other side to the one side in the axial direction DRa of the shaft 740 is diverted in the opposite direction in the communication groove 754. As a result, in the second outlet-side space 712d, the low-temperature heat medium flows from one side to the other side in the axial direction DRa of the shaft 740. This also applies to the passage configuration for allowing the low-temperature heat medium flowing in from the second inlet portion 700C to flow out of the third outlet portion 700E.

Here, the first inlet-side space 711a and the second inlet-side space 712c are formed on opposite sides of the rotor 750. Therefore, the rotor 750 is disposed inside the body 701 as a housing such that the pressure Ps1 of the first inlet-side space 711a and the pressure Ps2 of the second inlet-side space 712c act in opposite directions to each other.

Figure 31:
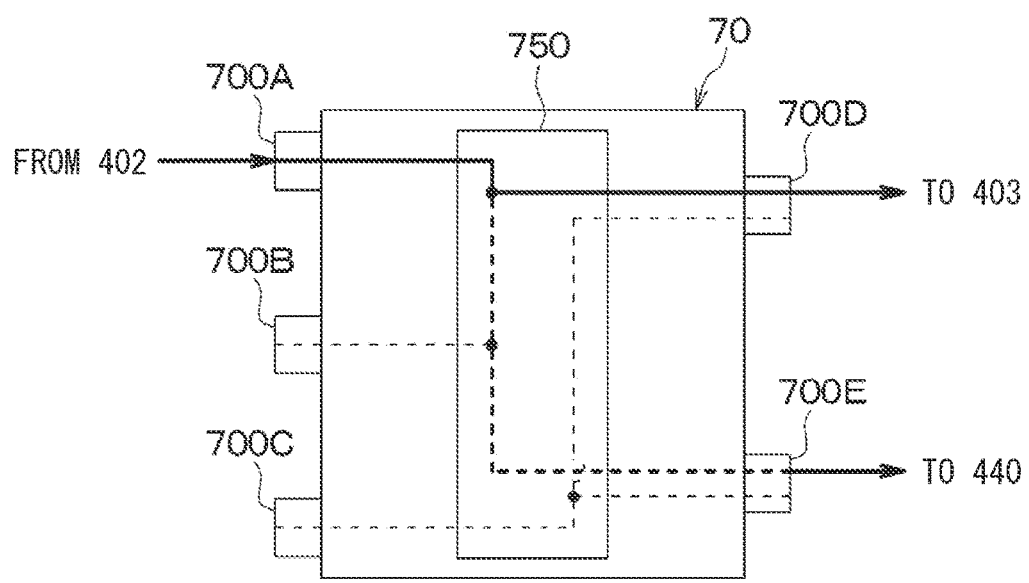
FIG. 31 is an explanatory diagram illustrating an example of a switching mode of the passage configuration of the passage switching valve.

As indicated by a thick line and a thick broken line in FIG. 31, the passage switching valve 70 configured as described above can switch between the passage configuration for allowing the low-temperature heat medium flowing into the inside from the first inlet portion 700A to flow out of the second outlet portion 700D and the passage configuration for allowing the low-temperature heat medium to flow out of the third outlet portion 700E.

Figure 32:
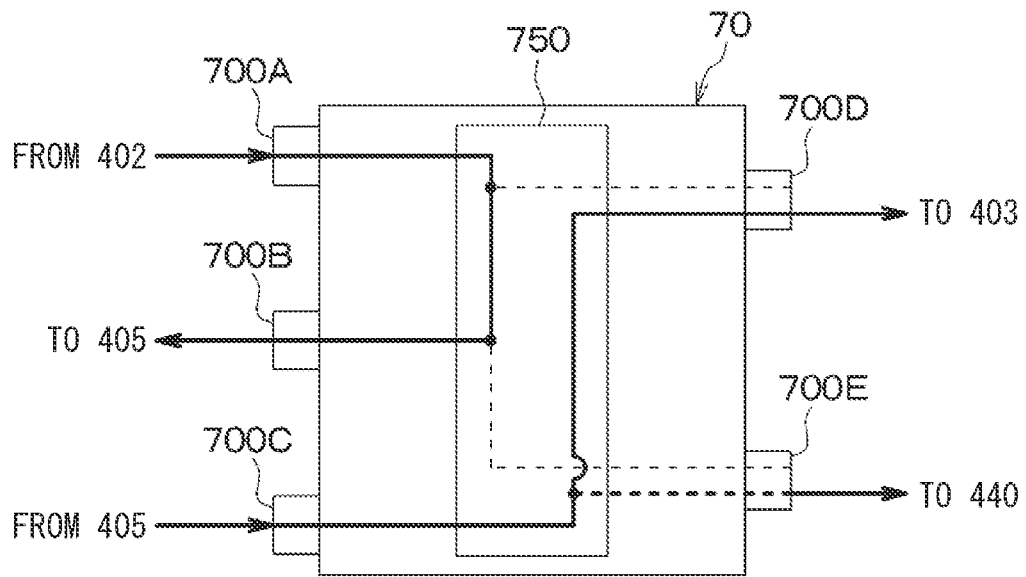
FIG. 32 is an explanatory diagram illustrating another example of the switching mode of the passage configuration of the passage switching valve.

Further, as indicated by a thick solid line in FIG. 32, the passage switching valve 70 can allow the low-temperature heat medium flowing into the inside from the first inlet portion 700A to flow out of the first outlet portion 700B. In this state, as indicated by a thick line and a thick broken line in FIG. 32, it is possible to switch between the passage configuration for allowing the low-temperature heat medium flowing into the inside from the second inlet portion 700C to flow out of the second outlet portion 700D and the passage configuration for allowing the low-temperature heat medium to flow out of the third outlet portion 700E.

Figure 33:
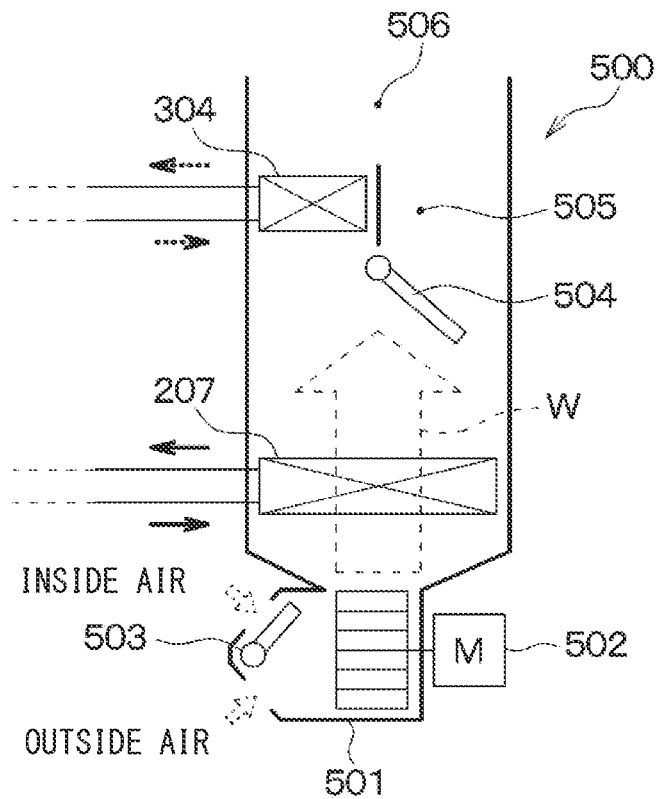
FIG. 33 is a schematic configuration diagram of an air-conditioning unit according to the seventh embodiment.

Next, the interior air conditioning unit 500 will be described with reference to FIG. 33. The interior air conditioning unit 500 of the temperature adjusting apparatus 1 is a unit for blowing the ventilation air W with its temperature appropriately regulated to an appropriate position in the vehicle compartment. The interior air conditioning unit 500 is disposed inside an instrument panel at the foremost part in the vehicle compartment.

The interior air conditioning unit 500 includes the casing 501 that forms an air passage for the ventilation air W. An interior blower 502, the interior evaporator 207, the heater core 304, and the like are disposed in an air passage formed in the casing 501. The casing 501 is made of resin (e.g., polypropylene) having a certain degree of elasticity and excellent strength.

An inside and outside air switching device 503 is disposed on the most upstream side of the casing 501 in the ventilation airflow direction. The inside and outside air switching device 503 make switching to introduce air inside the vehicle compartment (i.e., inside air) and the air outside the vehicle compartment (i.e., outside air) into the casing 501. The operation of the electric actuator for driving the inside and outside air switching device 503 is controlled by a control signal output from the control device 600.

The interior blower 502 is disposed downstream of the inside and outside air switching device 503. The interior blower 502 blows air sucked through the inside and outside air switching device 503 toward the vehicle compartment. The interior blower 502 is an electric blower that drives a fan with an electric motor. The rotation speed (i.e., air blowing capacity) of the interior blower 502 is controlled by a control voltage output from the control device 600.

The interior evaporator 207 and the heater core 304 are disposed downstream of the interior blower 502 in this order with respect to the ventilation airflow. That is, the interior evaporator 207 is disposed upstream of the heater core 304. A cold air bypass passage 505 is formed in the casing 501 to cause the ventilation air W having passed through the interior evaporator 207 to flow downstream while bypassing the heater core 304.

An air mix door 504 is disposed downstream of the interior evaporator 207 and upstream of the heater core 304. The air mix door 504 adjusts an air flow ratio of an air volume of the ventilation air W passing through the heater core 304 to an air volume of the ventilation air W passing through the cold air bypass passage 505, among the ventilation air W after passing through the interior evaporator 15. The operation of the electric actuator for driving the air mix door is controlled by a control signal output from the control device 600.

A mixing space 506 for mixing the ventilation air W heated by the heater core 304 and the ventilation air W passing through the cold air bypass passage 505 and not heated by the heater core 304 is provided downstream of the heater core 304. Further, opening holes (not illustrated) through which the conditioned air mixed in the mixing space 506 is blown into the vehicle compartment are disposed on the most downstream side of the casing 501.

Therefore, the temperature of the conditioned air mixed in the mixing space 506 is regulated by the air mix door 504 regulating the air volume ratio between the volume of air passing through the heater core 304 and the volume of air passing through the cold air bypass passage 505. Then, the temperature of the ventilation air W blown into the vehicle compartment from each opening hole can be regulated.

The opening holes include a face opening hole, a foot opening hole, and a defroster opening hole (any of them is not shown). The face opening hole is an opening aperture for discharging the air-conditioning wind toward an upper body of an occupant in the vehicle compartment. The foot opening hole is an opening hole for blowing the conditioned air toward the feet of the occupant. The defroster opening hole is an opening hole through which the conditioned air is blown toward the inside surface of the wind shield of the vehicle.

A blowing mode switching door (not illustrated) is disposed on the upstream side of these opening holes. The blowing mode switching door opens and closes each opening hole to switch the opening hole through which the conditioned air is blown. The operation of the electric actuator for driving the blowing mode switching door is controlled by a control signal output from the control device 600.

Next, an outline of an electric controller of the temperature adjusting apparatus 1 will be described. The control device 600 is made up of a microcomputer including a processor, a memory, and the like, and peripheral circuits thereof. The control device 600 performs various calculations and processing based on an air conditioning control program stored in the memory and controls operations of various devices and the like connected to the output side. The memory is a non-transitory tangible storage medium.

As illustrated in FIG. 25, a control sensor group 610 is connected to the input side of the control device 600. The control sensor group 610 includes an inside air temperature detector that detects a vehicle compartment temperature (inside air temperature) Tr, a battery temperature detector that detects a temperature of the battery BT, an in-vehicle device temperature detector that detects a temperature of the in-vehicle device CE, and the like.

An operation panel 620 is connected to the input side of the control device 600. The operation panel 620 is provided with, for example, a temperature setting part that sets the vehicle compartment temperature. A detection signal of the sensor group 610 and an operation signal of the operation panel 620 are input to the control device 600.

The control device 600 is integrally formed with a controller that controls various devices connected to the output side of the control device 600. That is, a configuration (i.e., hardware and software) for controlling the operation of each control target device constitutes a controller that controls the operation of each control target device. For example, in the control device 600, a configuration that controls the operations of the high-temperature-side switching valve 310, the low-temperature-side switching valve 430, and the passage switching valve 70 constitutes a valve controller 600a. In FIG. 25, for clarity, the illustration of signal lines and power lines connecting the control device 600 and various control target devices, signal lines connecting the control device 600 and various sensors, and the like is omitted.

Next, the operation of the temperature adjusting apparatus 1 having the above configuration will be described. The temperature adjusting apparatus 1 of the present embodiment can switch various operation modes for air conditioning in the vehicle compartment and temperature regulation of the battery BT. Specifically, the temperature adjusting apparatus 1 can be switched to a device cooling mode, an outside-air cooling mode, and an outside-air heat absorbing mode. Hereinafter, each operation mode will be described.

(A) Device Cooling Mode

The device cooling mode is an operation mode in which the refrigeration cycle device 200 is operated to perform air conditioning in the vehicle compartment and the battery BT is cooled by the low-temperature heat medium cooled by the refrigeration cycle device 200.

In the device cooling mode, the control device 600 controls the operation of the passage switching valve 70 so that the low-temperature heat medium flowing in from the first inlet portion 700A flows out of the first outlet portion 700B and the low-temperature heat medium flowing in from the second inlet portion 700C flows out of the third outlet portion 700E.

Figure 34:
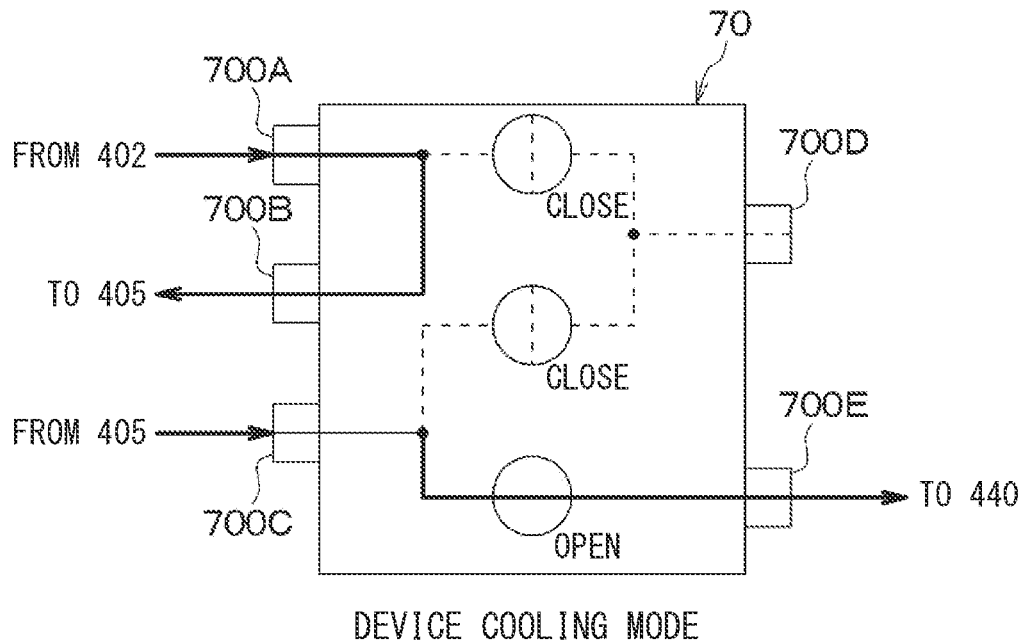
FIG. 34 is an explanatory diagram illustrating a passage configuration of the passage switching valve in a device cooling mode.

Therefore, in the second fluid circulation circuit 400 in the device cooling mode, as illustrated in FIG. 34, the low-temperature heat medium discharged from the low-temperature-side pump 401 flows into the first inlet portion 700A of the passage switching valve 70 via the heat medium passage of the chiller 206. Then, the low-temperature heat medium flowing into the first inlet portion 700A flows out of the first outlet portion 700B of the passage switching valve 70 and then flows into the second inlet portion 700C of the passage switching valve 70 via the cooling water passage 405 of the battery BT. The low-temperature heat medium flowing into the second inlet portion 700C flows out of the third outlet portion 700E of the passage switching valve 70 and is then sucked again into the low-temperature-side pump 401 via the short-circuiting heat medium passage 440.

In the refrigeration cycle device 200 in the device cooling mode, when the control device 600 operates the compressor 201, the high-pressure refrigerant discharged from the compressor 201 flows into the heat radiator 202. The control device 600 regulates the refrigerant discharge capacity of the compressor 201 so that the temperature of the ventilation air W cooled by the interior evaporator 207 becomes a target evaporator temperature TEO.

The target evaporator temperature TEO is determined based on a detection signal of the sensor group 610 connected to the control device 600 with reference to a control map stored in advance in the control device 600. The control map is configured such that the target evaporator temperature TEO is equal to or higher than a frosting prevention temperature (e.g., 1° C.) in order to prevent frosting on the interior evaporator 207.

The refrigerant flowing into the heat radiator 202 is pumped from the high-temperature-side pump 301 and dissipates heat to the high-temperature heat medium flowing through the heat medium passage 302 to become a sub-cooled liquid-phase refrigerant. As a result, the high-temperature heat medium flowing through the heat medium passage 302 is heated.

The flow of the refrigerant flowing out of the heat radiator 202 is branched at the refrigerant branch 203. One refrigerant branched at the refrigerant branch 203 is decompressed by the first expansion valve 204 and flows into the chiller 206. The control device 600 regulates the throttle opening of the first expansion valve 204 such that the temperature of the low-temperature heat medium flowing out of the heat medium passage 402 of the chiller 206 approaches the target cooling temperature TBO.

The target cooling temperature TBO is determined based on a detection signal of the sensor group 610 connected to the control device 600 with reference to a control map stored in advance in the control device 600. In this control map, the target cooling temperature TBO is determined such that the temperature of the battery BT is held within an appropriate temperature range.

The refrigerant flowing into the chiller 206 absorbs heat from the low-temperature heat medium flowing through the heat medium passage 402 and evaporates. As a result, the low-temperature heating medium flowing through the heat medium passage 402 is cooled. The refrigerant flowing out of the chiller 206 flows into the refrigerant junction 209.

The other refrigerant branched at the refrigerant branch 203 is decompressed by the second expansion valve 205 and flows into the interior evaporator 207. The control device 600 regulates the throttle opening of the second expansion valve 205 such that the refrigerant sucked into the compressor 201 approaches a predetermined reference superheating degree KSH (e.g., 5° C.). Thus, in the device cooling mode, the refrigerant evaporation temperature at the interior evaporator 207 may be equivalent to the refrigerant evaporation temperature in the chiller 206.

The refrigerant flowing into the interior evaporator 207 absorbs heat from the ventilation air W blown from the interior blower 502 and evaporates. Thereby, the ventilation air W is cooled. The refrigerant flowing out of the interior evaporator 207 flows into the refrigerant junction 209 via the evaporating pressure regulating valve 208. The refrigerant junction 209 joins the flow of the refrigerant flowing out of the interior evaporator 207 and the flow of the refrigerant flowing out of the chiller 206 and allows the joined refrigerant to flow out to the suction side of the compressor 201.

In the first fluid circulation circuit 300, when the control device 600 operates the high-temperature-side pump 301, the high-temperature heat medium pumped from the high-temperature-side pump 301 flows into the heat medium passage 302 of the heat radiator 202. The high-temperature heat medium flowing into the heat medium passage 302 exchanges heat with the high-pressure refrigerant to be heated.

The high-temperature heat medium flowing out of the heat radiator 202 flows into the high-temperature-side switching valve 310 and is divided into a flow flowing into the high-temperature-side radiator 303 and a flow flowing into the heater core 304 from the high-temperature-side switching valve 310.

The control device 600 controls the operation of the high-temperature-side switching valve 310 such that an outlet-side heat medium temperature THC, which is the temperature of the high-temperature heat medium flowing out of the heater core 304, approaches a predetermined reference outlet-side heat medium temperature KTHC. That is, the control device 600 regulates the high-temperature-side flow rate ratio such that the outlet-side heat medium temperature THC approaches the reference outlet-side heat medium temperature KTHC.

Further, in a case where the outlet-side heat medium temperature THC does not reach the reference outlet-side heat medium temperature KTHC even when the control device 600 controls the high-temperature-side switching valve 310 such that the entire amount of the high-temperature heat medium from the heat radiator 202 flows to the heater core 304, the high-temperature heat medium is heated by the electric heater 306. The heating capacity of the electric heater 306 is regulated such that the outlet-side heat medium temperature THC approaches the reference outlet-side heat medium temperature KTHC.

The high-temperature heat medium flowing into the high-temperature-side radiator 303 exchanges heat with the outside air OA blown from the outside air fan to dissipate heat. Thereby, the high-temperature heat medium flowing through the high-temperature-side radiator 303 is cooled. The high-temperature heat medium flowing out of the high-temperature-side radiator 303 flows into the high-temperature-side junction 307.

On the other hand, the high-temperature heat medium flowing into the heater core 304 exchanges heat with the ventilation air W passing through the interior evaporator 207 to dissipate heat. Accordingly, the ventilation air W cooled by the interior evaporator 207 is reheated. Further, the control device 600 regulates the opening degree of the air mix door 504 so that the ventilation air temperature of the ventilation air W blown into the vehicle compartment approaches a target ventilation air temperature TAO.

The high-temperature heat medium flowing out of the heater core 304 flows into the high-temperature-side junction 307. The high-temperature-side junction 307 joins the high-temperature heat medium flowing out of the heater core 304 and the high-temperature heat medium flowing out of the high-temperature-side radiator 303 and allows the joined medium to flow out to the fluid suction side of the high-temperature-side pump 301.

In the second fluid circulation circuit 400, when the control device 600 operates the low-temperature-side pump 401, the low-temperature heat medium pumped from the low-temperature-side pump 401 flows into the heat medium passage 402 of the chiller 206. The low-temperature heat medium flowing into the chiller 206 exchanges heat with the low-pressure refrigerant to be cooled.

The low-temperature heat medium flowing out of the chiller 206 flows into the passage switching valve 70 through the first inlet portion 700A and flows out of the passage switching valve 70 through the first outlet portion 700B. The low-temperature heat medium flowing out through the first outlet portion 700B flows into the cooling water passage 405 of the battery BT. The heat medium flowing into the cooling water passage 405 of the battery BT absorbs the waste heat of the battery BT when flowing through the cooling water passage 405. Thereby, the battery BT is cooled.

The low-temperature heat medium flowing out of the cooling water passage 405 of the battery BT flows into the passage switching valve 70 through the second inlet portion 700C and flows out of the passage switching valve 70 through the third outlet portion 700E. The low-temperature heat medium flowing out of the third outlet portion 700E is guided to the suction side of the low-temperature-side pump 401 via the short-circuiting heat medium passage 440 and the low-temperature-side junction 407.

In the device cooling mode, the operation as described above enables the ventilation air W cooled by the interior evaporator 207 to be reheated by the heater core 304 and blown into the vehicle compartment. At this time, excessive heat for reheating the ventilation air W can be dissipated to the outside air in the high-temperature-side radiator 303. Therefore, the ventilation air W regulated to an appropriate temperature can be blown into the vehicle compartment to achieve comfortable air conditioning. Further, in the device cooling mode, the low-temperature heat medium cooled by the chiller 206 is allowed to flow into the cooling water passage 405 of the battery BT, whereby the battery BT can be cooled.

(B) Outside-Air Cooling Mode

The outside-air cooling mode is an operation mode in which the refrigeration cycle device 200 is operated to perform air conditioning in the vehicle compartment and the battery BT is cooled by the low-temperature heating medium cooled by the outside air.

In the outside-air cooling mode, the control device 600 controls the operation of the passage switching valve 70 so that the low-temperature heat medium flowing in from the first inlet portion 700A flows out of the first outlet portion 700B and the low-temperature heat medium flowing in from the second inlet portion 700C flows out of the second outlet portion 700D. The control device 600 brings the first expansion valve 204 into the fully closed state.

Figure 35:
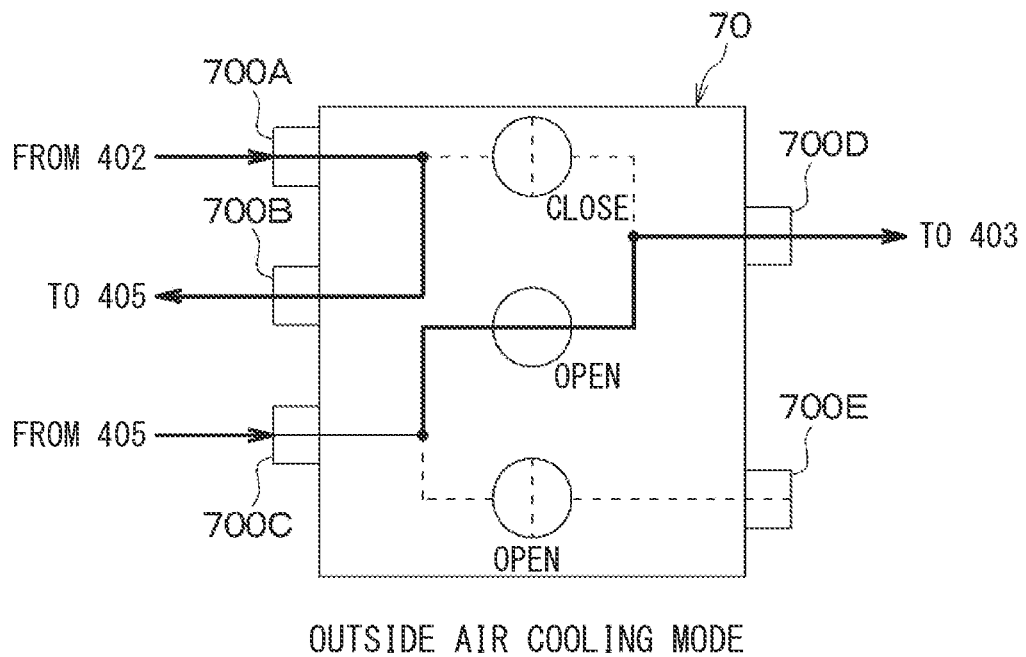
FIG. 35 is an explanatory diagram illustrating a passage configuration of the passage switching valve in an outside-air cooling mode.

Therefore, in the second fluid circulation circuit 400 in the outside-air cooling mode, as illustrated in FIG. 35, the low-temperature heat medium discharged from the low-temperature-side pump 401 flows into the first inlet portion 700A of the passage switching valve 70 via the heat medium passage 402 of the chiller 206. The low-temperature heat medium flowing into the first inlet portion 700A of the passage switching valve 70 flows out of the first outlet portion 700B of the passage switching valve 70 and then flows into the second inlet portion 700C of the passage switching valve 70 via the cooling water passage 405 of the battery BT. The low-temperature heat medium flowing into the second inlet portion 700C flows out of the second outlet portion 700D of the passage switching valve 70 and is then sucked again into the low-temperature-side pump 401 via the low-temperature-side radiator 403.

In the refrigeration cycle device 200 in the outside-air cooling mode, as in the device cooling mode, the high-pressure refrigerant discharged from the compressor 201 is cooled until the high-pressure refrigerant becomes the sub-cooled liquid-phase refrigerant in the heat radiator 202. Further, the high-temperature heat medium flowing through the heat medium passage 302 of the heat radiator 202 is heated.

The refrigerant flowing out of the heat radiator 202 flows into the refrigerant branch 203. In the outside-air cooling mode, with the first expansion valve 204 in the fully closed state, the refrigerant flowing into the refrigerant branch 203 is decompressed by the second expansion valve 205 and flows into the interior evaporator 207. As in the device cooling mode, the control device 600 regulates the throttle opening of the second expansion valve 205.

The low-pressure refrigerant having flowed into the interior evaporator 207 absorbs heat from the ventilation air W and evaporates as in the device cooling mode. Thereby, the ventilation air W is cooled. The refrigerant flowing out of the interior evaporator 207 is sucked into the compressor 201 via the evaporating pressure regulating valve 208 and the refrigerant junction 209.

In the first fluid circulation circuit 300, the control device 600 controls the operation of the components as in the device cooling mode. As a result, the outlet-side heat medium temperature THC of the high-temperature heat medium approaches the reference outlet-side heat medium temperature KTHC.

In the second fluid circulation circuit 400, when the control device 600 operates the low-temperature-side pump 401, the low-temperature heat medium pumped from the low-temperature-side pump 401 flows into the heat medium passage 402 of the chiller 206. In the outside-air cooling mode, with the first expansion valve 204 in the fully closed state, the low-temperature heat medium flowing into the heat medium passage 402 of the chiller 206 flows out without exchanging heat with the low-pressure refrigerant.

The low-temperature heat medium flowing out of the chiller 206 flows into the passage switching valve 70 through the first inlet portion 700A and flows out of the passage switching valve 70 through the first outlet portion 700B. The low-temperature heat medium flowing out through the first outlet portion 700B flows into the cooling water passage 405 of the battery BT. The heat medium flowing into the cooling water passage 405 of the battery BT absorbs the waste heat of the battery BT when flowing through the cooling water passage 405. Thereby, the battery BT is cooled.

The low-temperature heat medium flowing out of the cooling water passage 405 of the battery BT flows into the passage switching valve 70 through the second inlet portion 700C and flows out of the second outlet portion 700D. The low-temperature heat medium flowing out of the second outlet portion 700D flows into the low-temperature-side radiator 403.

The low-temperature heat medium flowing into the low-temperature-side radiator 403 exchanges heat with the outside air OA that having blown by the outside air fan and passed through the high-temperature-side radiator 303 to dissipate heat. As a result, the low-temperature heat medium flowing through the low-temperature-side radiator 403 is cooled. The low-temperature heat medium flowing out of the low-temperature-side radiator 403 is guided to the suction side of the low-temperature-side pump 401 via the low-temperature-side junction 407.

In the outside-air cooling mode, the operation as described above enables the ventilation air W cooled by the interior evaporator 207 to be reheated by the heater core 304 and blown into the vehicle compartment. Therefore, as in the device cooling mode, the ventilation air W regulated to an appropriate temperature can be blown into the vehicle compartment to achieve comfortable air conditioning. Further, in the outside-air cooling mode, the low-temperature heat medium cooled by heat exchange with the outside air in the low-temperature-side radiator 403 is allowed to flow into the cooling water passage 405 of the battery BT, whereby the battery BT can be cooled.

Here, when the cooling of the battery BT is no longer required in the outside-air cooling mode, the control device 600 may allow the low-temperature heat medium flowing in from the first inlet portion 700A to flow out of the third outlet portion 700E. Accordingly, the low-temperature heat medium flowing out of the heat medium passage 402 of the chiller 206 can be returned to the suction side of the low-temperature-side pump 401 via the short-circuiting heat medium passage 440 and the low-temperature-side junction 407.

(C) Outside-Air Heat Absorbing Mode

The outside-air heat absorbing mode is an operation mode for heating the inside of the vehicle compartment by operating the refrigeration cycle device 200 without cooling the battery BT. The outside-air heat absorbing mode is an operation mode executed at a low outside air temperature (e.g., when the temperature is 10° C. or lower).

In the outside-air heat absorbing mode, the control device 600 controls the operation of the passage switching valve 70 so that the low-temperature heat medium flowing in from the first inlet portion 700A flows out of the second outlet portion 700D. The control device 600 brings the second expansion valve 205 into the fully closed state. Further, the control device 600 regulates the opening degree of the air mix door 504 so as to fully close the cold air bypass passage 505.

Figure 36:
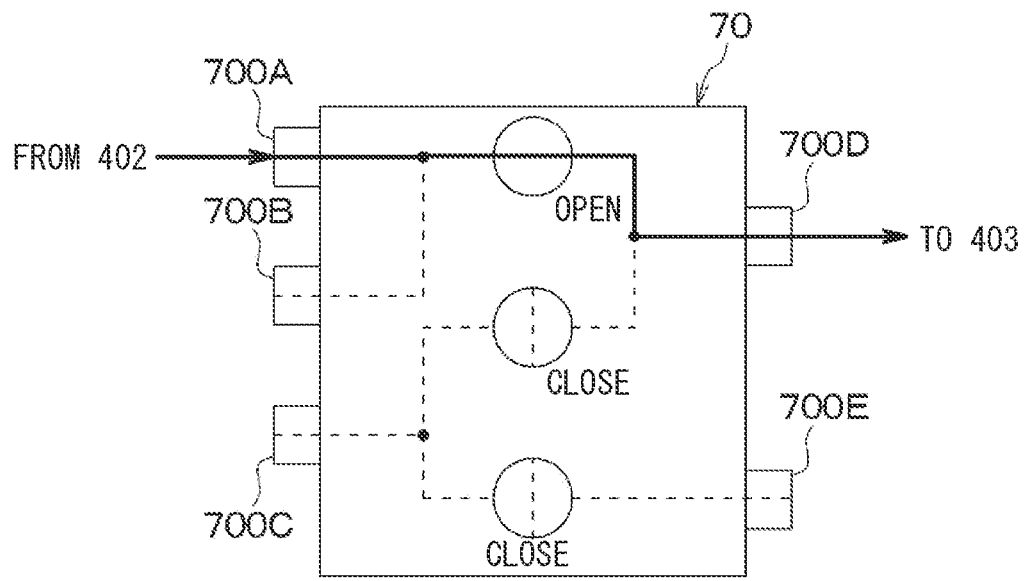
FIG. 36 is an explanatory diagram illustrating a passage configuration of the passage switching valve in an outside-air heat absorbing mode.
Figure 37:
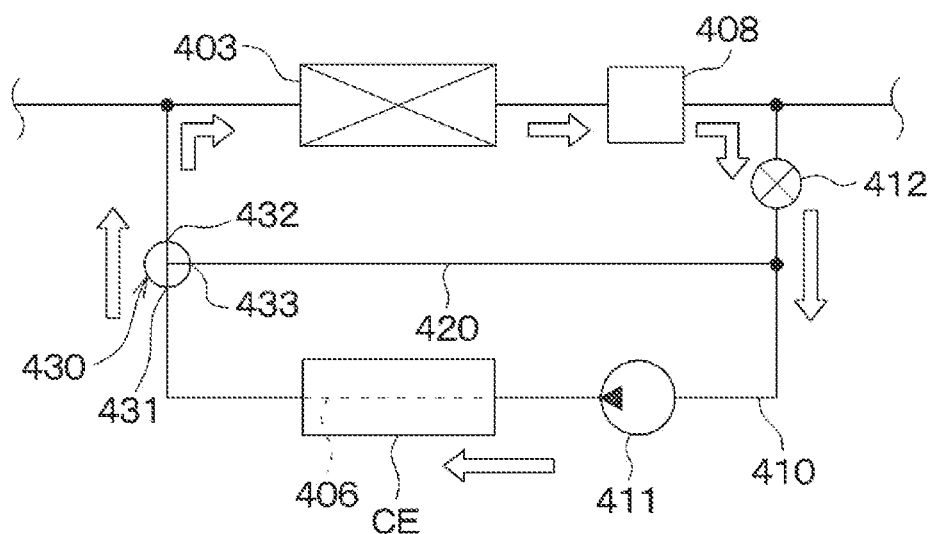
FIG. 37 is an explanatory diagram illustrating an example of a circuit configuration in a defrosting mode.

Therefore, in the second fluid circulation circuit 400 in the outside-air cooling mode, as illustrated in FIG. 36, the low-temperature heat medium discharged from the low-temperature-side pump 401 flows into the first inlet portion 700A of the passage switching valve 70 via the heat medium passage 402 of the chiller 206. The low-temperature heat medium flowing into the first inlet portion 700A of the passage switching valve 70 flows out of the second outlet portion 700D of the passage switching valve 70 and is then sucked again into the low-temperature-side pump 401 via the low-temperature-side radiator 403.

In the refrigeration cycle device 200 in the outside-air cooling mode, as in the device cooling mode, the high-pressure refrigerant discharged from the compressor 201 is cooled until the high-pressure refrigerant becomes the sub-cooled liquid-phase refrigerant in the heat radiator 202. Further, the high-temperature heat medium flowing through the heat medium passage 302 of the heat radiator 202 is heated.

The refrigerant flowing out of the heat radiator 202 flows into the refrigerant branch 203. In the outside-air cooling mode, with the second expansion valve 205 in the fully closed state, the refrigerant flowing into the refrigerant branch 203 is decompressed by the first expansion valve 204 and flows into the chiller 206. The control device 600 regulates the throttle opening of the first expansion valve 204 so that the refrigerant evaporation temperature in the chiller 206 becomes lower than the outside air temperature.

As in the device cooling mode, the low-pressure refrigerant flowing into the chiller 206 absorbs heat from the low-temperature heat medium flowing through the heat medium passage 402 and evaporates. Accordingly, the low-temperature heating medium is cooled. The refrigerant flowing out of the chiller 206 is sucked into the compressor 201 via the refrigerant junction 209.

In the first fluid circulation circuit 300, the control device 600 controls the operation of the components as in the device cooling mode. As a result, the outlet-side heat medium temperature THC of the high-temperature heat medium approaches the reference outlet-side heat medium temperature KTHC.

In the second fluid circulation circuit 400, when the control device 600 operates the low-temperature-side pump 401, the low-temperature heat medium pumped from the low-temperature-side pump 401 flows into the heat medium passage 402 of the chiller 206. The low-temperature heat medium flowing into the chiller 206 exchanges heat with the low-pressure refrigerant to be cooled to a temperature lower than the outside air temperature.

The low-temperature heat medium flowing out of the chiller 206 flows into the passage switching valve 70 through the first inlet portion 700A and flows out of the second outlet portion 700D. The low-temperature heat medium flowing out of the second outlet portion 700D flows into the low-temperature-side radiator 403.

The low-temperature heat medium flowing into the low-temperature-side radiator 403 exchanges heat with the outside air OA having blown by the outside fan and passed through the high-temperature-side radiator 303 to absorb heat. As a result, the temperature of the low-temperature heat medium flowing through the low-temperature-side radiator 403 rises so as to approach the outside air temperature. The low-temperature heat medium flowing out of the low-temperature-side radiator 403 is guided to the suction side of the low-temperature-side pump 401 via the low-temperature-side junction 407.

In the outside-air heat absorbing mode, the operation as described above enables the ventilation air W heated by the heater core 304 to be blown into the vehicle compartment. Therefore, in the outside-air heat absorbing mode, it is possible to achieve the heating of the inside of the vehicle compartment without cooling the battery BT.

(D) Temperature Control, Etc., of In-Vehicle Device CE

Here, in the temperature adjusting apparatus 1, the control device 600 controls the operations of the various control target devices so that the temperature of the in-vehicle device CE is held within an appropriate temperature range regardless of the various operation modes described above. Specifically, the control device 600 operates the device pump 411 so as to exhibit a predetermined pumping capacity regardless of the various operation modes described above.

When the temperature of the in-vehicle device CE becomes equal to or higher than a reference upper limit value, the device flow rate regulating valve 412 is set to an appropriate opening degree, and the low-temperature-side switching valve 430 is switched to a setting in which the low-temperature heat medium of the device cooling passage 410 flows to the low-temperature-side radiator 403. For example, the low-temperature-side switching valve 430 shifts the rotor 22 to a position that opens the first passage hole 141a and closes the second passage hole 141b. Hence, the low-temperature heat medium cooled by the low-temperature-side radiator 403 can flow into the cooling water passage 406 of the in-vehicle device CE. As a result, the in-vehicle device CE can be cooled by the low-temperature heating medium cooled by the outside air.

On the other hand, when the temperature of the in-vehicle device CE becomes equal to or lower than the reference lower limit value, the device flow rate regulating valve 412 is brought into the fully closed state, and the low-temperature-side switching valve 430 is switched to a setting in which the low-temperature heat medium of the device cooling passage 410 flows to the device bypass passage 420. For example, the low-temperature-side switching valve 430 shifts the rotor 22 to a position for closing the first passage hole 141a and opens the second passage hole 141b. Thereby, the low-temperature heat medium flowing out of the cooling water passage 406 of the in-vehicle device CE can be returned to the inlet side of the cooling water passage 406 again via the device bypass passage 420. As a result, the in-vehicle device CE can be warmed up by self-heating of the in-vehicle device CE.

When the outside air temperature is extremely low (e.g., 0° C. or lower), frost may be formed on the outer surface of the low-temperature-side radiator 403. When the frost is formed on the low-temperature-side radiator 403, the amount of heat absorbed from the outside air decreases, and hence the temperature adjusting apparatus 1 cannot be appropriately operated.

Therefore, when a frosting condition for frost formation on the low-temperature-side radiator 403 is satisfied, the temperature adjusting apparatus 1 switches the operation mode to the defrosting mode. The defrosting mode is a mode for removing frost formed on the low-temperature-side radiator 403. The frosting condition is, for example, a condition that is satisfied when a difference in the temperature of the low-temperature heat medium between the front and rear of the low-temperature-side radiator 403 becomes equal to or lower than a predetermined temperature. The condition is an example, and the frosting condition may be another condition.

In the defrosting mode, the temperature adjusting apparatus 1 operates the device pump 411 so as to exhibit a predetermined pumping capacity. Then, the temperature adjusting apparatus 1 sets the device flow rate regulating valve 412 to an appropriate opening degree and switches the low-temperature-side switching valve 430 to a setting in which the low-temperature heat medium of the device cooling passage 410 flows to the low-temperature-side radiator 403. For example, the low-temperature-side switching valve 430 shifts the rotor 22 to a position that opens the first passage hole 141a and closes the second passage hole 141b. Accordingly, by allowing the low-temperature heat medium, the temperature of which has risen through the cooling water passage 406 of the in-vehicle device CE, to flow into the low-temperature-side radiator 403, it is possible to remove frost formed on the low-temperature-side radiator 403.

The temperature adjusting apparatus 1 described above can achieve comfortable air conditioning in the vehicle compartment and regulate the battery BT and the in-vehicle device CE to appropriate temperatures by switching various operation modes.

The high-temperature-side switching valve 310 and the low-temperature-side switching valve 430 of the present embodiment are configured as in the valve device 10 described in the first embodiment. Therefore, the high-temperature-side switching valve 310 and the low-temperature-side switching valve 430 can obtain the effects exhibited by the valve device 10 described in the first embodiment as in the valve device 10.

Specifically, the high temperature side switching valve 310 can increase or decrease the opening degree of the first passage hole 141a and the opening degree of the second passage hole 141b by the rotor 22. Therefore, the high temperature side switching valve 310 can appropriately adjust the flow rate ratio between the high temperature heat medium passing through the high temperature side radiator 303 and the high temperature heat medium passing through the heater core 304.

Here, when the flow rate of the high-temperature-side switching valve 310 cannot be controlled at high accuracy, the flow rate ratio of the high-temperature heat medium passing through the high-temperature-side radiator 303 and the high-temperature heat medium passing through the heater core 304 cannot be appropriately regulated, and the temperature variation of the ventilation air blown into the vehicle compartment increases. In this case, the operation of the air mix door 504 or the like increases, so that power consumption increases and a power consumption rate in the vehicle deteriorates.

On the other hand, the high temperature side switching valve 310 of the present embodiment can suppress the deterioration of the flow rate accuracy caused by the stator 720 shifting in the circumferential direction DRc, so that the flow rate of the high temperature heat medium passing through the heater core 304 can be finely adjusted. That is, according to the high-temperature-side switching valve 310 of the present embodiment described above, the problem can be solved.

The low-temperature-side switching valve 430 can appropriately regulate the flow rate ratio between the low-temperature heat medium passing through the low-temperature-side radiator 403 and the low-temperature heat medium passing through the device bypass passage 420 by increasing or decreasing the opening degree of the first passage hole 141 and the opening degree of the second passage hole 141b by the rotor 22.

For example, during the defrosting operation, the entire amount of the fluid heated by the in-vehicle device CE can be appropriately guided to the low-temperature-side radiator 403. Thereby, the defrosting of the low-temperature-side radiator 403 can be performed in a short time, so that the influence of the defrosting operation on the air conditioning in the vehicle compartment and the device temperature control can be prevented sufficiently.

In addition, since the passage switching valve 70 is not formed by combining a plurality of on-off valves, three-way valves, or the like, it is less likely to cause an increase in size. It is thus possible to prevent an increase in the size of the second fluid circulation circuit 400 to which the passage switching valve 70 is applied.

In particular, the passage switching valve 70 has the same configuration as the valve device 10 of the first embodiment, and the connection structure of the shaft 740 and the rotor 750 is the same as the connecting structure between the shaft 20 of the valve device 10 and the rotor 22. Therefore, the passage switching valve 70 can obtain the effects exhibited by the valve device 10 described in the first embodiment as in the valve device 10. That is, the passage switching valve 70 can achieve the optimum distribution of the low-temperature heat medium by increasing or decreasing the opening degree of each passage hole 722 to 725 by the rotor 22.

Here, in the second fluid circulation circuit 400, when the distribution of the low-temperature heating medium by the passage switching valve 70 cannot be appropriately performed, the temperature variation of each battery constituting the battery BT increases. In this case, the degradation of the battery BT is promoted to cause a decrease in the cruising distance of the vehicle. It is conceivable that the battery is excessively mounted in consideration of the degradation of the battery BT, but in this case, the initial cost increases greatly.

In contrast, the passage switching valve 70 of the present embodiment can achieve optimum distribution of the low-temperature heating medium, so that the problem can be solved.

In the passage switching valve 70, the pressure in the first inlet-side space 711a and the pressure in the second inlet-side space 712c act in opposite directions to each other. Thus, in the passage switching valve 70, when the pressure of one of the low-temperature heat medium flowing in from the first inlet portion 700A and the low-temperature heat medium flowing in from the second inlet portion 700C changes, the pressure balance acting on the both sides of the rotor 750 changes. Such a change in the pressure balance may be a factor that hinders the close contact between the rotor 750 and the stator 720.

In contrast, the passage switching valve 70 of the present embodiment is configured such that the rotor 750 is pressed against the stator 720 by the elastic member 770. Therefore, even when the pressure of the fluid flowing in from each of the inlet portions 700A, 700C changes, the posture of the rotor 750 can be held in a posture in contact with the stator 720.

Further, when the low temperature heat medium flowing from the second inlet portion 700C is discharged through either the second outlet portion 700D or the third outlet portion 700E, the flow of the low-temperature heat medium may shift the stator 720 of the passage switching valve 70 in the circumferential direction of the axis CL of the shaft 740.

On the other hand, the engaging protrusion 728 of the passage switching valve 70 is formed near a portion where the second passage hole 723 is defined. That is, in the passage switching valve 70, since the engaging protrusion 728 is formed near a portion into which the low temperature heat medium flows, the stator 720 is restricted from being shifted in the circumference direction of the axis of the shaft 740 due to the flow of the low temperature heat medium.

Modification of the Seventh Embodiment

In the seventh embodiment described above, it has been described that each of the high-temperature-side switching valve 310, the low-temperature-side switching valve 430, and the passage switching valve 70 have configurations similar to the valve device 10 of the present disclosure, but the temperature adjusting apparatus 1 is not limited thereto. In the temperature adjusting apparatus 1, at least one of the high-temperature-side switching valve 310, the low-temperature-side switching valve 430, and the passage switching valve 70 may have a configuration similar to that of the valve device 10 of the present disclosure. The valve device 10 of the present disclosure is also applicable to a fluid circulation circuit (e.g., the refrigeration cycle device 200) different from the first fluid circulation circuit 300 and the second fluid circulation circuit 400.

In the seventh embodiment described above, an example in which the temperature adjusting apparatus 1 is applied to an electric vehicle has been described, but an application target of the temperature adjusting apparatus 1 is not limited to the electric vehicle. The temperature adjusting apparatus 1 can be widely applied to, for example, a moving body other than an electric vehicle, a stationary device, and the like. These also apply to the valve devices 10 of the first to seventh embodiments.

OTHER EMBODIMENTS

Although the representative embodiments of the present disclosure have been described above, the present disclosure is not limited to the embodiments but can be variously modified as follows, for example. The following modification to the valve device 10 can also be applied to the high temperature side switching valve 310, the low temperature side switching valve 430, the passage switching valve 70, and the like described in the seventh embodiment.

In the above-described embodiment, an example where the engaging structure 30 is formed of the engaging protrusion 32 provided on one of the inner circumferential side surface 127 and the outer circumferential side surface 146 and the engaging recess 31 provided on the other is described. However, the present disclosure is not limited to this.

For example, the engaging structure 30 may be formed of a plurality of engaging protrusions 32 provided on one of the inner circumferential side surface 127 and the outer circumferential side surface 146 and a plurality of engaging recesses 31 provided on the other. Further, in the engaging structure 30, both of the engaging protrusion 32 and the engaging recess 31 may be formed on one of the inner circumferential side surface 127 and the outer circumferential side surface 146, and another engaging protrusion 32 and another engaging recess 31 may be formed on the other. In this case, in the engaging structure 30, the engaging protrusion 32 formed on one of the side surface portions is engaged with the engaging recess 31 formed on the other of the side surface portions, and the engaging recess formed on the one of the side surface portions is engaged with the engaging protrusion formed on the other of the side surface portions.

In the above-described embodiment, an example in which each of the shapes of the engaging protrusion 32 and the engaging recess 31 in a plan view is rectangular, but the shapes are not limited to this.

For example, the engaging protrusion 32 and the engaging recess 31 can be appropriately designed to have a triangular shape or a semicircular shape in a plan view.

In the above-described embodiments, an example where the engaging recess 31 is formed at a position of the cylindrical body portion 120 that is offset from the outlet opening 120e in the circumferential direction DRc. However, the present disclosure is not limited to this.

For example, the engaging recess 31 may be formed at a portion of the cylindrical body portion 120 between the predetermined axis CL1 and the outlet opening 120e in the radial direction DRr.

In the above-described embodiment, an example where a dimension of the engaging protrusion 32 in the radial direction of the stator axis CL3 is equal to or larger than twice the dimension of a gap between the outer circumferential side surface 146 and the inner circumferential side surface 127 in the radial direction of the stator axis CL3 is described. However, the present disclosure is not limited to this.

For example, the dimension of the engaging protrusion 32 in the radial direction of the stator axis CL3 may be less than twice the dimension of the gap between the outer circumferential side surface 146 and the inner circumferential side surface 127 in the radial direction of the stator axis CL3.

In the above-described embodiments, an example in which the dimension of the protrusion outer surface portion 32b in the first direction is larger than the dimension of each of the protrusion side surface portions 32a in the second direction DR2 is described. However, the present disclosure is not limited to this.

For example, the dimension of the protrusion circumferential side surface portion 32b in the first direction DR1 may be less than the dimension of each of the protrusion side surface portions 32a in the second direction DR2.

In the above-described embodiments, an example in which the dimension of the engaging protrusion 32 in the circumferential direction DRc is less than the dimension of each of the first passage curved surface 141aa and the second passage curved surface 141ba in the circumferential direction DRc is described. However, the present disclosure is not limited to this.

For example, the dimension of the engaging protrusion 32 in the circumferential direction DRc may be larger than the dimension of each of the first passage curved surface portion 141aa and the second passage curved surface portion 141ba in the circumferential direction DRc.

In the above-described embodiment, an example where the engaging protrusion 32 formed on the outer circumferential side surface 146 is located outside of the rotor outer circumferential surface 225 of the rotor 22 in the radial direction DRr of the predetermined axis CL1 is described. However, the present disclosure is not limited to this.

For example, the engaging protrusion 32 formed on the outer circumferential side surface 146 may be located inside of the rotor outer circumferential surface 225 of the rotor 22 in the radial direction DRr of the predetermined axis CL1.

In the above-described embodiments, an example where the maximum value of the distance from the center of the sliding surface 220 to the outer edge of the sliding surface 220 is equal to or less than the minimum value of the distance from the center of the opening surface 140 to the outer edge of the opening surface 140 is described. However, the present disclosure is not limited to this.

For example, in the sliding surface 220, the maximum value of the distance from the center of the sliding surface 220 to the outer edge of the sliding surface 220 may be larger than the minimum value of the distance from the center of the opening surface 140 to the outer edge of the opening surface 140.

In the above embodiments, it goes without saying that the components constituting the embodiments are not necessarily indispensable unless otherwise clearly stated or unless otherwise thought to be clearly indispensable in principle.

In the above embodiments, when a numerical value such as the number, a numerical value, an amount, or a range of the component of the embodiment is mentioned, the numerical value is not limited to the specified number unless otherwise specified to be indispensable or clearly limited to the specified number in principle.

In the above embodiments, when a shape, a positional relationship, or the like of the component or the like is mentioned, the shape, the positional relationship, or the like is not limited to that being mentioned unless otherwise specified or limited to a specified shape, a specified positional relationship, or the like in principle.

What is claimed is:
1. A valve device comprising:
a housing;
a stator disposed in the housing and defining at least one passage hole through which a fluid flows;
a driving portion configured to generate a rotational force;
a shaft configured to be rotated by the rotational force generated by the driving portion; and
a rotor disposed to be in contact with the stator in the housing and configured to adjust an amount of the fluid flowing through the at least one passage hole by rotating about an axis along with a rotation of the shaft, wherein
the housing has an inner circumferential side surface,
the stator has an outer circumferential side surface facing the inner circumferential side surface of the housing,
the stator has at least one engaging protrusion protruding from the outer circumferential side surface toward the inner circumferential side surface of the housing,
the housing has at least one engaging recess on the inner circumferential side surface,
the at least one engaging protrusion is engaged with the at least one engaging recess such that the stator is restricted from rotating in a circumferential direction of the axis,
the housing includes a cylindrical body portion having a housing axis that extends along the axis, a first virtual plane is defined as a plane that connects the axis and the housing axis in a radial direction of the housing axis, the axis and the housing axis extending on the first virtual plane, a second virtual plane is defined as a plane that is perpendicular to the first virtual plane and that passes through the housing axis in the radial direction, the housing axis extending on the second virtual plane, the stator includes a stator body portion having a stator axis that extends along the axis, the second virtual plane passes through the stator body portion such that the stator body portion is virtually divided by the second virtual plane into two areas, and the stator is disposed inside the cylindrical body portion of the housing such that the at least one engaging protrusion is located in one of the two areas and the stator axis is located in the other of the two areas.

2. The valve device according to claim 1, wherein
the housing includes the cylindrical body portion having the housing axis that extends along the axis,
the inner circumferential side surface of the housing defines an outlet opening through which the fluid flows out of the cylindrical body portion, and
the at least one engaging recess is disposed at a position of the cylindrical body portion that is offset from the outlet opening in the circumferential direction.

3. The valve device according to claim 1, wherein
the stator includes the at least one engaging protrusion and the stator body portion,
the stator is disposed inside the housing with a gap defined between the outer circumferential side surface of the stator and the inner circumferential side surface of the housing,
the stator body portion includes the stator axis that is coaxial with the axis of the rotor,
the at least one engaging protrusion protrudes along a radial direction of the stator axis, and
the at least one engaging protrusion has a length in the radial direction of the stator axis that is equal to or more than twice a dimension of the gap between the outer circumferential side surface and the inner circumferential side surface.

4. The valve device according to claim 3, wherein
a cross-section of the at least one engaging protrusion perpendicular to the stator axis has a rectangular shape,
the at least one engaging protrusion has:
two protrusion side surface portions having a planar shape and extending in a first direction in which the at least one engaging protrusion protrudes; and
a protrusion outer surface portion having a planar shape and extending in a second direction perpendicular to the first direction, the protrusion outer surface portion being connected to the two protrusion side surface portions, and
a dimension of the protrusion outer surface portion in the second direction is greater than a dimension of each of the two protrusion side surface portions in the first direction.

5. The valve device according to claim 4, wherein
the stator body portion has a passage curved surface portion defining a part of the passage hole,
the passage curved surface portion curvedly extends in the circumferential direction, and
the at least one engaging protrusion has a dimension in the circumferential direction that is less than that of the passage curved surface portion.

6. The valve device according to claim 1, wherein
the rotor includes a rotor outer circumferential surface, and
the at least one engaging protrusion is located outward of the rotor outer circumferential surface in a radial direction of the axis.

7. The valve device according to claim 1, wherein
the stator includes an opening surface on which the rotor slidably moves,
the rotor includes a sliding surface facing the opening surface of the stator, and
a minimum distance between a center of the opening surface and an outer edge of the opening surface is equal to or greater than a maximum distance between a center of the sliding surface and an outer edge of the sliding surface.

8. The valve device according to claim 1, wherein
the stator is a single stator, and
the housing axis passes through the single stator.

9. The valve device according to claim 1, wherein
the at least one engaging protrusion is located only in the one of the two areas.

10. The valve device according to claim 9, wherein
the stator axis is located only in the other of the two areas.

11. The valve device according to claim 1, wherein
a cross-section of the at least one engaging protrusion perpendicular to the stator axis has a rectangular shape,
the at least one engaging protrusion has a protrusion side surface portion having a planar shape and extending in a first direction in which the at least one engaging protrusion protrudes,
the at least one engaging recess has a recess side surface portion having a planar shape and extending in the first direction,
the stator is restricted from rotating by a contact between the protrusion side surface portion and the recess side surface portion.

12. The valve device according to claim 1, wherein
the housing has a side wall portion having the inner circumferential side surface, and
a thickness of the side wall portion varies in a circumferential direction.

13. The valve device according to claim 12, wherein
the side wall portion has a thick portion and a thin portion,
a wall thickness of the thick portion is thicker than a wall thickness of the thin portion, and
the at least one engaging recess is located only in the thick portion.

14. The valve device according to claim 12, wherein
the side wall portion of the housing is divided by the second virtual plane into a first portion and a second portion,
a cross sectional area of the first portion cut along a plane perpendicular to the housing axis is larger than a cross sectional area of the second portion cut along the plane perpendicular to the housing axis, and
the at least one engaging recess is located only in the first portion.

* * * * *